(12) United States Patent
Kawamoto et al.

(10) Patent No.: US 6,893,373 B2
(45) Date of Patent: May 17, 2005

(54) TRANSMISSION FOR VEHICLE

(75) Inventors: Mutsumi Kawamoto, Anjo (JP);
Yoshimi Ishihara, Anjo (JP); Yoshinori Miyaishi, Anjo (JP); Mitsugi Yamashita, Anjo (JP); Nobuhiro Hosoi, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 10/312,634

(22) PCT Filed: Mar. 5, 2002

(86) PCT No.: PCT/JP02/01999

§ 371 (c)(1),
(2), (4) Date: Dec. 30, 2002

(87) PCT Pub. No.: WO02/070919

PCT Pub. Date: Sep. 12, 2002

(65) Prior Publication Data

US 2003/0148847 A1 Aug. 7, 2003

(30) Foreign Application Priority Data

Mar. 5, 2001 (JP) ........................................ 2001-061014

(51) Int. Cl.$^7$ ................................................. F16H 3/44
(52) U.S. Cl. ...................................................... 475/302
(58) Field of Search ................................. 475/207, 303, 475/302, 296

(56) References Cited

U.S. PATENT DOCUMENTS

| 4,200,006 | A | * | 4/1980 | Ehrlinger et al. | 475/207 |
|---|---|---|---|---|---|
| 4,416,168 | A | * | 11/1983 | Arai et al. | 475/207 |
| 4,924,729 | A | * | 5/1990 | Sherman et al. | 475/207 |
| 5,554,079 | A | * | 9/1996 | Seo et al. | 475/207 |

* cited by examiner

Primary Examiner—Sherry Estremsky
(74) Attorney, Agent, or Firm—Oliff & Berridge, PLC

(57) ABSTRACT

A transmission for a vehicle includes a main transmission (M) and a differential gear mechanism (20). The main transmission has at least two rotating elements (11, 12; 13, 14) each set to a different gear ratio, and the differential gear mechanism has at least three elements (21, 22, 23). There are provided first input means (C-1, C-2) which selectively inputs an input rotation to two rotating elements of the main transmission, and second input means (1, 2, C-3; 1, 2, 4) which connects the two rotating elements to two elements (21, 22) of the differential gear mechanism and inputs the input rotation to the other at least one element (23). Since an intermediate gear ratio with respect to an individual gear ratio is generated by two rotating elements at a time of simultaneously transmitting power to two rotating elements, it is possible to increase the number of shift speeds.

29 Claims, 57 Drawing Sheets

| | PLANETARY PORTION | | | M/T PORTION | | | | |
|---|---|---|---|---|---|---|---|---|
| | C-1 | C-2 | C-3 | ① | ② | ③ | ④ | REV |
| 1st | | O | | O | | | | |
| 2nd | | | O | O | O | | | |
| 3rd | O | | | | O | | | |
| 4th | | | O | | O | O | | |
| 5th | | O | | | | O | | |
| 6th | | | O | | | O | O | |
| 7th | O | | | | | | O | |
| Rev | | O | | | | | | O |

FIG. 12
| | PLANETARY PORTION | | | M/T PORTION | | | | |
|---|---|---|---|---|---|---|---|---|
| | C-1 | C-2 | C-D | ① | ② | ③ | ④ | REV |
| 1st | | O | O | O | | | | |
| 2nd | O | O | | O | O | | | |
| 3rd | O | | O | O | | | | |
| 4th | O | O | | | O | O | | |
| 5th | | O | O | | O | | | |
| 6th | O | O | | | | O | O | |
| 7th | O | | O | | | | O | |
| REV | | O | O | | | | | O |
FIG. 13
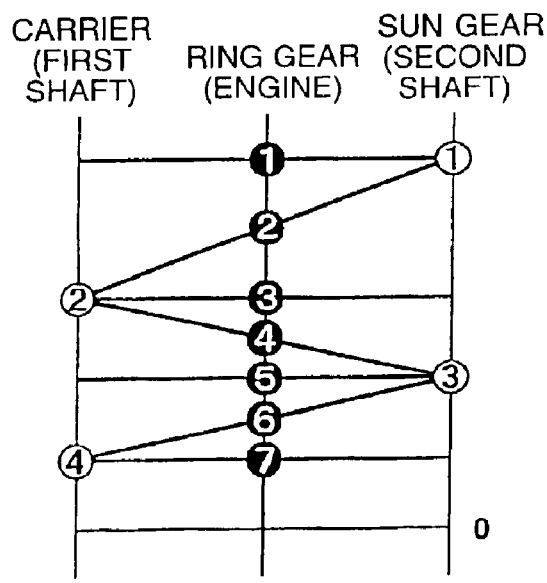
FIG. 14
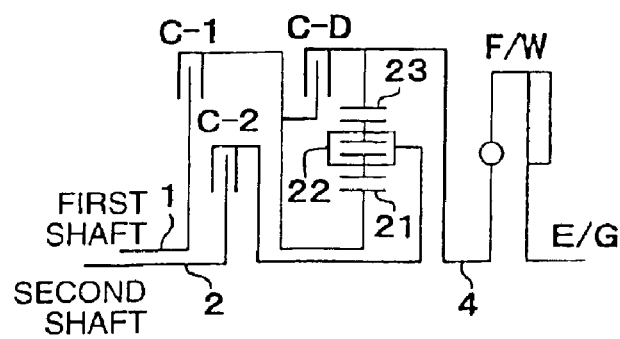

FIG. 27
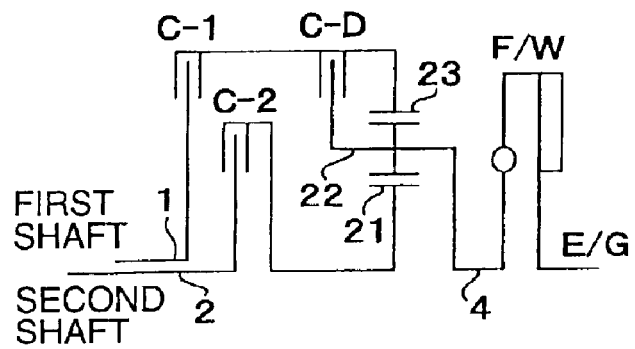
FIG. 28
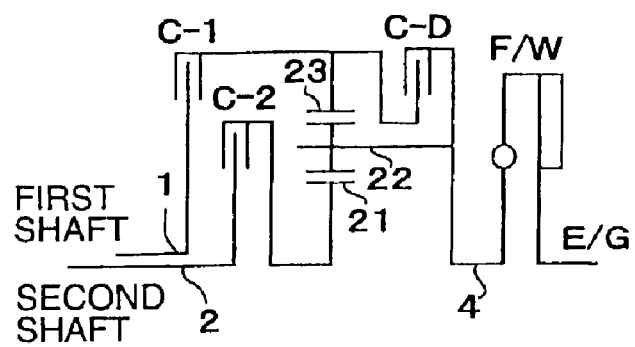
FIG. 29
|  | PLANETARY PORTION | | | M/T PORTION | | | | |
|---|---|---|---|---|---|---|---|---|
|  | C-1 | C-2 | C-3 | ① | ② | ③ | ④ | REV |
| 1st |  | O |  | O |  |  |  |  |
| 2nd |  |  | O | O | O |  |  |  |
| 3rd | O |  |  |  | O |  |  |  |
| 4th |  | O |  |  |  | O |  |  |
| 5th |  |  | O |  |  | O | O |  |
| 6th | O |  |  |  |  |  | O |  |
| Rev |  | O |  |  |  |  |  | O |

|  | PLANETARY PORTION | | | M/T PORTION | | | | |
| --- | --- | --- | --- | --- | --- | --- | --- | --- |
|  | C-1 | C-2 | C-3 | ① | ② | ③ | ④ | REV |
| 1st | O |  |  | O |  |  |  |  |
| 2nd |  |  | O | O | O |  |  |  |
| 3rd |  | O |  |  | O |  |  |  |
| 4th |  |  | O |  | O | O |  |  |
| 5th | O |  |  |  |  | O |  |  |
| 6th |  |  | O |  |  | O | O |  |
| 7th |  | O |  |  |  |  | O |  |
| Rev | O |  |  |  |  |  |  | O |

|  | PLANETARY PORTION | | | M/T PORTION | | | |
|---|---|---|---|---|---|---|---|
|  | C-1 | C-2 | C-3 | ① | ② | ③ | REV |
| 1st |  | O |  | O |  |  |  |
| 2nd |  |  | O | O | O |  |  |
| 3rd | O |  |  |  | O |  |  |
| 4th |  |  | O |  | O | O |  |
| 5th |  | O |  |  |  | O |  |
| Rev |  | O |  |  |  |  | O |

|  | PLANETARY PORTION | | | | M/T PORTION | | | |
|---|---|---|---|---|---|---|---|---|
|  | C-1 | C-2 | C-3 | C-4 | ① | ② | ③ | REV |
| 1st |  | O |  |  | O |  |  |  |
| 2nd |  |  |  | O | O | O |  |  |
| 3rd |  |  | O |  | O | O |  |  |
| 4th | O |  |  |  | O |  |  |  |
| 5th |  |  | O |  |  | O | O |  |
| 6th |  |  |  | O |  | O | O |  |
| 7th |  | O |  |  |  |  | O |  |
| Rev |  | O |  |  |  |  |  | O |

|  | PLANETARY PORTION | | | | M/T PORTION | | | |
|---|---|---|---|---|---|---|---|---|
|  | C-1 | C-2 | C-3 | B-1 | ① | ② | ③ | ④ |
| 1st |  | O |  |  | O |  |  |  |
| 2nd |  |  | O |  | O | O |  |  |
| 3rd | O |  |  |  | O |  |  |  |
| 4th |  |  | O |  | O | O |  |  |
| 5th |  | O |  |  |  |  | O |  |
| 6th |  |  | O |  |  |  | O | O |
| 7th | O |  |  |  |  |  |  | O |
| Rev | O |  |  | O | O |  |  |  |

| | PLANETARY PORTION | | | | M/T PORTION | | | | |
|---|---|---|---|---|---|---|---|---|---|
| | C-1 | C-2 | C-3 | B-1 | ① | ② | ③ | ④ | REV |
| 1st | O | | | | O | | | | |
| 2nd | | | O | | O | O | | | |
| 3rd | | O | | | O | | | | |
| 4th | | | O | | O | O | | | |
| 5th | O | | | | | O | | | |
| 6th | | | O | | | O | O | | |
| 7th | | O | | | | | O | | |
| 8th | | | O | O | | | O | | |
| Rev | O | | | | | | | | O |

|  | PLANETARY PORTION | | | M/T PORTION | | | | |
|---|---|---|---|---|---|---|---|---|
|  | C-1 | C-2 | C-3 | ① | ② | ③ | Lock | REV |
| 1st |  | O |  | O |  |  |  |  |
| 2nd |  |  | O | O | O |  |  |  |
| 3rd | O |  |  |  | O |  |  |  |
| 4th |  |  | O |  | O | O |  |  |
| 5th |  | O |  |  |  | O |  |  |
| 6th |  |  | O |  |  | O | O |  |
| Rev |  | O |  |  |  |  |  | O |

| | PLANETARY PORTION | | | M/T PORTION | | | | |
|---|---|---|---|---|---|---|---|---|
| | C-1 | C-2 | C-3 | C-4 | C-5 | B-1 | B-2 | B-3 |
| 1st | O | | | | | | O | |
| 2nd | | | O | | | | O | O |
| 3rd | | O | | | | | | O |
| 4th | | | O | O | | | | O |
| 5th | O | | | O | | | | |
| 6th | | | O | O | O | | | |
| 7th | | O | | | O | | | |
| Rev | | O | | | | O | O | |

| | REAR PLANETARY PORTION | | | | FRONT PLANETARY PORTION | | |
|---|---|---|---|---|---|---|---|
| | C-3 | C-4 | C-5 | B-2 | C-1 | C-2 | B-1 |
| 1st | O | | | | | O | O |
| 2nd | | | O | | | O | O |
| 3rd | | O | | | (O) | O | (O) |
| 4th | | | O | | O | O | |
| 5th | O | | | | O | (O) | (O) |
| 6th | | | O | | O | | O |
| 7th | | O | | | O | | O |
| Rev | O | | | O | | O | |

| | PLANETARY 3 | | | | PLANETARY 2 | | |
|---|---|---|---|---|---|---|---|
| | C-3 | C-4 | C-5 | B-2 | C-1 | C-2 | B-1 |
| 1st | O | | | | | O | O |
| 2nd | | | O | | | O | O |
| 3rd | | O | | | (O) | O | (O) |
| 4th | | | O | | O | O | |
| 5th | O | | | | O | (O) | (O) |
| 6th | | | O | | O | | O |
| 7th | | O | | | O | | O |
| Rev | O | | | O | | O | |

| | PLANETARY PORTION | | | M/T PORTION | | | | |
|---|---|---|---|---|---|---|---|---|
| | C-1 | C-2 | C-D | ① | ② | ③ | ④ | REV |
| 1st | | O | O | O | | | | |
| 2nd | O | O | | O | O | | | |
| 3rd | O | | O | | O | | | |
| 4th | O | O | | | O | O | | |
| 5th | | O | O | | | O | | |
| 6th | O | O | | | | O | O | |
| 7th | O | | O | | | | O | |
| Rev | | O | O | | | | | O |

FIG. 86
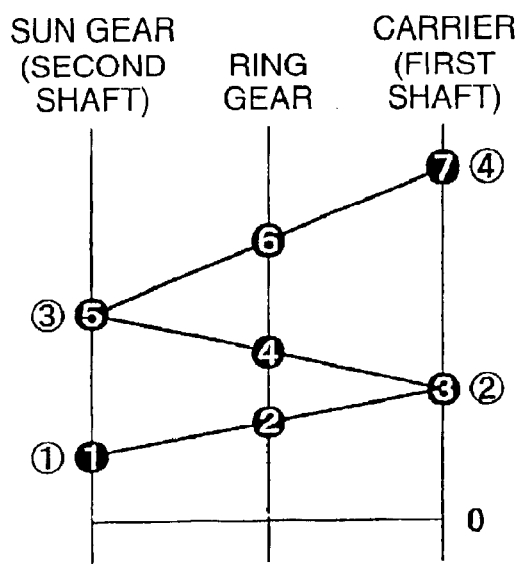
FIG. 87
| | PLANETARY PORTION | | | M/T PORTION | | | | |
|---|---|---|---|---|---|---|---|---|
| | C-1 | C-2 | C-D | ① | ② | ③ | ④ | REV |
| 1st | | O | O | O | | | | |
| 2nd | O | O | | O | O | | | |
| 3rd | O | | O | | O | | | |
| 4th | | O | O | | | O | | |
| 5th | O | O | | | | O | O | |
| 6th | O | | O | | | | O | |
| Rev | | O | O | | | | | O |
FIG. 88
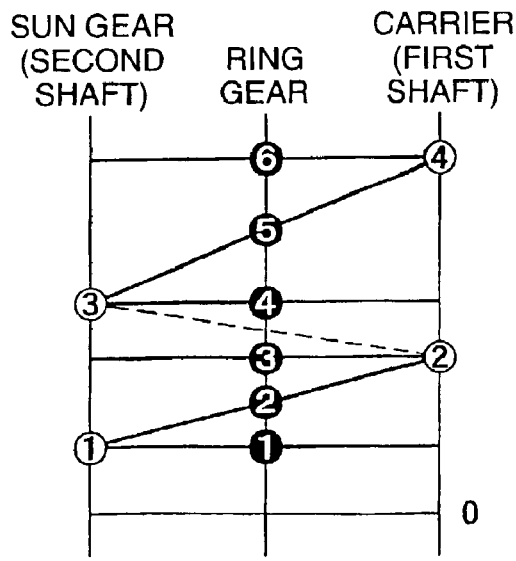

|  | PLANETARY PORTION | | | M/T PORTION | | | | |
|---|---|---|---|---|---|---|---|---|
|  | C-1 | C-2 | C-D | ① | ② | ③ | ④ | REV |
| 1st | O |  | O | O |  |  |  |  |
| 2nd | O | O |  | O | O |  |  |  |
| 3rd |  | O | O | O |  |  |  |  |
| 4th | O | O |  |  | O |  |  |  |
| 5th | O |  | O |  | O |  |  |  |
| 6th | O | O |  |  |  | O | O |  |
| 7th |  | O | O |  |  |  | O |  |
| Rev | O |  |  |  |  |  |  | O |

|  | PLANETARY PORTION | | | M/T PORTION | | | |
|---|---|---|---|---|---|---|---|
|  | C-1 | C-2 | C-D | ① | ② | ③ | REV |
| 1st |  | O | O | O |  |  |  |
| 2nd | O | O |  | O | O |  |  |
| 3rd | O |  | O |  | O |  |  |
| 4th | O | O |  |  | O | O |  |
| 5th |  | O | O |  |  | O |  |
| Rev |  | O | O |  |  |  | O |

|  | PLANETARY PORTION | | | | M/T PORTION | | | | |
|---|---|---|---|---|---|---|---|---|---|
|  | C-1 | C-2 | C-D | B-1 | ① | ② | ③ | ④ | REV |
| 1st |  | O |  | O | O |  |  |  |  |
| 2nd |  | O | O |  | O |  |  |  |  |
| 3rd | O | O |  |  | O | O |  |  |  |
| 4th | O |  | O |  |  | O |  |  |  |
| 5th | O | O |  |  |  | O | O |  |  |
| 6th |  | O | O |  |  |  | O |  |  |
| 7th | O | O |  |  |  |  | O | O |  |
| 8th | O |  | O | O |  |  |  | O |  |
| Rev |  | O |  | O |  |  |  |  | O |

| | PLANETARY PORTION | | | M/T PORTION | | | | |
|---|---|---|---|---|---|---|---|---|
| | C-1 | C-2 | C-3 | Lock | ① | ② | ③ | REV |
| 1st | | | O | O | O | | | |
| 2nd | | O | | | O | | | |
| 3rd | | | O | | O | O | | |
| 4th | O | | | | | O | | |
| 5th | | | O | | | O | O | |
| 6th | | O | | | | | O | |
| Rev | | | O | O | | | | O |

TRANSMISSION FOR VEHICLE

BACKGROUND OF THE INVENTION

1. Field of Invention

The invention relates to a transmission for a vehicle, and more particularly to a transmission for a vehicle in which a manual transmission is a main transmission.

2. Description of Related Art

To eliminate a clutch operation when a vehicle is started or shifted so as to make a driving operation easy, for a transmission mounted on a vehicle, an automatic transmission is mainly employed using a fluid transmission apparatus, such as a stepped transmission including a planetary gear having multiple speeds or multiple elements, or a stepless transmission such as a continuously variable transmission (CVT) as a starting apparatus. Further, the stepped transmission tends to have multiple speeds in order to respond to a requirement of securing drivability and improving a specific fuel consumption which is indispensable for energy saving.

Meanwhile, an automatic transmission using the fluid transmission apparatus as mentioned above has a disadvantage in terms of fuel consumption in comparison with a conventional manual transmission using a dry type single disc clutch because a transmission efficiency of the fluid transmission apparatus is particularly low, though an improvement is made, for example, when a lock-up clutch is provided for the purpose of improving the low transmission efficiency. On the other hand, in the case of a conventional manual transmission, which is advantageous in terms of the transmission efficiency, since it is necessary to pass through a neutral state in which power transmission is interrupted at a time of shifting, irrespective of whether the clutch operation is manually performed or automatically performed, Applicants note that, smoothness in acceleration tends to be insufficient.

Further, with regard to multiple speeds, in the case of the automatic transmission mentioned above, a planetary gear is necessarily made to have multiple speeds or multiple elements, or the number of friction elements or engagement elements such as clutches, brakes, one-way clutches and the like, for controlling the planetary gear, is increased. Accordingly, in a transmission for a vehicle in which a mounting space is severely limited, it is hard to take an essential measure for the space, though it is possible to improve a layout of the friction elements or the engagement elements with respect to the planetary gear. On the other hand, in the case of a manual transmission, since an increase of the number of the shift speeds directly causes an increase of gear pairs, the transmission needs to be large, and in particular, the axial length needs to be increased. Meanwhile, in the case of the manual transmission, a main transmission and a sub transmission can be combined, and multiple speeds can be provided while suppressing the increase of the gear pairs by the relevant control. However, in this case, both of the main and sub transmissions need to perform shifting simultaneously, so that a significantly complex and hard control is required. As mentioned above, each of the automatic transmission and the manual transmission has advantages and disadvantages, and it is hard to provide an overall solution for the problems using conventional techniques.

SUMMARY OF THE INVENTION

Accordingly, a main object of the invention is to provide a transmission for a vehicle based on a new concept which can achieve more shift speeds with respect to a gear arrangement and can achieve smoothness in acceleration of an automatic transmission while maintaining good transmission efficiency of a manual shift transmission by employing the manual transmission mentioned above as a main body. Next, a further object of the present invention is to secure an improved gear ratio step which is more important than the object mentioned above in view of a practical use in a multi-step transmission.

In the specification, a manual transmission in which the clutch operation is automated by combining a constant mesh type transmission and a dry single disc clutch as shown in FIG. 105 is referred to as an automatic M/T.

In order to achieve the object mentioned above, a transmission for a vehicle according to the present invention is characterized by including a main transmission (M) which has at least two rotating elements (11, 12; 13, 14), each set to a different gear ratio, a differential gear mechanism (20) which has at least three elements (21, 22, 23), and connecting means which directly or selectively connects the two rotating elements to different speed-changing elements of the differential gear mechanism, respectively.

Further, the invention is characterized by including a main transmission (M) which is connected to an output so as to be driven, and has at least two rotating elements (11, 12; 13, 14), each set to different gear ratios, a differential gear mechanism (20) which has at least three elements (21, 22, 23), first input means which directly or selectively connects the two rotating elements to the two elements (21, 22) of the differential gear mechanism and selectively inputs an input rotation, and second input means (C-3; 4) which directly or selectively input the input rotation to the other at least one element (23).

The structure mentioned above can be made such that the first input means has a connection member which directly connects the two elements (21, 22) of the differential gear mechanism to the two rotating elements, and a clutch which selectively connects the two elements of the differential gear mechanism to the input shaft, and the second input means selectively has a clutch which selectively connects another element mentioned above to the input shaft.

In the structure mentioned above two rotating elements of the main transmission are selectively connected to the different elements of the differential gear mechanism, respectively.

In the structure mentioned above the main transmission can achieve at least a first shift speed corresponding to a lowest shift speed.

In the structure mentioned above the differential gear mechanism includes a planetary gear.

In the structure mentioned above it is possible to employ a structure made such that the planetary gear is a single planetary gear including three elements which are a sun gear (21), a ring gear (23) and a carrier (22), one of the sun gear and the ring gear is always connected to a first shaft (1) which is connected to one of the two rotating elements, land is selectively connected to an input shaft (4) via a first clutch (C-1) which constitutes the first input means, the other is always connected to a second shaft (2) which is connected to the other of the two rotating elements, and is selectively connected to the input shaft via a second clutch (C-2) which constitutes the first input means, and the carrier is selectively connected to the input shaft via a third clutch (C-3) which constitutes the second input means.

In the structure mentioned above it is also possible to employ a structure made such that the planetary gear is a double planetary gear including three elements which are a sun gear (21), a ring gear (23) and a carrier (22), one of the sun gear and the carrier is always connected to a first shaft (1) which is connected to one of the two rotating elements, and is selectively connected to an input shaft (4) via a first clutch (C-1) which constitutes the first input means, the other is always connected to a second shaft (2) which is connected to the other of the two rotating elements, and is selectively connected to the input shaft via a second clutch (C-2) which constitutes the first input means, and the ring gear is selectively connected to the input shaft via a third clutch (C-3) which constitutes the second input means.

The structure mentioned above can be made such that the first input means has a clutch (C-1, C-2) which selectively connects the two elements (21, 22) of the differential gear mechanism to the two rotating element, and a clutch (C-D) which selectively connects at least two elements of the differential gear mechanism (20), and the second input means is a connection member (4) which always connects another element to the input shaft.

In the structure mentioned above two rotating elements of the main transmission are selectively connected to the different elements of the differential gear mechanism, respectively.

In the structure mentioned above, as described in claim 11, the main transmission can achieve at least a first shift speed corresponding to a lowest shift speed.

In the structure mentioned above the differential gear mechanism includes a planetary gear.

In the structure mentioned above the structure can be also made such that a third clutch (C-D) which selectively connects at least two elements of the planetary gear is provided, the planetary gear a single planetary gear including three elements which are a sun gear (21), a ring gear (23) and a carrier (22), one of the sun gear and the ring gear is selectively connected to a first shaft (1) which is connected to one of the two rotating elements via a first clutch (C-1) constituting the first input means, the other is selectively connected to a second shaft (2) which is connected to the other of the two rotating elements via a second clutch (C-2) constituting the first input means, and the carrier is always connected to the input shaft (4) by the connection member.

In the structure mentioned above the structure can be also made such that a third clutch (C-D) which selectively connects at least two elements of the planetary gear is provided, the planetary gear is a double planetary gear including three elements which are a sun gear (21), a ring gear (23) and a carrier (22), one of the sun gear and the carrier is selectively connected to a first shaft (1) which is connected to one of the two rotating elements via a first clutch (C-1) constituting the first input means, the other is selectively connected to a second shaft (2) which is connected to the other of the two rotating elements via the second clutch (C-2), and the ring gear is always connected to the input shaft (4) by the connection member.

Next, a transmission for a vehicle according to the present invention is characterized by including a main transmission (M) which has at least two rotating elements (11, 12; 13, 14), each set to a different gear ratio, input means (C-1, C-2) which selectively inputs an input rotation to the two rotating elements, a differential gear mechanism (20) which has at least three elements (21, 22, 23), and output means (3A, 3B, 3C) which connects the two rotating elements to two elements (21, 22) of the differential gear mechanism, and selectively outputs an output rotation from the other at least one element (23) and one of the two elements.

Further, a transmission for a vehicle according to the invention is characterized by including a main transmission (M) which has at least two rotating elements (11, 12; 13, 14), each set to a different gear ratio, input means (4) which inputs an input rotation to the two rotating elements, a differential gear mechanism (20) which has at least three elements (21, 22, 23), and output means (3A, 3B, C-1, C-2, C-D) which selectively connects the two rotating elements to two elements (21, 22) of the differential gear mechanism, and selectively outputs an output rotation from the other at least one element (23) and one of the two elements.

Further, a transmission for a vehicle according to the invention is characterized by including a main transmission (M) which has at least two rotating elements (11, 12; 13, 14), each set to a different gear ratio, input means (4) which inputs an input rotation to the two rotating elements, a differential gear mechanism (20) which has at least three elements (21, 22, 23), and output means (3A, 3B, C-1 to C-3) which connects the two rotating elements to two elements (21, 22) of the differential gear mechanism, and selectively outputs an output rotation from the other at least one element (23) and one of the two elements.

Also in the structure mentioned above two rotating elements of the main transmission are selectively connected to the different elements of the differential gear mechanism, respectively.

In the structure mentioned above the main transmission can achieve at least a first shift speed corresponding to a lowest shift speed.

In the structure mentioned above the differential gear mechanism includes a planetary gear.

In the structure mentioned above it is possible to employ a structure made such that a third clutch (C-D) which connects at least two elements of the planetary gear is provided, the planetary gear is a double planetary gear including three elements which are a sun gear (21), a ring gear (23) and a carrier (22), one of the sun gear and the carrier is always connected to a first shaft (3A) which constitutes the output means, the other is always connected to a second shaft (3B) which constitutes the output means, and is selectively connected to the one element via the third clutch (C-D), and the ring gear is always connected to the output shaft (3C).

Alternatively, in the structure mentioned above the structure can be also made such that a third clutch (C-D) which selectively connects at least two elements of the planetary gear is provided, the planetary gear is a single planetary gear including three elements which are a sun gear (21), a ring gear (23) and a carrier (22), one of the sun gear and the ring gear is always connected to a first shaft (1) which constitutes the output means, the other is always connected to a second shaft (2) which constitutes the output means, and is selectively connected to the one element via a third clutch (C-D), and the carrier is always connected to the output shaft (3C).

Further, in the structure mentioned above the structure can be also made such that a third clutch (C-D) which selectively connects at least two elements of the planetary gear is provided, the planetary gear is a double planetary gear including three elements which are a sun gear (21), a ring gear (23) and a carrier (22), one of the sun gear and the carrier is selectively connected to a first shaft (1) which constitutes the output means via a first clutch (C-1), the other is selectively connected to a second shaft (2) which constitutes the output means via a second clutch, and is selectively connected to the ring gear via a third clutch (C-D), and the ring gear is always connected to the output shaft (3C).

Further, in the structure mentioned above the structure can be also made such that a third clutch (C-D) which selectively connects at least two elements of the planetary gear is provided, the planetary gear is a double planetary gear including three elements which are a sun gear (21), a ring gear (23) and a carrier (22), one of the sun gear and the carrier is always connected to a first shaft (1) which constitutes the output means, and is selectively connected to an output shaft (3C) via a first clutch (C-1), the other is always connected to a second shaft (2) which constitutes the output means, and is selectively connected to the output shaft (3C) via a second clutch (C-2), and the ring gear is selectively connected to the output shaft (3C) via a third clutch.

Further the structure mentioned above can be made such that the main transmission achieves a first shift speed by engaging the first clutch, achieves a second shift speed by engaging the second clutch, and achieves an intermediate shift speed between the first shift speed and the second shift speed by engaging the third clutch.

Further, in the structure mentioned above it is possible to employ a structure made such that the main transmission achieves a first shift speed by engaging the first clutch and the third clutch, achieves a second shift speed by engaging the second clutch and the third clutch, and achieves an intermediate shift speed between the first shift speed and the second shift speed by engaging the first clutch and the second clutch.

Further the structure mentioned above can be made such that the main transmission has gears (13, 17) which can selectively achieve a first shift speed and a third shift speed whose shift ratio is smaller than that of a second shift speed respectively on the first shaft so as to serve as rotating elements, has gears (11, 15) which can selectively achieve a second shift speed and a fourth shift speed whose shift ratio is larger than that of the third shift speed respectively on the second shaft, and achieves seven forward speeds by achieving a fist intermediate shift speed between the first shift speed and the second shift speed, a second intermediate shift speed between the second shift speed and the third shift speed, and a third intermediate shift speed between the third shift speed and the fourth shift speed.

Further, in the structure mentioned above it is effective to employ the structure made such that the main transmission further has a reverse gear (19) for achieving a reverse state, and achieves a reverse shift speed by bringing the main transmission into a reverse state and engaging any one of the first to third clutches.

Further the structure mentioned above can be made such that the main transmission further has a reverse gear (19) for achieving a reverse state, and achieves a reverse shift speed by bringing the main transmission into a reverse state and engaging any two of the first to third clutches.

Further the structure mentioned above can be made such that a brake (B-1) which can engage the ring gear is further provided, and a reverse shift speed is achieved by engaging the brake and the second clutch (C-2) and setting the main transmission to the second shift speed.

Further the structure mentioned above can be made such that a brake (B-1) which can engage the ring gear is further provided, and a reverse shift speed is achieved by engaging the brake and the first clutch (C-1) and setting the main transmission to the first shift speed.

Further the structure mentioned above can be made such that a brake which can engage one of the sun gear and the ring gear is further provided, the brake and the clutch for carrier input are engaged, and a shift speed of the gear on the shaft which is connected to the other of the sun gear and the ring gear is achieved, whereby a shift speed which is accelerated from the shift speed is achieved.

Further the structure mentioned above can be made such that a brake (B-1) which can engage one of the sun gear and the carrier is further provided, the brake and the clutch (C-3) for ring gear input are engaged, and a shift speed of the shaft which is connected to the other of the sun gear and the carrier is achieved, whereby a shift speed which is accelerated from the shift speed is achieved.

Further the structure mentioned above can be made such that a brake which can engage one of the sun gear and the ring gear is further provided, the brake and the clutch for connecting the other of the sun gear and the ring gear to the main transmission are engaged, and a shift speed of the shaft which is connected to the ring gear is achieved, whereby a shift speed which is accelerated from the shift speed is achieved.

Further the structure mentioned above can be made such that a brake which can engage one of the sun gear and the carrier is further provided, the brake and the clutch for connecting the other of the sun gear and the carrier to the main transmission are engaged, and a shift speed of the shaft which is connected to the sun gear is achieved, whereby a shift speed which is accelerated from the shift speed is achieved.

Further the structure mentioned above can be made such that the main transmission has gears on the output shaft, the gears forming pairs with the gear on the first shaft and the gear on the second shaft, respectively, one of the gears forming pairs is always connected to the shaft, and the other can be selectively connected to the shaft via a dog clutch.

Further the structure mentioned above can be made such that the main transmission has gears on the output shaft, the gears forming pairs with the gear on the first shaft and the gear on the second shaft, respectively, one of the gears forming pairs is always connected to the shaft, and the other can be selectively connected to the shaft via a multi-plate clutch.

Further the structure mentioned above can be made such that the main transmission has gears on the output shaft, the gears forming pairs with the gear on the first shaft and the gear on the second shaft, respectively one of the gears forming pairs is connected to the shaft via a planetary gear mechanism which can generate a direct rotation and a speed-change rotation.

According to the structure of the invention, it is possible to simultaneously execute the power transmission using the speed-changing elements for two different shift speeds via the planetary gear. Accordingly, it is possible to generate an intermediate shift speed between the respective shift speeds, in combination with the shift speeds which can be achieved in the main transmission. Therefore, it is possible to realize a compact transmission which has multiple speeds with no additional speed-changing elements by utilizing the generation of an intermediate shift speed. Further, since shifting can be executed while power is transmitted by generating an intermediate shift speed, smooth vehicle acceleration can be executed by the shifting without any torque escape.

Further, it is possible to realize a transmission for the vehicle which can achieve the effect mentioned above, by using a conventional manual transmission as the main transmission, and by generating the parallel power transmission flow passing through the different speed-changing elements on the basis of a gear train structure of a conventional manual transmission.

Further, it is possible to execute the control of the main transmission by the same control mechanism as that of an automatic transmission without using a dog clutch, by generating the parallel power transmission flow passing through the different speed-changing elements in the main transmission by means of the planetary gear.

Particularly, in the case where the planetary gear is arranged on the output side of the main transmission, since a gear ratio of the generated intermediate shift speed is always close to a gear ratio on a higher shift speed side, and it is possible to make setting such that a gear ratio step becomes smaller toward a higher shift speed, it is possible to realize a transmission which is suitable particularly for vehicle running.

BRIEF DESCRIPTION OF THE DRAWINGS

FIG. 12 is a table of operations of the gear train according to the second embodiment;

FIG. 13 is a speed diagram of the gear train according to the second embodiment;

FIG. 14 is a schematic view showing a first modified embodiment of a planetary portion in the gear train according to the second embodiment;

FIG. 27 is a schematic view showing a seventh modified embodiment of the planetary portion;

FIG. 28 is a schematic view showing an eighth modified embodiment of the planetary portion;

FIG. 29 is a table of operations of a gear train according to a third embodiment;

FIG. 86 is a speed diagram of the gear train according to the nineteenth embodiment;

FIG. 87 is a table of operations of the gear train according to the fifteenth embodiment in the case of jumping shifting;

FIG. 88 is a speed diagram of the gear train according to the fifteenth embodiment in the case of jumping shifting;

DETAILED DESCRIPTION OF EXEMPLARY EMBODIMENTS

Figure 1:
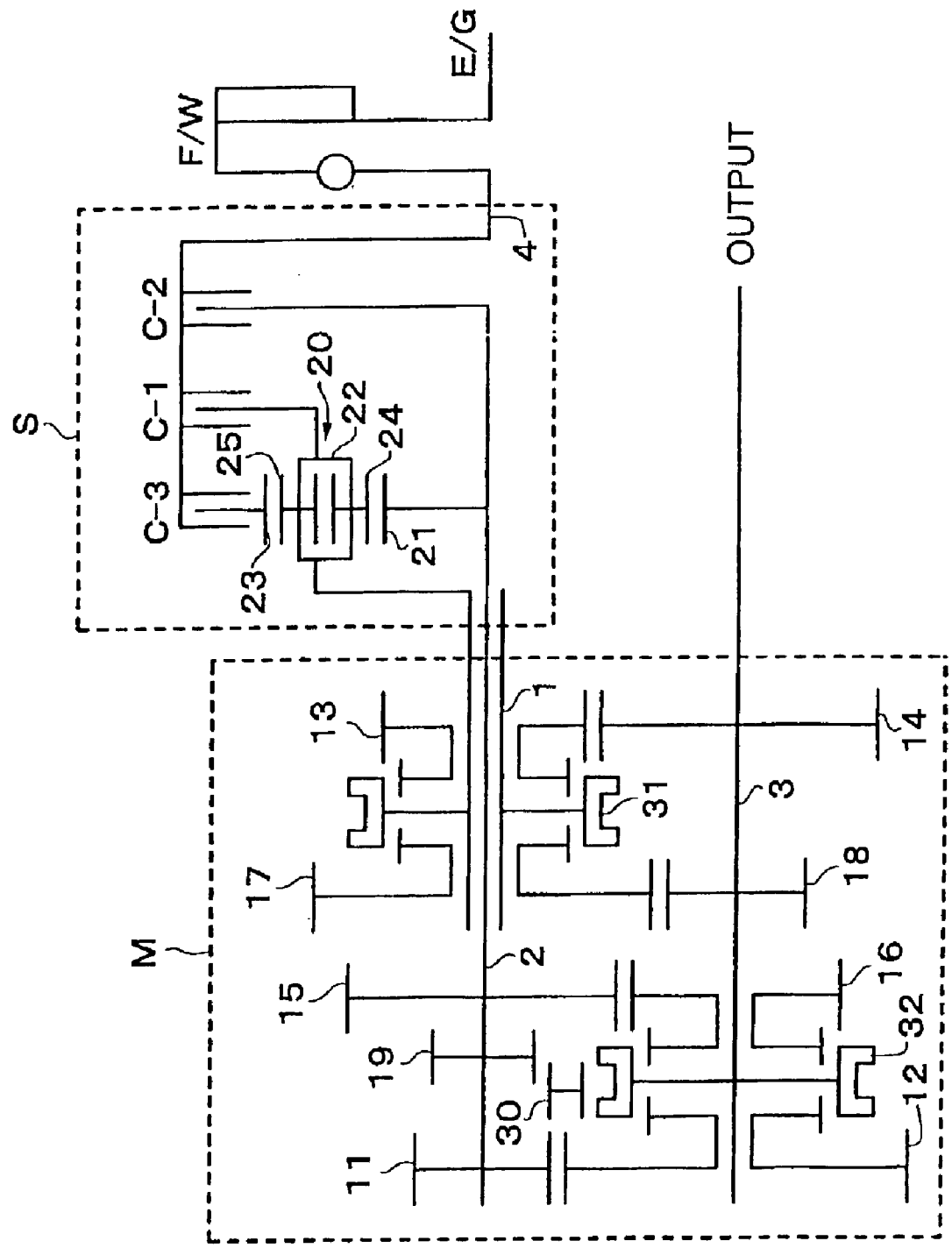
FIG. 1 is a schematic view showing a gear train of a transmission for a vehicle according to a first embodiment to which the present invention is applied.
Figures 2, 3:
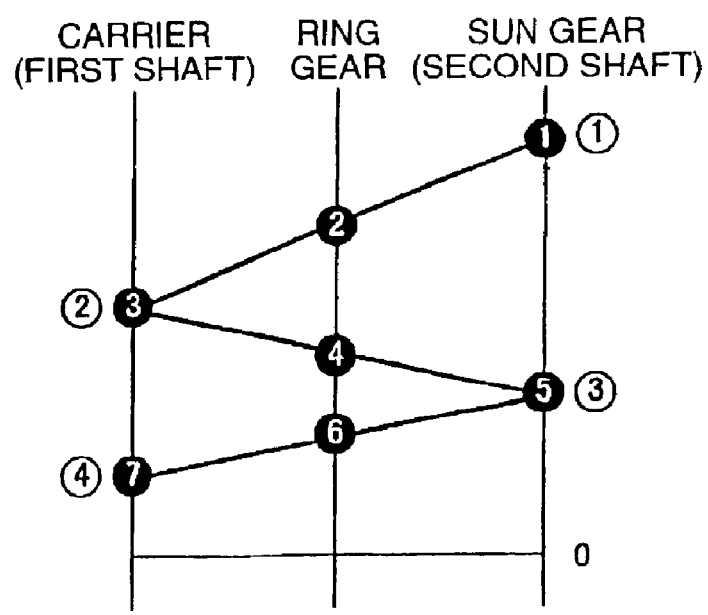
FIG. 2 is a table of operations of the gear train according to the first embodiment.
FIG. 3 is a speed diagram of the gear train according to the first embodiment.

A description of the embodiments will be given below according to the invention with reference to the accompanying drawings. FIGS. 1 to 3 show a first embodiment of a transmission for a vehicle according to the present invention. FIG. 1 is a schematic view showing a gear train structure. As shown in FIG. 1, the transmission is basically constructed so as to include a main transmission M (which is referred to as an M/T portion in the description of the embodiment) which has a plurality of rotating elements 11 to 18, and achieves a plurality of shift speeds by selecting parallel power transmission flows passing through the rotating elements, a differential gear mechanism S (which is referred to as a planetary portion in the same manner) which includes a planetary gear 20, and a first shaft 1 and a second shaft 2 serving as connecting means which connect two elements 21 and 22 in the planetary portion S to the different rotating elements in the M/T portion M.

In this first embodiment, the M/T portion M includes a plurality of constant-mesh type gear pairs 11 to 18 as the rotating elements, and has two dog clutches 31 and 32 which select the power transmission flow passing through the rotating elements. This M/T portion M is constructed such that a first shaft 1 and a second shaft 2, which constitute an inside and outside double shaft, are input shafts for connecting to a planetary portion S, and power is transmitted between parallel shafts, that is, from gears serving as the rotating elements, that is, respective drive gears 11, 13, 15 and 17 on the input shafts to respective driven gears 12, 14, 16 and 18 on an output shaft 3. The drive gears 13 and 17 for a second speed and a fourth speed on the first shaft 1 are rotatably supported to the first shaft 1, and can be selectively connected to the first shaft 1 on the basis of an axial movement of the dog clutch 31 arranged therebetween. The respective driven gears 14 and 18 which form pairs with the drive gears 13 and 17 for the second speed and the fourth speed are connected to the output shaft 3 in such a manner as to be capable of integrally rotating. The drive gears 11 and 15 for a first speed and a third speed on the second shaft 2 and a drive gear 19 for a reverse movement are connected to the second shaft 2 in such a manner as to be capable of integrally rotating. The respective driven gears 12 and 16 which form pairs with the drive gears 11 and 15 for the first speed and the third speed are rotatably supported onto the output shaft 3, and can be selectively connected to the output shaft 3 on the basis of an axial movement of the dog clutch 32 arranged therebetween. Further, the drive gear 19 for the reverse movement and a driven gear for a reverse movement constituted by an outer peripheral gear tooth of the dog clutch 32 are engaged with each other via a counter gear 30, thereby making it possible to execute power transmission passing through the reverse gear trains 19, 30 and 32 at a neutral position of the dog clutch 32.

The planetary gear 20 of the planetary portion S is constructed to have a double pinion structure, and has a sun gear 21, a ring gear 23 and pinions 24 and 25 which are individually engaged with the sun gear 21 and the ring gear 23 and engaged with each other. The sun gear 21 of the planetary gear 20 is always connected to the second shaft 2, the second shaft 2 can be connected to the input shaft 4 via a second clutch (C-2) which constitutes one of the first input means, and a carrier 22 supporting the pinions 24 and 25 is always connected to the first shaft 1 and can be connected to the input shaft 4 via a first clutch (C-1) which constitutes the other of the first input means. The ring gear 23 can be connected to the input shaft 4 via a third clutch (C-3) which constitutes a part of the second input means. Further, the input shaft 4 of the planetary portion S is connected to a flywheel damper (F/W) of an engine (E/G).

The transmission having the structure mentioned above achieves a first speed (1st) by connecting the first gear pair 11 and 12 of the M/T portion M (hereinafter, in the description of this first embodiment, the first gear pair is briefly denoted by reference symbol (1)) to the output shaft 3 by means of the dog clutch 32 and engaging the second clutch (C-2) of the planetary portion S. The operation thereof is shown in the form of a table in FIG. 2. In this state, a rotation of the engine (E/G) is input to the drive gear 11 of the M/T portion M from the second shaft 2 via the second clutch (C-2) of the planetary portion S, is reduced in speed by the first gear pair (1), and is transmitted to the output shaft 3 via the dog clutch 32. A shift ratio at this time becomes a shift ratio of the first speed which depends on a gear ratio of the first gear pair (1) and becomes a lowest shift speed of this transmission.

Next, a second speed (2nd) is achieved by connecting the first gear pair (1) of the M/T portion M to the output shaft 3 by means of the dog clutch 32, connecting the second gear pair 13 and 14 (which is briefly denoted by reference symbol (2) in the same manner) to the output shaft 3 by means of the dog clutch 31, and engaging the third clutch (C-3) of the planetary portion S. When this state is generated in a 1-2 shifting in which a previous shift speed is the first speed, both of the first gear pair (1) and the second gear pair (2) are connected to the output shaft 3 by the engagement of both of the dog clutches 31 and 32, whereby an intermediate gear ratio between the gear ratio of the first gear pair (1) and the gear ratio of the second gear pair (2) is generated between the second shaft 2 and the first shaft 1 which are connected to the drive gear 11 of the first gear pair (1) and the drive gear 13 of the second gear pair (2), and a rotation relation between the sun gear 21 of the planetary gear 20 connected to the second shaft 2 and the carrier 22 connected to the first shaft 1 is determined. If this state is generated while running at the first speed, the rotation of the sun gear 21 is a rotation which is equivalent to the engine rotation. However, the rotation of the carrier 22 becomes a rotation which is reduced in speed therefrom, and the ring gear 23 is regulated by these rotations and is idling. In this state, the second clutch (C-2) is disengaged and the third clutch (C-3) is engaged in turn, and the engine rotation is input to the ring gear 23 which is idling, whereby there are generated torque transmission from the ring gear 23 to the carrier 22 in accordance with the previously generated intermediate gear ratio and torque transmission from the ring gear 23 to the sun gear 21 via the carrier 22 in a parallel manner, and the torque is transmitted to the output shaft 3 via both of the gear pairs (1) and (2) through the first shaft 1 and the second shaft 2. Accordingly, the second shift speed is achieved.

A third speed (3rd) is achieved by connecting the second gear pair (2) of the M/T portion M to the output shaft 3 by means of the dog clutch 31, and engaging the first clutch (C-1) of the planetary portion S. In this state, the rotation of the engine (E/G) is input to the carrier 22 via the first clutch (C-1), and the rotation is transmitted to the second gear pair (2) via the dog clutch 31, and is reduced in speed in accordance with the gear ratio of the second gear pair (2) so as to be transmitted to the output shaft 3.

A fourth speed (4th) is achieved by connecting the second gear pair (2) of the M/T portion M to the output shaft 3 by means of the dog clutch 31, connecting the third gear pair 15 and 16 (which is briefly denoted by reference symbol (3) in the same manner) to the output shaft 3 by means of the dog clutch 32, and engaging the third clutch (C-3) of the planetary portion S. When this state is generated in a 3-4 shifting in which a previous shift speed is the third speed, both of the second gear pair (2) and the third gear pair (3) are connected to the output shaft 3 by the engagement of both of the dog clutches 31 and 32, whereby an intermediate gear ratio between the gear ratio of the second gear pair (2) and the gear ratio of the third gear pair (3) is generated between the second shaft 2 and the first shaft 1 which are connected to the drive gear 13 of the second gear pair (2) and the drive gear 15 of the third gear pair (3), and a rotation relation between the sun gear 21 of the planetary gear 20 connected to the second shaft 2 and the carrier 22 connected to the first shaft 1 is determined. If this state is generated while running at the third speed, the rotation of the carrier 22 is a rotation which is equivalent to the engine rotation. However, the rotation of the sun gear 21 becomes a rotation which is increased in speed therefrom, and the ring gear 23 is regulated by these rotations and is idling. In this state, the first clutch (C-1) is disengaged and the third clutch (C-3) is engaged in turn, and the engine rotation is input to the ring gear 23 which is idling, whereby there are generated torque transmission from the ring gear 23 to the carrier 22 in accordance with the previously generated intermediate gear ratio and torque transmission from the ring gear 23 to the sun gear 21 via the carrier 22 in a parallel manner, and the torque is transmitted to the output shaft 3 via both of the gear pairs (2) and (3) through the first shaft 1 and the second shaft 2. Accordingly, the fourth shift speed is achieved.

A fifth speed (5th) is achieved by connecting the third gear pair (3) of the M/T portion M to the output shaft 3 by means of the dog clutch 32, and engaging the second clutch (C-2) of the planetary portion S. In this state, the rotation of the engine (E/G) is input to the second shaft 2 via the second clutch (C-2), and the rotation is transmitted to the third gear pair (3), and is increased in speed in accordance with the gear ratio of the third gear pair (3) so as to be transmitted to the output shaft 3 via the dog clutch 32.

A sixth speed (6th) is achieved by connecting the third gear pair (3) of the M/T portion M to the output shaft 3 by means of the dog clutch 32, connecting the fourth gear pair 17 and 18 (which is briefly denoted by reference symbol (4) in the same manner) to the output shaft 3 by means of the dog clutch 31, and engaging the third clutch (C-3) of the planetary portion S. When this state is generated in a 5-6 shifting in which a previous shift speed is the fifth speed, both of the third gear pair (3) and the fourth gear pair (4) are connected to the output shaft 3 by the engagement of both of the dog clutches 31 and 32, whereby an intermediate gear ratio between the gear ratio of the third gear pair (3) and the gear ratio of the fourth gear pair (4) is generated between the second shaft 2 and the first shaft 1 which are connected to the drive gear 15 of the third gear pair (3) and the drive gear 17 of the fourth gear pair (4), and a rotation relation between the sun gear 21 of the planetary gear 20 connected to the second shaft 2 and the carrier 22 connected to the first shaft 1 is determined. If this state is generated while running at the fifth speed, the rotation of the carrier 22 is a rotation which is equivalent to the engine rotation. However, the rotation of the sun gear 21 becomes a rotation which is increased in speed therefrom, and the ring gear 23 is regulated by these rotations and is idling. In this state, the second clutch (C-2) is disengaged and the third clutch (C-3) is engaged in turn, and the engine rotation is input to the ring gear 23 which is idling, whereby there are generated torque transmission from the ring gear 23 to the carrier 22 in accordance with the previously generated intermediate gear ratio and torque transmission from the ring gear 23 to the sun gear 21 via the carrier 22 in a parallel manner, and the torque is transmitted to the output shaft 3 via both of the gear pairs (3) and (4) through the first shaft 1 and the second shaft 2. Accordingly, the sixth shift speed is achieved.

A seventh speed (7th) is achieved by connecting the fourth gear pair (4) of the M/T portion M to the output shaft 3 by means of the dog clutch 32, and engaging the first clutch (C-1) of the planetary portion S. In this state, the rotation of the engine (E/G) is input to the first shaft 1 via the first clutch (C-1), and the rotation is transmitted to the fourth gear pair (4) via the dog clutch 31, and is increased in speed in accordance with the gear ratio of the fourth gear pair (4) so as to be transmitted to the output shaft.

In this case, a reverse shift speed (Rev) is achieved by making the dog clutch 32 of the M/T portion M neutral, connecting reverse gear trains 19 and 30 to the output shaft 3, and engaging the second clutch (C-2) of the planetary portion S. In this state, the rotation of the engine (E/G) is input to the second shaft 2 via the second clutch (C-2). The rotation is reduced in speed by means of the reverse gear trains 19 and 30, is reversed with respect to the rotations at the above-mentioned shift speeds, and is transmitted to the output shaft 3 via the counter gear 30.

As is evident from the processes for achieving the respective shift speeds mentioned above, the respective odd shift speeds are achieved by using the speed-changing elements of the planetary gear 20 as simple power transmission members which are not involved in the shifting, that is, power passing members. On the other hand, the respective even shift speeds are achieved by making the speed-changing elements of the planetary gear 20 function. Further, each of these even shift speeds is achieved by simultaneously connecting two gear pairs which are connected at a time of achieving the odd shift speeds sandwiching the even shift speed therebetween.

Motions of three speed-changing elements of the planetary gear 20 in the respective shift speeds achieved in the manner mentioned above are shown in the form of a speed diagram in FIG. 3. The notation system of this speed diagram is different from that of an ordinary diagram in which a shift characteristic is shown with reference to an input rotation number of a general automatic transmission (a speed ratio 1). The speed ratios of the sun gear, the ring gear and the carrier corresponding to the respective speed-changing elements are described based on the output rotation number transmitted to the output shaft 3 (the speed ratio 1) using a white numeral on a black circle background which indicates the shift speed. These speed ratios are equivalent to the speed ratios of the engine rotation numbers. In this case, the fact that the engine speed ratio is highest in the first speed means that the speed reduction ratio of the transmission is largest with respect to the engine rotation. Further, the numerals surrounded by circles indicate the first to fourth gear pairs of the M/T portion M which are connected in the respective shift speeds.

As is evident from the speed diagram, the even shift speeds correspond to the gear ratios serving as the intermediate shift speeds with respect to the odd shift speeds which can be originally achieved by the first to fourth gear pairs (1) to (4) of the M/T portion M. The even shift speeds are achieved by simultaneously transmitting the power by means of the gear pairs achieving both of the adjacent even shift speeds, and also function as transit speeds for the adjacent odd shift speeds. Therefore, according to this transmission, it is possible to add the three shift speeds in the middle of the respective shift speeds in the conventional type of constant-mesh four speed transmission such that the number of the gear ratio steps is increased without increasing the gear pairs.

Figure 4:
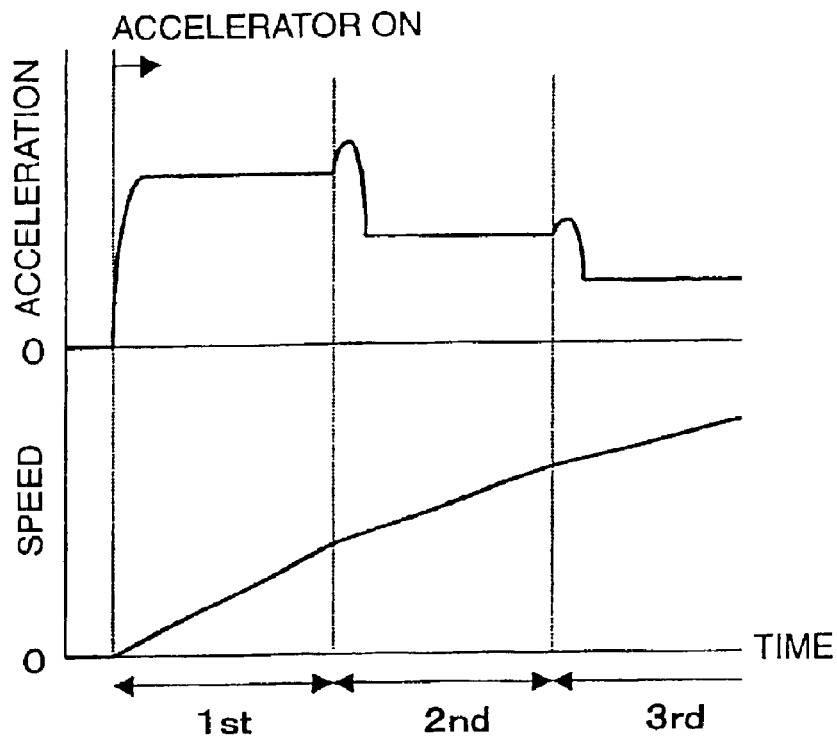
FIG. 4 is a time chart showing an acceleration characteristic obtained by the transmission for the vehicle according to the first embodiment.
Figure 5:
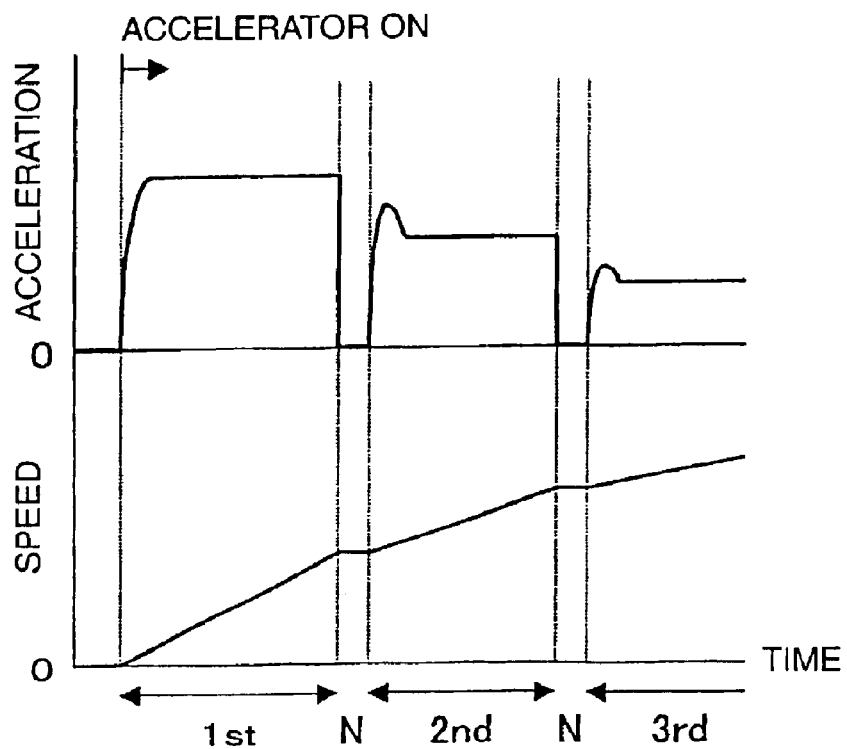
FIG. 5 is a time chart showing an acceleration characteristic obtained by a conventional automatic M/T.

FIGS. 4 and 5 show time charts of shifting at a time of accelerating the vehicle by means of the transmission according to the present embodiment and the conventional automatic M/T. In the conventional one shown in FIG. 5, a period having an acceleration zero caused by a torque escape at a time of passing through the neutral (N) is generated between the respective shift speeds (the period between the first speed (1st) and the third speed (3rd) is shown in the drawing), and a period during which speed increase is flat is generated due to coasting. On the other hand, in the structure according to the present embodiment, the neutral period does not exist during the shifting because the power transmitting state is maintained during shifting by a gear pair which has achieved the previous shift speed. Therefore, the period having the zero acceleration caused by the torque escape is not generated, and the speed increase becomes continuous and smooth. As a result, according to the transmission of the present embodiment, it is possible to prevent an uncomfortable feeling from being generated due to torque escape at a time of the shifting which is unavoidable in the manual transmission.

Figure 6:
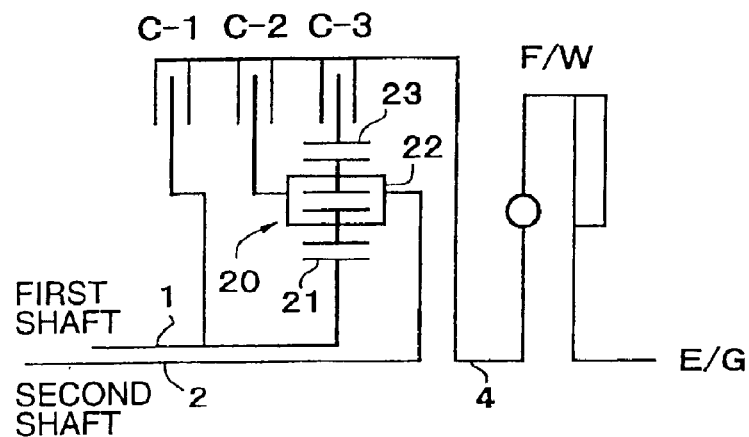
FIG. 6 is a schematic view showing a first modified embodiment of a planetary portion in the gear train according to the first embodiment.
Figure 7:
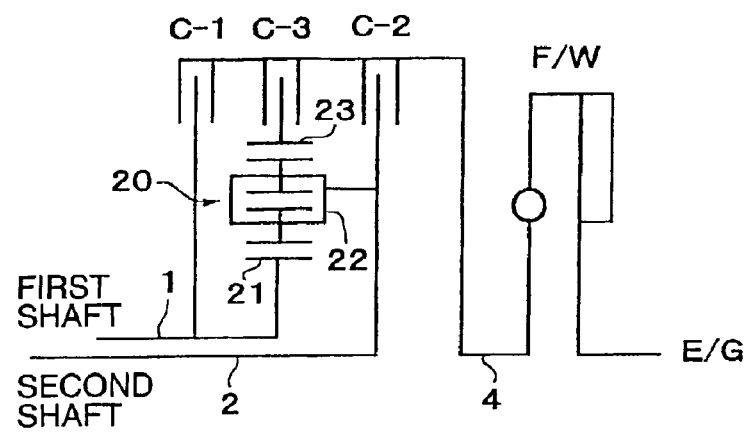
FIG. 7 is a schematic view showing a second modified embodiment of the planetary portion.
Figure 8:
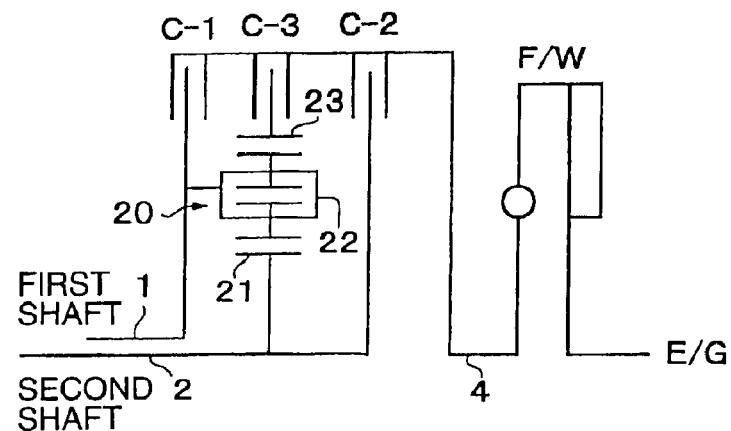
FIG. 8 is a schematic view showing a third modified embodiment of the planetary portion.

In this first embodiment, connection relations achieved by the connecting means (the first shaft 1 and the second shaft 2) in the planetary portion S and the M/T portion M and input means (the first clutch and the second clutch) can be variously changed. Next FIGS. 6 to 8 show such modified embodiments. A modified embodiment shown in FIG. 6 is an embodiment in which only connection relations of the sun gear 21 and the carrier 22 with respect to the first shaft 1 and the second shaft 2 are substantially changed as compared to the first embodiment. In this modified embodiment, the sun gear 21 is connected to the first shaft 1, and the carrier 22 is connected to the second shaft 2. Positions of the respective clutches are changed according to this modification. However, the connection relation achieved by them is not particularly changed. Further, a modified embodiment shown in FIG. 7 is an embodiment in which only the position of the second clutch (C-2) is changed as compared to the previous modified embodiment. A modified embodiment shown in FIG. 8 is an embodiment in which only the positions of the first clutch (C-1) and the third clutch (C-3) are exchanged and no connection relation is changed as compared to the first embodiment.

Figure 9:
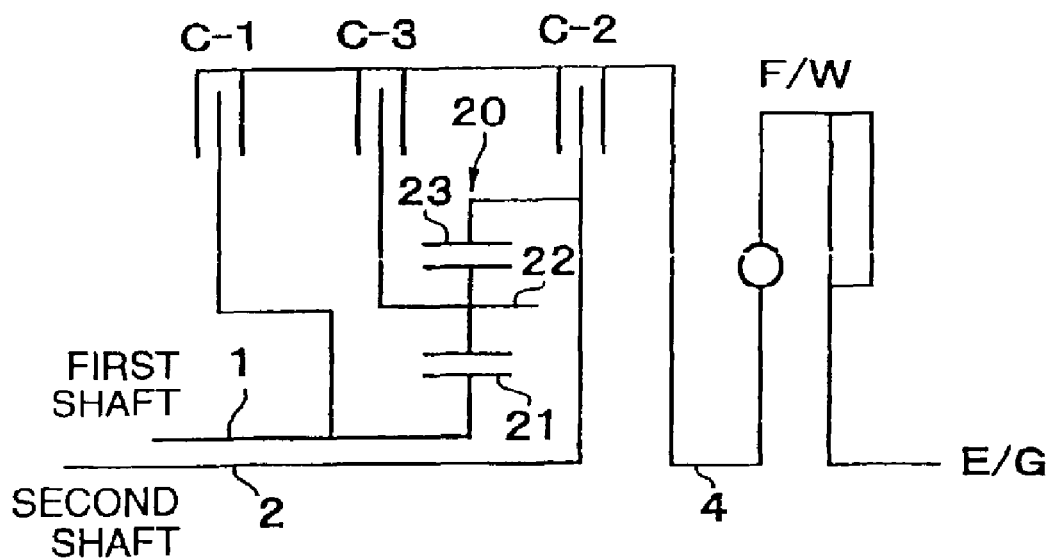
FIG. 9 is a schematic view showing a fourth modified embodiment of the planetary portion.
Figure 10:
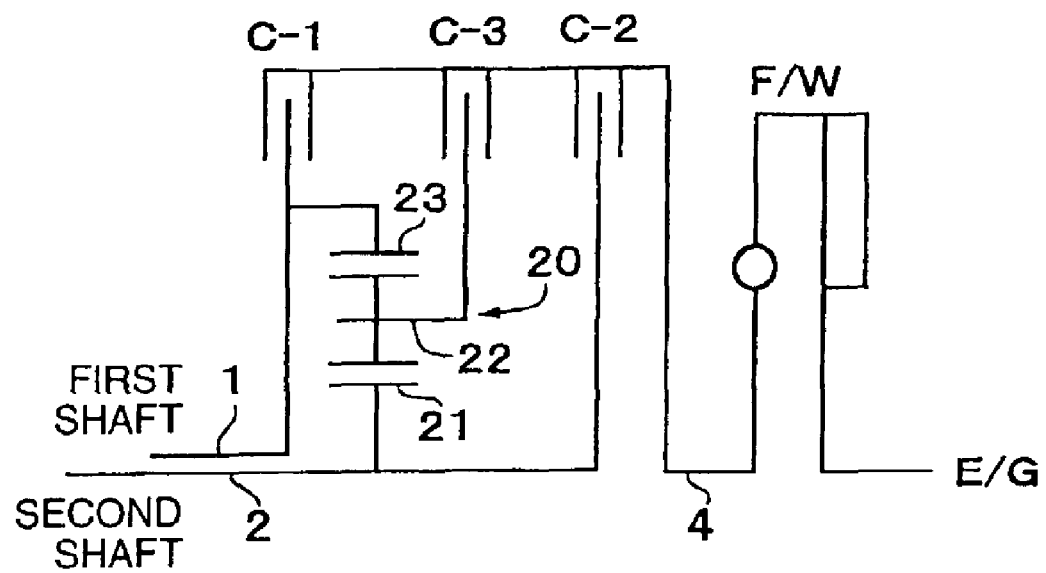
FIG. 10 is a schematic view showing a fifth modified embodiment of the planetary portion.

Further, in the first embodiment, the planetary portion S is constructed to have the double planetary structure. However, it is possible to change the planetary portion to have a single planetary structure. FIGS. 9 and 10 show such modified embodiments. A modified embodiment shown in FIG. 9 is an embodiment in which the sun gear in the single planetary gear 20 is connected to the first shaft 1 of the sun gear 21, and can be connected to the input shaft 4 via the first clutch (C-1), the ring gear 23 is connected to the second shaft 2, and can be connected to the input shaft 4 via the second clutch (C-2), and the carrier 22 can be connected to the input shaft 4 via the third clutch (C-3). Further, a modified embodiment shown in FIG. 10 is an embodiment in which the sun gear in the single planetary gear 20 is connected to the second shaft 2 of the sun gear 21, and can be connected to the input shaft 4 via the second clutch (C-2), the ring gear 23 is connected to the first shaft 1, and can be connected to the input shaft 4 via the first clutch (C-1), and the carrier 22 can be connected to the input shaft 4 via the third clutch (C-3).

Figure 11:
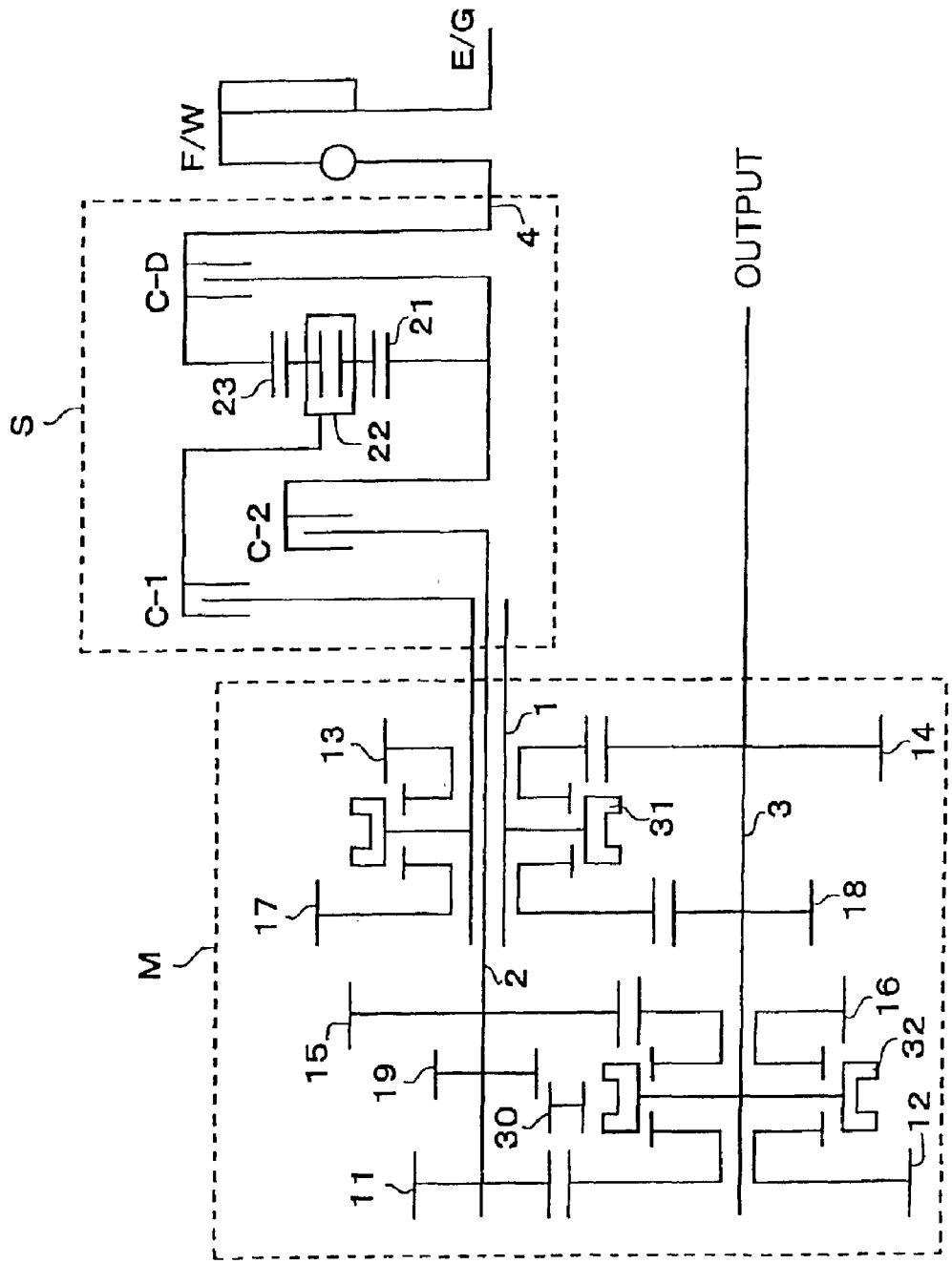
FIG. 11 is a schematic view showing a gear train of a transmission for a vehicle according to a second embodiment.

Next, FIGS. 11 to 13 show a second embodiment according to the invention. This embodiment is an embodiment in which the structure of the planetary portion S is changed as compared to the first embodiment. The schematic view of the gear train is shown in FIG. 11. In this embodiment, the carrier 22 in the planetary gear 20 of the planetary portion S can be connected to the first shaft 1 via the first clutch (C-1), the sun gear 21 can be connected to the second shaft 2 via the second clutch (C-2), and can be connected to the input shaft 4 via the third clutch (C-D), and the ring gear 23 is always connected to the input shaft 4. The third clutch (C-D) in this embodiment constitutes a direct clutch which connects the sun gear 21 and the ring gear 23 in the planetary gear 20, unlike in the first embodiment and the modified embodiment thereof.

The transmission having the structure mentioned above achieves a first speed (1st) by connecting the first gear pair 11 and 12 of the M/T portion M (hereinafter, also in the description of this embodiment, the first gear pair is briefly denoted by reference symbol (1)) to the output shaft 3 by means of the dog clutch 32 and engaging the direct clutch (C-D) of the planetary portion S, thereby integrally rotating the planetary gear 20 and engaging the second clutch (C-2). The operation thereof is shown in the form of a table in FIG. 12. In this state, a rotation of the engine (E/G) is input to the drive gear 11 of the M/T portion M from the second shaft 2 via the direct clutch (C-D) and the second clutch (C-2) of the planetary portion S, is reduced in speed by the first gear pair (1), and is transmitted to the output shaft 3 via the dog clutch 32. A shift ratio at this time becomes a shift ratio of the first speed which depends on a gear ratio of the first gear pair (1) and becomes a lowest shift speed of this transmission.

Next, a second speed (2nd) is achieved by connecting the first gear pair (1) of the M/T portion M to the output shaft 3 by means of the dog clutch 32, connecting the second gear pair 13 and 14 (which is briefly denoted by reference symbol (2) in the same manner) to the output shaft 3 by means of the dog clutch 31, and engaging the first clutch (C-1) and the second clutch (C-2) of the planetary portion S. When this state is generated in 1-2 shifting in which a previous shift speed is the first speed, both of the first gear pair (1) and the second gear pair (2) are connected to the output shaft 3 by the engagement of both of the dog clutches 31 and 32, whereby an intermediate gear ratio between the gear ratio of the first gear pair (1) and the gear ratio of the second gear pair (2) is generated between the second shaft 2 and the first shaft 1 which are connected to the drive gear 11 of the first gear pair (1) and the drive gear 13 of the second gear pair (2), and a rotation relation between the sun gear 21 of the planetary gear 20 connected to the second shaft 2 and the carrier 22 connected to the first shaft 1 is determined. If this state is generated while running at the first speed, the rotations of the sun gear 21, the carrier 22 and the ring gear 23 are all a rotation which is equivalent to the engine rotation because the planetary gear 20 is in the direct connection state. In this state, the direct clutch (C-D) is disengaged and the first clutch (C-1) is engaged in turn, and the sun gear 21 is allowed to be idling, whereby there are generated torque transmission from the ring gear 23 to the carrier 22 in accordance with the previously generated intermediate gear ratio and torque transmission from the ring gear 23 to the sun gear 21 via the carrier 22 in a parallel manner, and the torque is transmitted to the output shaft 3 via both of the gear pairs (1) and (2) through the first shaft 1 and the second shaft. Accordingly, the second shift speed is achieved.

A third speed (3rd) is achieved by connecting the second gear pair (2) of the M/T portion M to the output shaft 3 by means of the dog clutch 31, and engaging the first clutch (C-1) and the direct clutch (C-D) of the planetary portion S. In this state, the rotation of the engine (E/G) is input to the first shaft 1 via the first clutch (C-1) from the carrier 22, and the rotation is transmitted to the second gear pair (2) via the dog clutch 31, and is reduced in speed in accordance with the gear ratio of the second gear pair (2) so as to be transmitted to the output shaft 3.

A fourth speed (4th) is achieved by connecting the second gear pair (2) of the M/T portion M to the output shaft 3 by means of the dog clutch 31, connecting the third gear pair 15 and 16 (which is briefly denoted by reference symbol (3) in the same manner) to the output shaft 3 by means of the dog clutch 32, and engaging the first clutch (C-1) and the second clutch (C-2) of the planetary portion S. When this state is generated in 3-4 shifting in which a previous shift speed is the third speed, both of the second gear pair (2) and the third gear pair (3) are connected to the output shaft 3 by the engagement of both of the dog clutches 31 and 32, whereby an intermediate gear ratio between the gear ratio of the second gear pair (2) and the gear ratio of the third gear pair (3) is generated between the second shaft 2 and the first shaft 1 which are connected to the drive gear 13 of the second gear pair (2) and the drive gear 15 of the third gear pair (3), and a rotation relation between the sun gear 21 of the planetary gear 20 connected to the second shaft 2 and the carrier 22 connected to the first shaft 1 is determined. If this state is generated while running at the third speed, the rotations of the sun gear 21, the carrier 22 and the ring gear 23 are all equivalent to the engine rotation because the planetary gear 20 is in the direct connection state. In this state, the direct clutch (C-D) is disengaged and the second clutch (C-2) is engaged in turn, and the direct connection state of the planetary gear 20 is canceled, whereby there are generated torque transmission from the ring gear 23 to the carrier 22 in accordance with the previously generated intermediate gear ratio and torque transmission from the ring gear 23 to the sun gear 21 via the carrier 22 in a parallel manner, and the torque is transmitted to the output shaft 3 via both of the gear pairs (2) and (3) through the first shaft 1 and the second shaft 2. Accordingly, the fourth shift speed is achieved.

A fifth speed (5th) is achieved by connecting the third gear pair (3) of the M/T portion M to the output shaft 3 by means of the dog clutch 32, and engaging the second clutch (C-2) and the direct clutch (C-D) of the planetary portion S. In this state, the rotation of the engine (E/G) is input to the second shaft 2 via the direct clutch (C-D) and the second clutch (C-2), and the rotation is transmitted to the third gear pair (3), and is increased in speed in accordance with the gear ratio of the third gear pair (3) so as to be transmitted to the output shaft 3 via the dog clutch 32.

A sixth speed (6th) is achieved by connecting the third gear pair (3) of the M/T portion M to the output shaft 3 by means of the dog clutch 32, connecting the fourth gear pair 17 and 18 (which is briefly denoted by reference symbol (4) in the same manner) to the output shaft 3 by means of the dog clutch 31, and engaging the first clutch (C-1) and the second clutch (C-2) of the planetary portion S. When this state is generated in 5-6 shifting in which a previous shift speed is the fifth speed, both of the third gear pair (3) and the fourth gear pair (4) are connected to the output shaft 3 by the engagement of both of the dog clutches 31 and 32, whereby an intermediate gear ratio between the gear ratio of the third gear pair (3) and the gear ratio of the fourth gear pair (4) is generated between the second shaft 2 and the first shaft 1 which are connected to the drive gear 15 of the third gear pair (3) and the drive gear 17 of the fourth gear pair (4), and a rotation relation between the sun gear 21 of the planetary gear 20 connected to the second shaft 2 and the carrier 22 connected to the first shaft 1 is determined. If this state is generated while running at the fifth speed, the rotations of the sun gear 21, the carrier 22 and the ring gear 23 are all equivalent to the engine rotation because the planetary gear 20 is in the direct connection state. In this state, the direct clutch (C-D) is disengaged and the first clutch (C-1) is engaged in turn, and the direct connection state of the planetary gear 20 is canceled, whereby there are generated torque transmission from the ring gear 23 to the carrier 22 in accordance with the previously generated intermediate gear ratio and torque transmission from the ring gear 23 to the sun gear 21 via the carrier 22 in a parallel manner, and the torque is transmitted to the output shaft 3 via both of the gear pairs (3) and (4) through the first shaft 1 and the second shaft. Accordingly, the sixth shift speed is achieved.

A seventh speed (7th) is achieved by connecting the fourth gear pair (4) of the M/T portion M to the output shaft 3 by means of the dog clutch 32, and engaging the first clutch (C-1) and the direct clutch (C-D) of the planetary portion S. In this state, the rotation of the engine (E/G) is input to the first shaft 1 via the first clutch (C-1), and the rotation is transmitted to the fourth gear pair (4) via the dog clutch 31, and is increased in speed in accordance with the gear ratio of the fourth gear pair (4) so as to be transmitted to the output shaft.

In this case, a reverse shift speed (Rev) is achieved by making the dog clutch 32 of the M/T portion M neutral, connecting reverse gear trains 19 and 30 to the output shaft 3, and engaging the second clutch (C-2) and the direct clutch (C-D) of the planetary portion S. In this state, the rotation of the engine (E/G) is input to the second shaft 2 via the second clutch (C-2). The rotation is reduced in speed by means of the reverse gear trains 19 and 30, is reversed with respect to the rotations at the above-mentioned shift speeds, and is transmitted to the output shaft 3 via the counter gear 30.

As is evident from the processes for achieving the respective shift speeds mentioned above, also in this second embodiment, the respective odd shift speeds are achieved by using the speed-changing elements of the planetary gear 20 as simple power transmission members which are not involved in the shifting. On the other hand, the respective even shift speeds are achieved by making the speed-changing elements of the planetary gear 20 function. Further, each of these even shift speeds is achieved by simultaneously connecting two gear pairs which are connected at a time of achieving the odd shift speeds sandwiching the even shift speed therebetween.

Motions of three speed-changing elements of the planetary gear 20 in the respective shift speeds achieved in the manner mentioned above are shown in the form of a speed diagram in FIG. 13. The notation system of this speed diagram is different from that of an ordinary diagram in which a shift characteristic is shown with reference to an input rotation number of a general automatic transmission (a speed ratio 1). The speed ratios of the sun gear, the ring gear and the carrier corresponding to the respective speed-changing elements are described based on the output rotation number transmitted to the output shaft 3 (the speed ratio 1) using a white numeral on a black circle background which indicates the shift speed. These speed ratios are equivalent to the speed ratios of the engine rotation numbers. In this case, the fact that the engine speed ratio is highest in the first speed means that the speed reduction ratio of the transmission is largest with respect to the engine rotation. Further, the numerals surrounded by circles indicate the first to fourth gear pairs of the M/T portion M which are connected in the respective shift speeds.

As is evident from the speed diagram, the even shift speeds correspond to the gear ratios serving as the intermediate shift speeds with respect to the odd shift speeds which can be originally achieved by the first to fourth gear pairs (1) to (4) of the M/T portion M. The even shift speeds are achieved by simultaneously transmitting the power by means of the gear pairs achieving both of the adjacent even shift speeds, and also function as transit speeds for the adjacent odd shift speeds. Therefore, according to the transmission of the second embodiment, it is also possible to add the three shift speeds in the middle of the respective shift speeds in the conventional type of constant-mesh four speed transmission such that the number of the gear ratio steps is increased without increasing the gear pairs.

With respect to the planetary portion employing the lockup system, various modifications can be made in the same manner as the first embodiment. A first modified embodiment shown in FIG. 14 is an embodiment in which connection relations of the carrier 22 and the sun gear 21 of the planetary gear 20 with respect to the first shaft 1 and the second shaft 2 are changed as compared to the second embodiment. That is, in this embodiment, the ring gear 23 is connected to the input shaft 4 and the direct clutch (C-D) directly connects the ring gear 23 and the sun gear 21 in the same manner. However, the sun gear 21 is connected to the first shaft 1 via the first clutch (C-1), and the carrier 22 is connected to the second shaft 2 via the second clutch (C-2).

Figure 15:
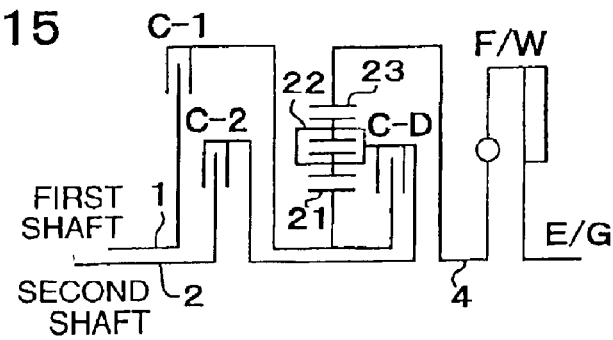
FIG. 15 is a schematic view showing a second modified embodiment of the planetary portion.
Figure 16:
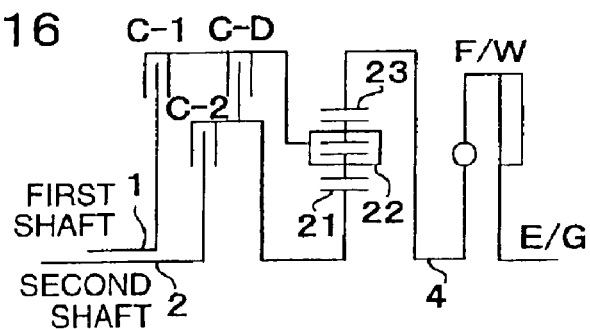
FIG. 16 is a schematic view showing a third modified embodiment of the planetary portion.
Figure 17:
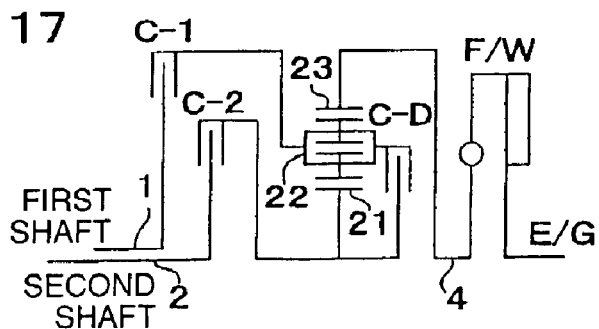
FIG. 17 is a schematic view showing a fourth modified embodiment of the planetary portion.

Next, a second modified embodiment shown in FIG. 15 is an embodiment in which a change is made such that the direct clutch (C-D) connects the carrier 22 and the sun gear 21 as compared to the previous first modified embodiment. Further, a third modified embodiment shown in FIG. 16 is an embodiment in which a change is made such that the direct clutch (C-D) connects the carrier 22 and the sun gear 21 as compared to the second embodiment. The direct clutch (C-D) in this case can be arranged in the front side of the planetary gear 20 as in a fourth modified embodiment shown in FIG. 17.

Figure 18:
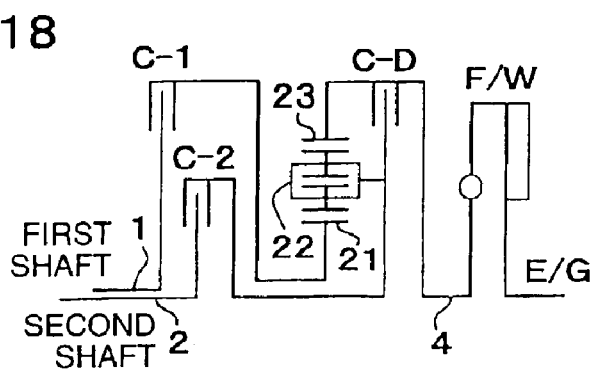
FIG. 18 is a schematic view showing a fifth modified embodiment of the planetary portion.
Figure 19:
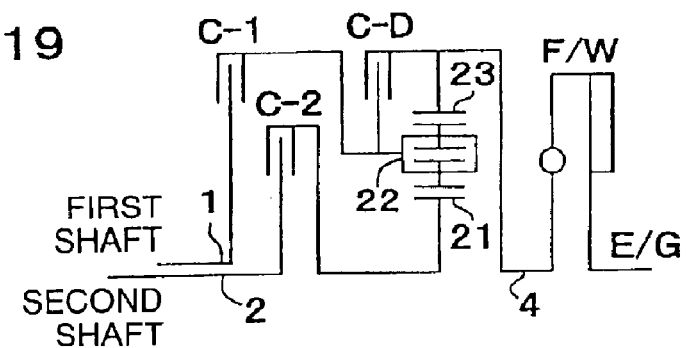
FIG. 19 is a schematic view showing a sixth modified embodiment of the planetary portion.
Figure 20:
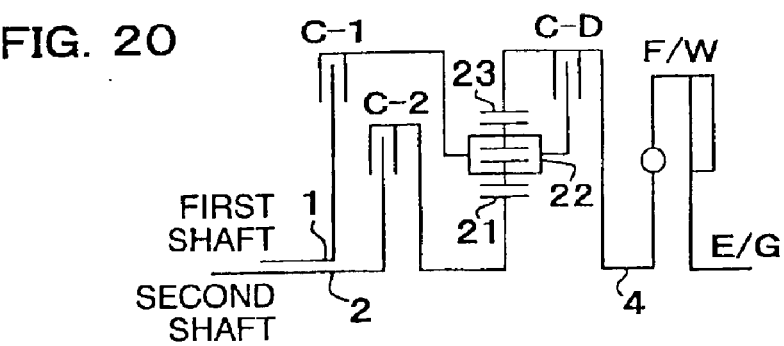
FIG. 20 is a schematic view showing a seventh modified embodiment of the planetary portion.

Further, a fifth modified embodiment shown in FIG. 18 is an embodiment in which a change is made such that the direct clutch (C-D) connects the ring gear 23 and the carrier 22 as compared to the first modified embodiment. Further, a sixth modified embodiment shown in FIG. 19 is an embodiment in which a change is made such that the direct clutch (C-D) connects the ring gear 23 and the carrier 22 as compared to the second embodiment. The direct clutch (C-D) in this case can be arranged in a front side of the planetary gear 20 as in a seventh modified embodiment shown in FIG. 20.

The respective modified embodiments mentioned above are the embodiments in which the connection relation of the planetary portion is changed as compared to the second embodiment. It is possible to variously change the connection relation in the same manner also in the case where the planetary gear 20 of the planetary portion is the single planetary. In this case, it is assumed that the carrier 22 is always connected to the input shaft 4.

Figure 21:
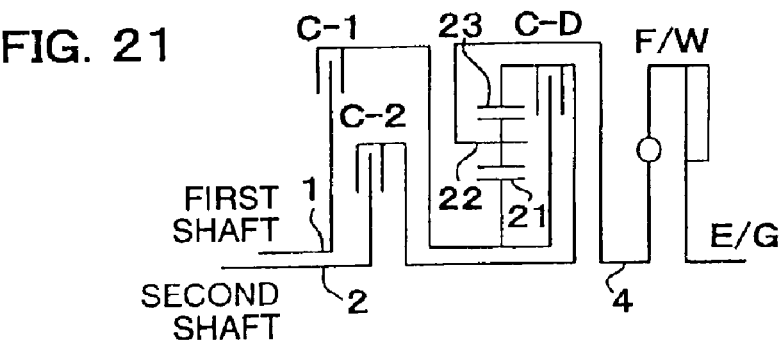
FIG. 21 is a schematic view showing a first modified embodiment in the case where the planetary portion in the gear train according to the second embodiment is constructed as a single planetary structure.
Figure 22:
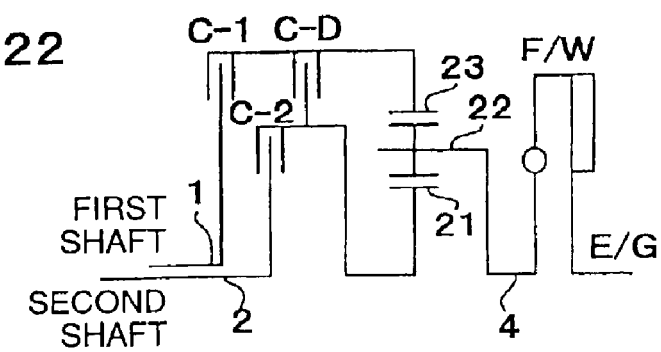
FIG. 22 is a schematic view showing a second modified embodiment of the planetary portion.

Further, an eighth modified embodiment shown in FIG. 21 is an embodiment in which the ring gear 23 and the sun gear 21 of the single planetary gear can be directly connected by the direct clutch (C-D). In this embodiment, the sun gear 21 can be connected to the first shaft 1 via the first clutch (C-1), and the ring gear 23 can be connected to the second shaft 2 via the second clutch (C-2). A ninth embodiment shown in FIG. 22 is obtained by changing the connection relations of the sun gear 21 and the ring gear 23 with respect to the first shaft 1 and the second shaft 2 in this case.

Figure 23:
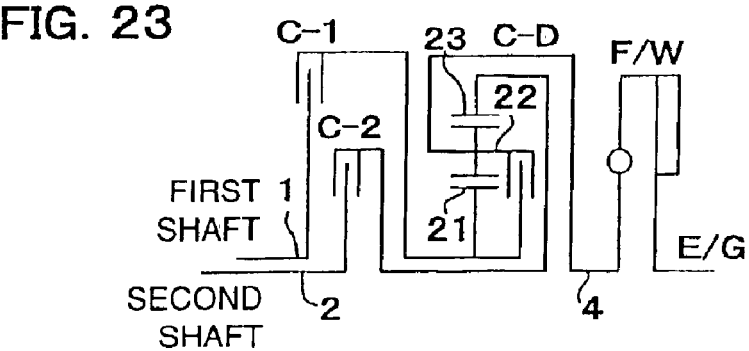
FIG. 23 is a schematic view showing a third modified embodiment of the planetary portion.
Figure 24:
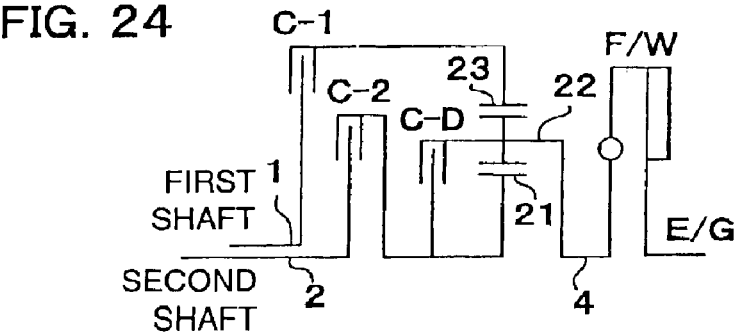
FIG. 24 is a schematic view showing a fourth modified embodiment of the planetary portion.
Figure 25:
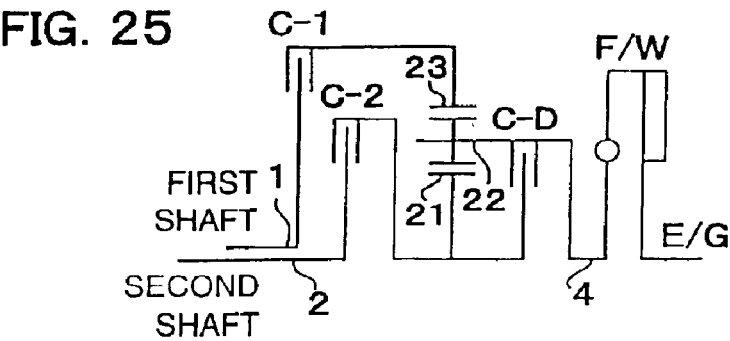
FIG. 25 is a schematic view showing a fifth modified embodiment of the planetary portion.

Next, a tenth modified embodiment shown in FIG. 23 is an embodiment in which a change is made such that the direct clutch (C-D) directly connects the carrier 22 and the sun gear 21 as compared to the eighth modified embodiment (refer to FIG. 21). Further, an eleventh modified embodiment shown in FIG. 24 is an embodiment in which a change is made such that the direct clutch (C-D) directly connects the carrier 22 and the sun gear 21 as compared to the ninth modified embodiment (refer to FIG. 22). In this case, it is also possible to make a change such that the direct clutch (C-D) is arranged in the front side of the planetary gear 20 as shown in a twelfth modified embodiment shown in FIG. 25.

Figure 26:
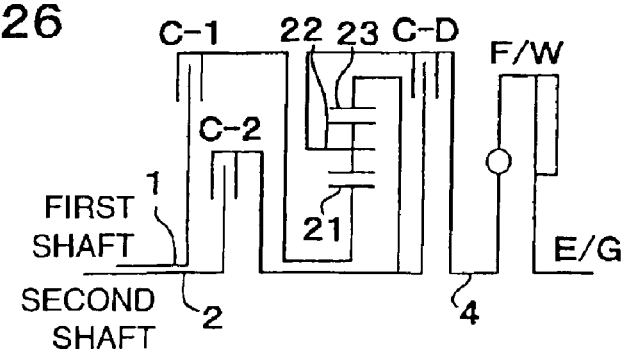
FIG. 26 is a schematic view showing a sixth modified embodiment of the planetary portion.

Further, a thirteenth modified embodiment shown in FIG. 26 is an embodiment in which a change is made such that the direct clutch (C-D) directly connects the ring gear 23 and the carrier 22 as compared to the eighth modified embodiment (refer to FIG. 21) or the tenth modified embodiment (refer to FIG. 23). Further, a fourteenth modified embodiment shown in FIG. 27 is an embodiment in which a change is made such that the direct clutch (C-D) directly connects the ring gear 23 and the carrier 22 as compared to the ninth embodiment (refer to FIG. 22). In this case, it is also possible to make a change such that the direct clutch (C-D) is arranged in the front side of the planetary gear 20 as shown in a fifteenth modified embodiment in FIG. 28.

The respective embodiments mentioned above and the respective modified embodiments thereof are obtained by changing only the structure of the planetary portion in the gear train. However, the number of the shift speeds to be achieved can be changed by changing the control of the gear train without changing the structure of the gear train itself.

Figure 30:
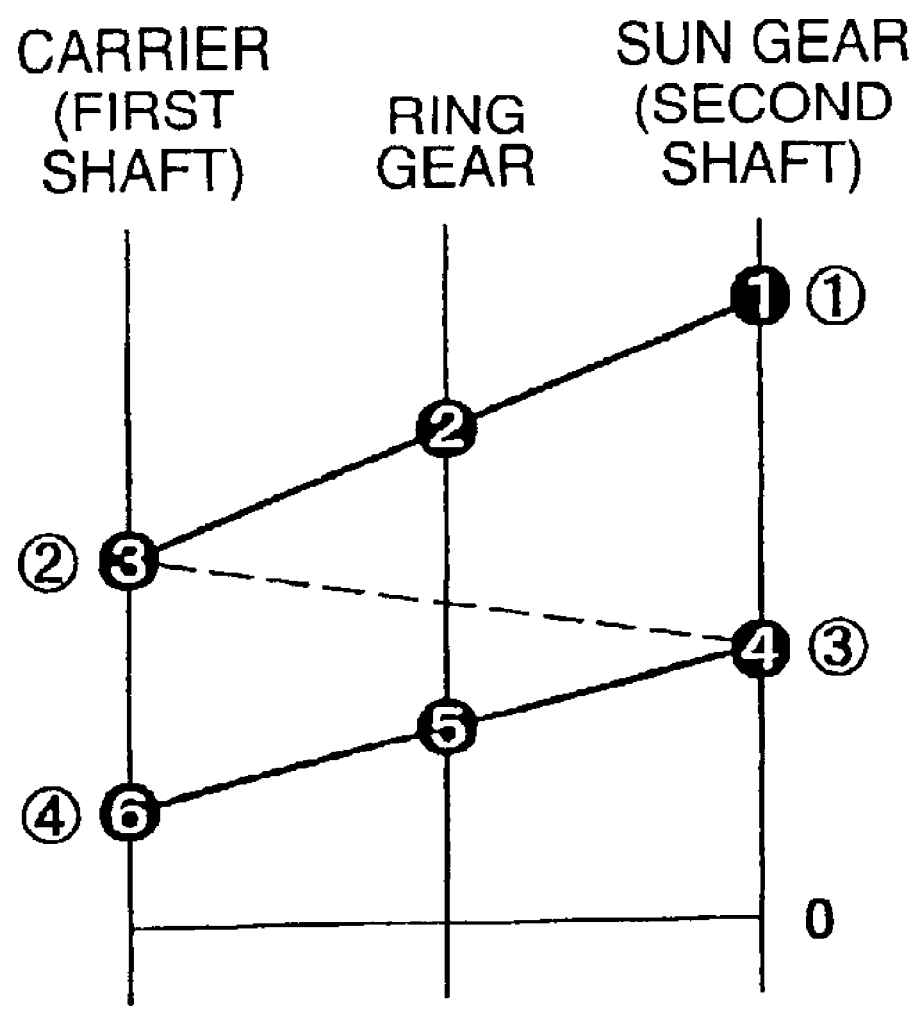
FIG. 30 is a speed diagram of the gear train according to the third embodiment.

A third embodiment shown in next FIGS. 29 and 30 is an example of such a change. In this case, the gear train according to the previous first embodiment is employed as the gear train, and a transmission having six forward speeds is constructed by performing jump shifting in such a manner as to jump the fourth speed in the previous embodiments, as shown in FIG. 29.

In this case, the shifting between the third speed and the fourth speed in which the jump shifting is interposed is discontinuous as shown by a broken line in a speed diagram of FIG. 30. However, it is possible to decrease the rotation of the sun gear 21 to a speed lower than the engine rotation of the carrier 21 in the planetary portion according to the gear ratio given by the third gear pair (3) by simultaneously connecting two gear pairs (2) and (3) of the M/T portion M to the output shaft 3 only during this shifting period, and it is possible to perform the shifting without causing any torque escape in the torque transfer due to the change-over between the first clutch (C-1) and the second clutch (C-2) as in the existing automatic transmission. The torque transfer in this case is a torque transfer between the first shaft 1 and the second shaft 2. The torque transfer is previously adapted to the running speed of the vehicle, and is not associated with the speed change of the rotating elements unlike the existing automatic transmission. Accordingly, the torque transfer is performed without causing an inertia torque, and the change-over between both clutches is simple as compared to the existing automatic transmission.

Figure 31:
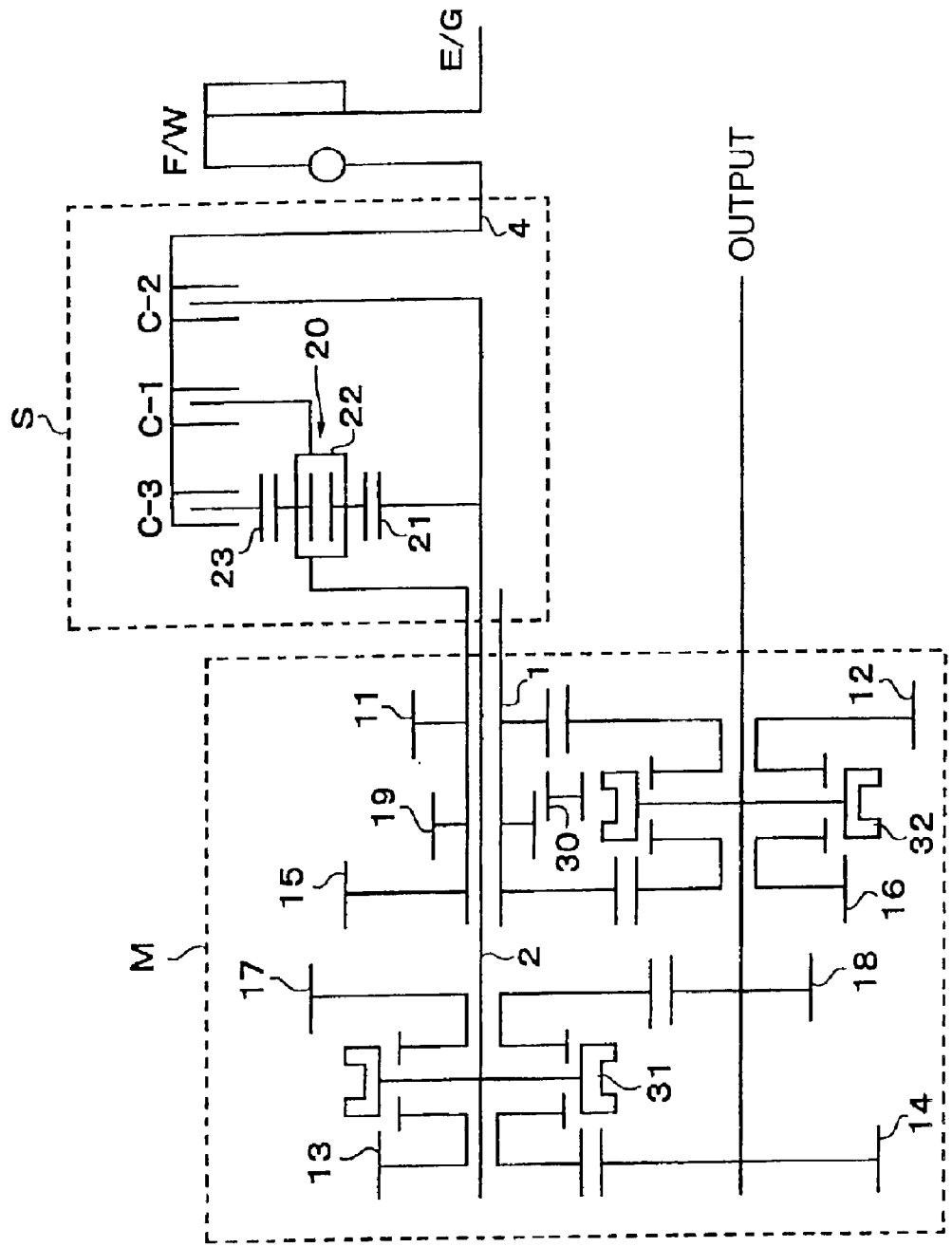
FIG. 31 is a schematic view of a gear train according to a fourth embodiment.
Figures 32, 33:
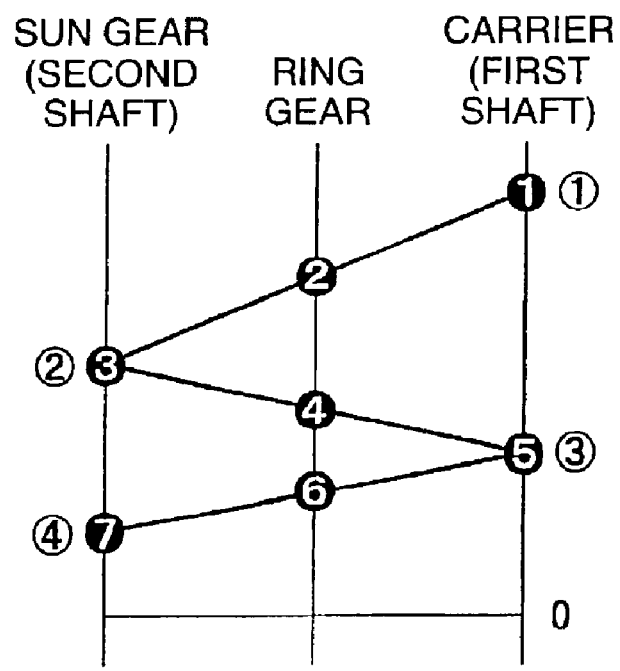
FIG. 32 is a table of operations of the gear train according to the fourth embodiment.
FIG. 33 is a speed diagram of the gear train according to the fourth embodiment.

Next, a fourth modified embodiment shown in FIGS. 31 to 33 is an embodiment in which the first shaft 1 and the second shaft 2 are exchanged as compared to the previous first embodiment. As compared to the first embodiment, the operations of the respective clutches of the planetary portion in this embodiment are different, that is, the operations of the first clutch (C-1) and the second clutch (C-2) are exchanged and accordingly, the carrier 22 and the sun gear 21 as the elements connected to the engine for the shift speeds are exchanged in the speed diagram of FIG. 33. However, the operations of the respective clutches of the planetary portion are substantially the same as those of the first embodiment.

Therefore, in order to avoid redundancy, the description of the operations of the respective shift speeds achieved by this embodiment is omitted, and the description thereof is substituted by reference to the description of the first embodiment while exchanging the first clutch and the second clutch, and exchanging the carrier 22 and the sun gear 21.

Figures 34, 35:
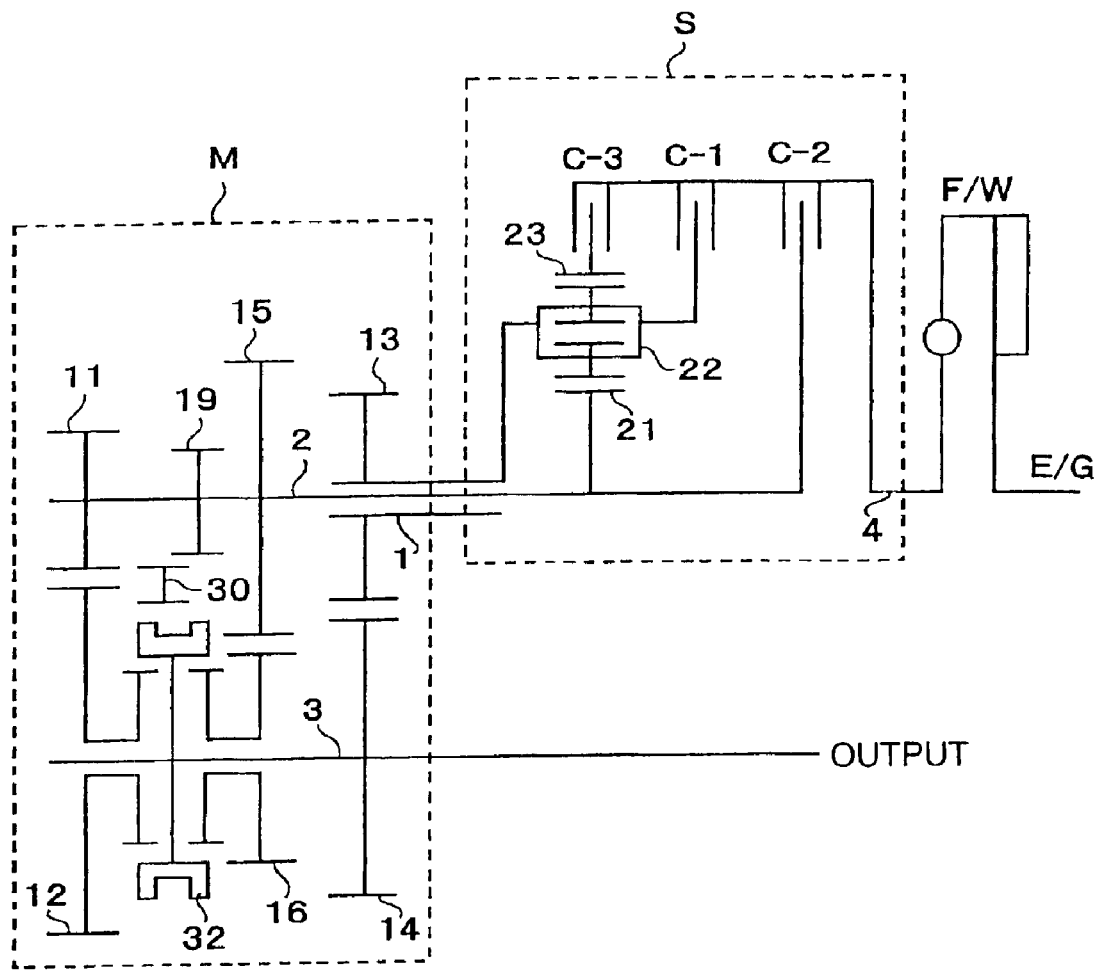
FIG. 34 is a schematic view of a gear train according to a fifth embodiment.
FIG. 35 is a table of operations of the gear train according to the fifth embodiment.
Figure 36:
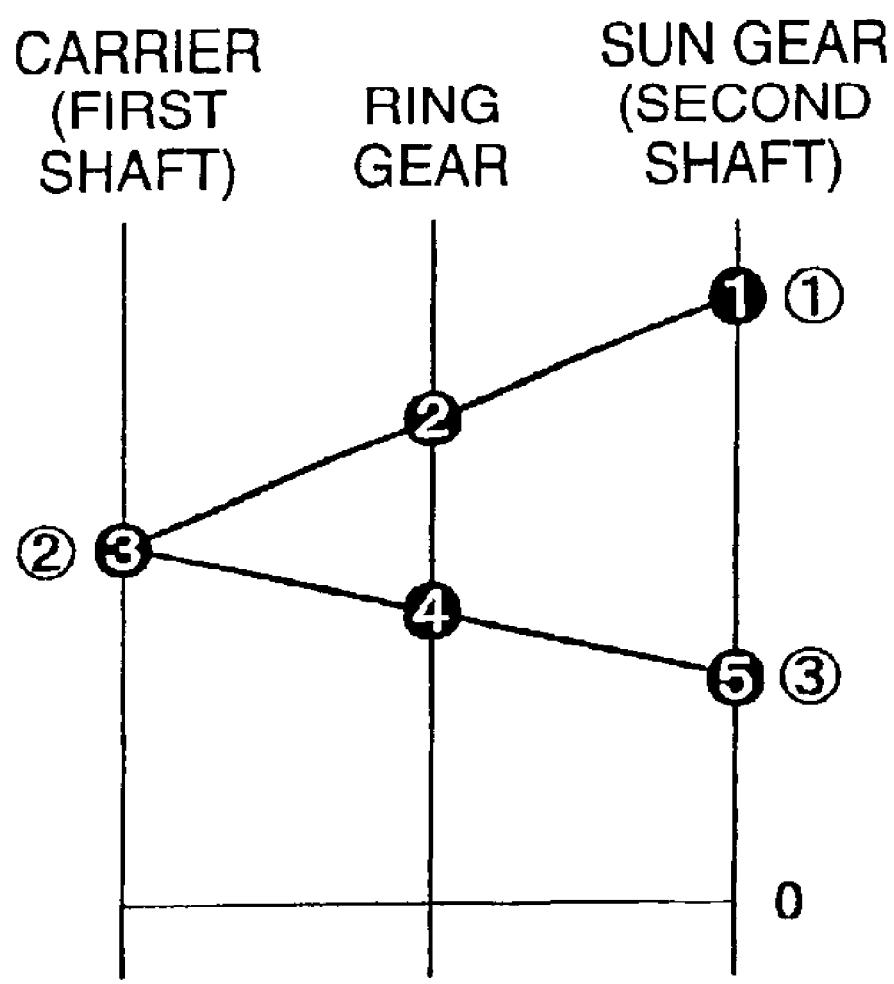
FIG. 36 is a speed diagram of the gear train according to the fifth embodiment.

Next, FIGS. 34 to 36 show a fifth embodiment. This embodiment is an embodiment in which the transmission is made so as to have five speeds by abolishing the fourth gear pair (4) of the M/T portion M in the previous first embodiment. Because of this abolishment of the fourth gear pair (4), the drive gear 13 of the second gear pair is directly connected to the first shaft 1, and the dog clutch 31, which becomes unnecessary, is removed. In the operation in the gear train, as shown in FIG. 35, the sixth speed and the seventh speed in the high speed side are of course eliminated, and they are eliminated in the speed diagram of FIG. 36. Since all of the respective shift speeds which are achieved by the operations of the respective clutches in the planetary portion S and the respective gear pairs in the M/T portion M are the same as the first embodiment with respect to the first to fifth speeds and the reverse speed, the description thereof is substituted by reference to the description of the operations in the first embodiment.

According to the structure in which the structure of the M/T portion M is simplified in the manner mentioned above, the seven speeds can be achieved by constructing the planetary gear of the planetary portion S using many elements.

Figures 37, 38:
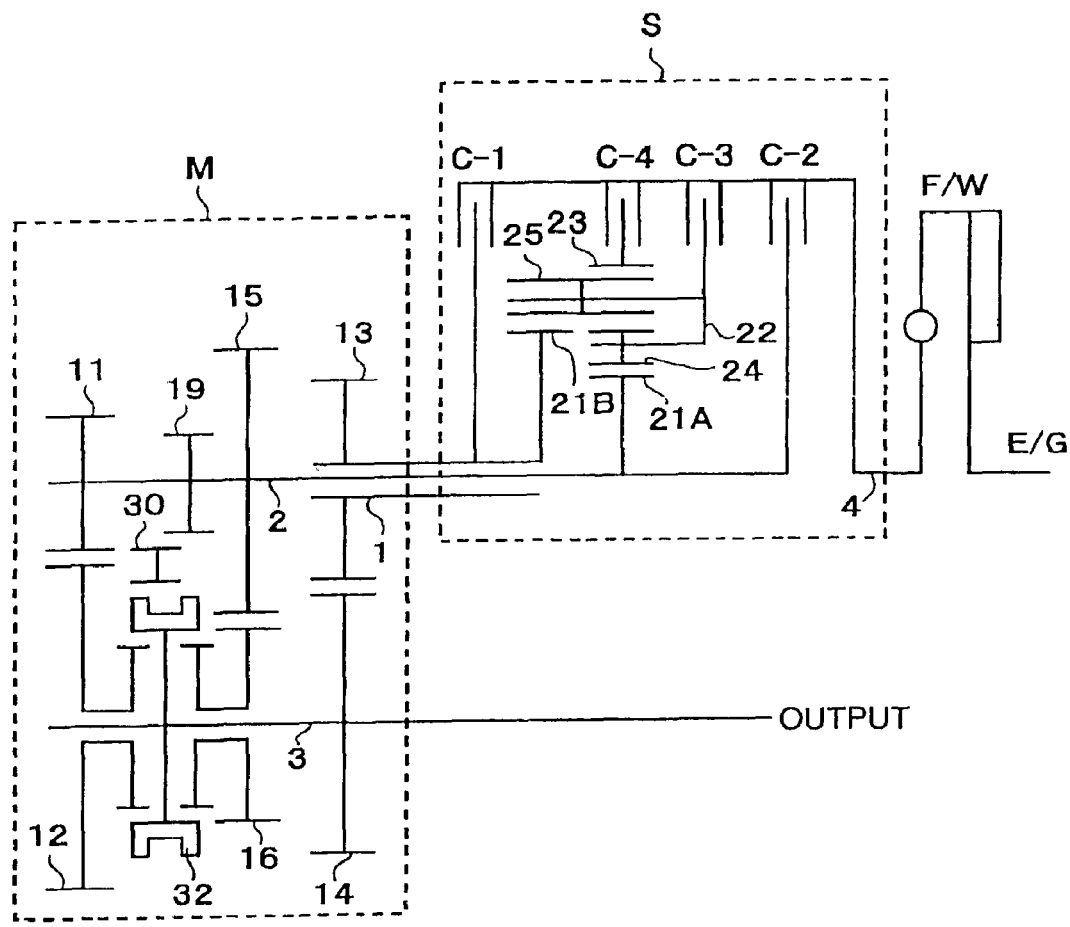
FIG. 37 is a schematic view of a gear train according to a sixth embodiment.
FIG. 38 is a table of operations of the gear train according to the sixth embodiment.
Figure 39:
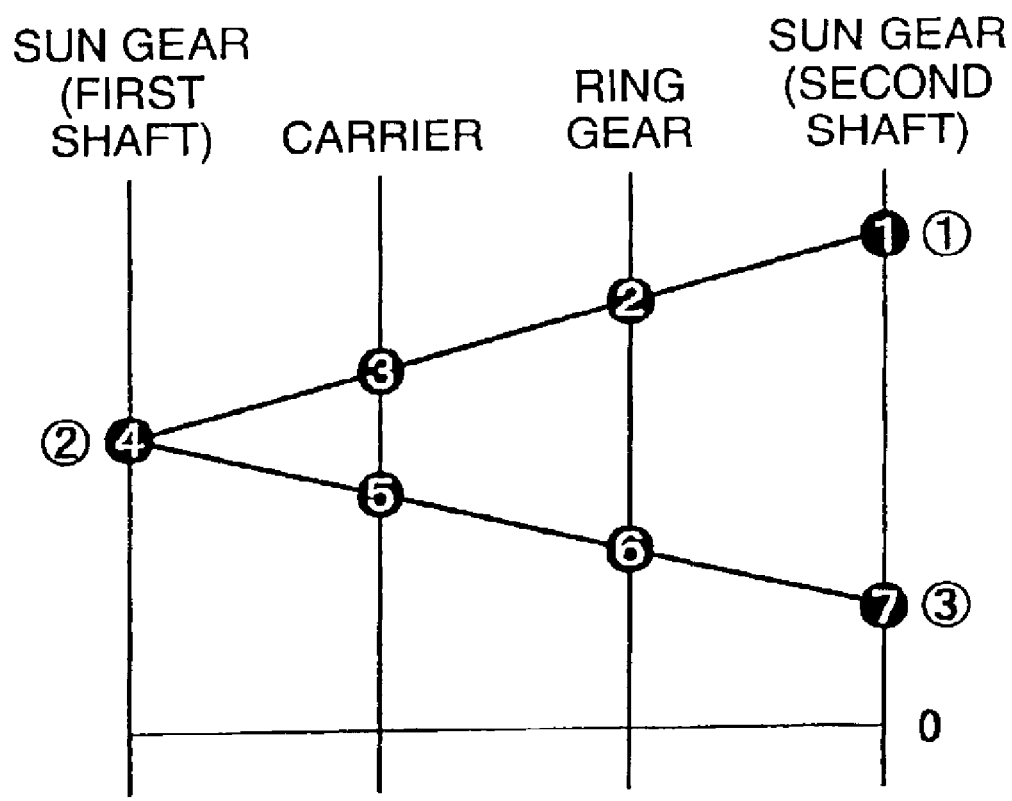
FIG. 39 is a speed diagram of the gear train according to the sixth embodiment.

FIGS. 37 to 39 show a sixth embodiment constructed in the above manner. In this sixth embodiment, the planetary gear is replaced by a Ravigneaux type planetary gear which has two sun gears 21B and 21A which have a large diameter and a small diameter respectively, a carrier 22 supporting both of a long pinion 25 and a short pinion 24 which are individually meshed with the sun gears and are meshed with each other, and a ring gear 23 meshing with the long pinion 25. In this embodiment, the large diameter sun gear 21B is connected to the first shaft 1, the small diameter sun gear 21A is connected to the second shaft 2, and all the rotating elements can be connected to the input shaft 4 via the respective clutches. That is, the large diameter sun gear 21B can be connected to the input shaft 4 via the first clutch (C-1), the small diameter sun gear 21A can be connected to the input shaft 4 via the second clutch (C-2), the carrier 22 can be connected to the input shaft 4 via the third clutch (C-3), and the ring gear 23 can be connected to the input shaft 4 via the fourth clutch (C-4), respectively.

The transmission having the structure mentioned above achieves a first speed (1st) by connecting the first gear pair 11 and 12 of the M/T portion M (hereinafter, also in the description of this embodiment, the first gear pair is briefly denoted by reference symbol (1)) to the output shaft 3 by means of the dog clutch 32 and engaging the second clutch (C-2) of the planetary portion S. The operation thereof is shown in the form of a table in FIG. 38. In this state, a rotation of the engine (E/G) input to the drive gear 11 of the M/T portion M from the second shaft 2 via the second clutch (C-2) of the planetary portion S, is reduced in speed by the first gear pair (1), and is transmitted to the output shaft 3 via the dog clutch 32. A shift ratio at this time becomes a shift ratio of the first speed which depends on a gear ratio of the first gear pair (1) and becomes a lowest shift speed of this transmission.

Next, a second speed (2nd) is achieved by connecting the first gear pair (1) of the M/T portion M to the output shaft 3 by means of the dog clutch 32, and engaging the fourth clutch (C-4) of the planetary portion S. When this state is generated in 1-2 shifting in which a previous shift speed is the first speed, both of the first gear pair (1) and the second gear pair (2) are connected to the output shaft 3 by the engagement of the dog clutch 32, whereby an intermediate gear ratio between the gear ratio of the first gear pair (1) and the gear ratio of the second gear pair (2) is generated between the second shaft 2 and the first shaft 1 which are connected to the drive gear 11 of the first gear pair (1) and the drive gear 13 of the second gear pair (2), and a rotation relation between the small diameter sun gear 21A of the planetary gear 20 connected to the second shaft 2 and the large diameter sun gear 21B connected to the first shaft 1 is determined. If this state is generated while running at the first speed, the rotation of the small diameter sun gear 21A is a rotation which is equivalent to the engine rotation. However, the rotation of the large diameter sun gear 21B becomes a rotation which is reduced in speed therefrom, and the carrier 22 is regulated by these rotations and is idling. In this state, the second clutch (C-2) is disengaged and the fourth clutch (C-4) is engaged in turn, and the engine rotation is input to the ring gear 23 which is idling, whereby there are generated torque transmission from the ring gear 23 to the carrier 22 in accordance with the previously generated intermediate gear ratio and torque transmission from the ring gear 23 to both of the sun gears 21A and 21B via the carrier 22 in a parallel manner, and the torque is transmitted to the output shaft 3 via both of the gear pairs (1) and (2) through the first shaft 1 and the second shaft 2. Accordingly, the second shift speed is achieved.

A third speed (3rd) is achieved by connecting the first gear pair (1) of the M/T portion M to the output shaft 3 by means of the dog clutch 32, and engaging the third clutch (C-3) of the planetary portion S. In this state, the power transmission flow of the M/T portion M is the same as that at the time of the second speed. However, in this case, the input of the ring gear 23 is changed to the input of the carrier 22. Therefore, when this state is generated in 2-3 shifting in which a previous shift speed is the second speed, both of the first gear pair (1) and the second gear pair (2) are connected to the output shaft 3 by the engagement of the dog clutch 32, whereby an intermediate gear ratio between the gear ratio of the first gear pair (1) and the gear ratio of the second gear pair (2) is generated between the second shaft 2 and the first shaft 1 which are connected to the drive gear 11 of the first gear pair (1) and the drive gear 13 of the second gear pair (2), and a rotation relation between the small diameter sun gear 21A of the planetary gear 20 connected to the second shaft 2 and the large diameter sun gear 21B connected to the first shaft 1 is determined. If this state is generated while running at the second speed, the rotation of the small diameter sun gear 21A is a rotation which is equivalent to the engine rotation. However, the rotation of the large diameter sun gear 21B becomes a rotation which is reduced in speed therefrom, and the carrier 22 is regulated by these rotations and is idling. In this state, the fourth clutch (C-4) is disengaged and the third clutch (C-3) is engaged in turn, and the engine rotation is input to the ring gear 23 which is idling, whereby there are generated torque transmission from the ring gear 23 to the carrier 22 in accordance with the previously generated intermediate gear ratio and torque transmission from the ring gear 23 to both of the sun gears 21A and 21B via the carrier 22 in a parallel manner, and the torque is transmitted to the output shaft 3 via both of the gear pairs (1) and (2) through the first shaft 1 and the second shaft 2. Accordingly, the third shift speed is achieved.

A fourth speed (4th) is achieved by bringing the dog clutch 32 of the M/T portion M into a neutral position, connecting only the second gear pair (2) to the output shaft 3, and engaging the first clutch (C-1) of the planetary portion S. In this state, the rotation of the engine (E/G) is input to the first shaft 1 via the first clutch (C-1), and is reduced in accordance with the gear ratio of the second gear pair (2) which is always connected so as to be transmitted to the output shaft 3.

A fifth speed (5th) is achieved by connecting the third gear pair (3) of the M/T portion M to the output shaft 3 by means of the dog clutch 32, and engaging the third clutch (C-3) of the planetary portion S. In this state, the rotation of the engine (E/G) is input to the carrier 22 via the third clutch (C-3). When this state is generated in 4-5 shifting in which a previous shift speed is the fourth speed, the third gear pair (3) is connected to the output shaft 3 by the engagement of the dog clutch 32, whereby an intermediate gear ratio between the gear ratio of the second gear pair (2) and the gear ratio of the third gear pair (3) is generated between the second shaft 2 and the first shaft 1 which are connected to the drive gear 13 of the second gear pair (2) and the drive gear 15 of the third gear pair (3), and a rotation relation between the small diameter sun gear 21A of the planetary gear 20 connected to the second shaft 2 and the large diameter sun gear 21B connected to the first shaft 1 is determined. If this state is generated while running at the fourth speed, the rotation of the large diameter sun gear 21B is a rotation which is equivalent to the engine rotation. However, the rotation of the small diameter sun gear 21A becomes a rotation which is reduced in speed therefrom, and the ring gear 23 is regulated by these rotations and is idling. In this state, the first clutch (C-1) is disengaged and the third clutch (C-3) is engaged in turn, and the engine rotation is input to the carrier 22 which is idling, whereby there are generated torque transmission from the carrier 22 to both of the sun gears 21A and 21B in accordance with the previously generated intermediate gear ratio in a parallel manner, and the torque is transmitted to the output shaft 3 via both of the gear pairs (2) and (3) through the first shaft 1 and the second shaft 2. Accordingly, the fifth shift speed is achieved.

A sixth speed (6th) is also achieved by connecting the third gear pair (3) of the M/T portion M to the output shaft 3 by means of the dog clutch 32, and engaging the fourth clutch (C-4) of the planetary portion S. When this state is generated in 5-6 shifting in which a previous shift speed is the fifth speed, the third gear pair (3) is connected to the output shaft 3 by the engagement of the dog clutch 32, whereby an intermediate gear ratio between the gear ratio of the third gear pair (3) and the gear ratio of the second gear pair (2) is generated between the second shaft 2 and the first shaft 1 which are connected to the drive gear 15 of the third gear pair (3) and the drive gear 17 of the second gear pair (2), and a rotation relation between the small diameter sun gear 21A of the planetary gear 20 connected to the second shaft 2 and the large diameter sun gear 21B connected to the first shaft 1 is determined. If this state is generated while running at the fifth speed, the rotation of the carrier 22 is a rotation which is equivalent to the engine rotation. However, the rotation of the sun gear 21 becomes a rotation which is increased in speed therefrom, and the ring gear 23 is regulated by these rotations and is idling. In this state, the third clutch (C-3) is disengaged and the fourth clutch (C-4) is engaged in turn, and the engine rotation is input to the ring gear 23 which is idling, whereby there are generated torque transmission from the ring gear 23 to the carrier 22 in accordance with the previously generated intermediate gear ratio and torque transmission from the ring gear 23 to the sun gear 21 via the carrier 22 in a parallel manner, and the torque is transmitted to the output shaft 3 via both of the gear pairs (2) and (3) through the first shaft 1 and the second shaft 2. Accordingly, the sixth shift speed is achieved.

A seventh speed (7th) is achieved by connecting the third gear pair (3) of the M/T portion M to the output shaft 3 by means of the dog clutch 32, and engaging the second clutch (C-2) of the planetary portion S. In this state, the rotation of the engine (E/G) is input to the second shaft 2 via the second clutch (C-2), and the rotation is transmitted to the third gear pair (3) via the dog clutch 32, and is increased in speed in accordance with the gear ratio of the third gear pair (3) so as to be transmitted to the output shaft. In this case, a reverse (Rev) is achieved in the same manner as in the first embodiment.

A speed diagram of the respective speeds obtained in this manner is a diagram shown in FIG. 39. In this case, the first, fourth and seventh shift speeds are the shift speeds according to the independent gear ratios of the respective gear pairs. However, the second, third, fifth and sixth speeds are the shift speeds according to the gear ratios which are intermediately generated.

Figure 40:
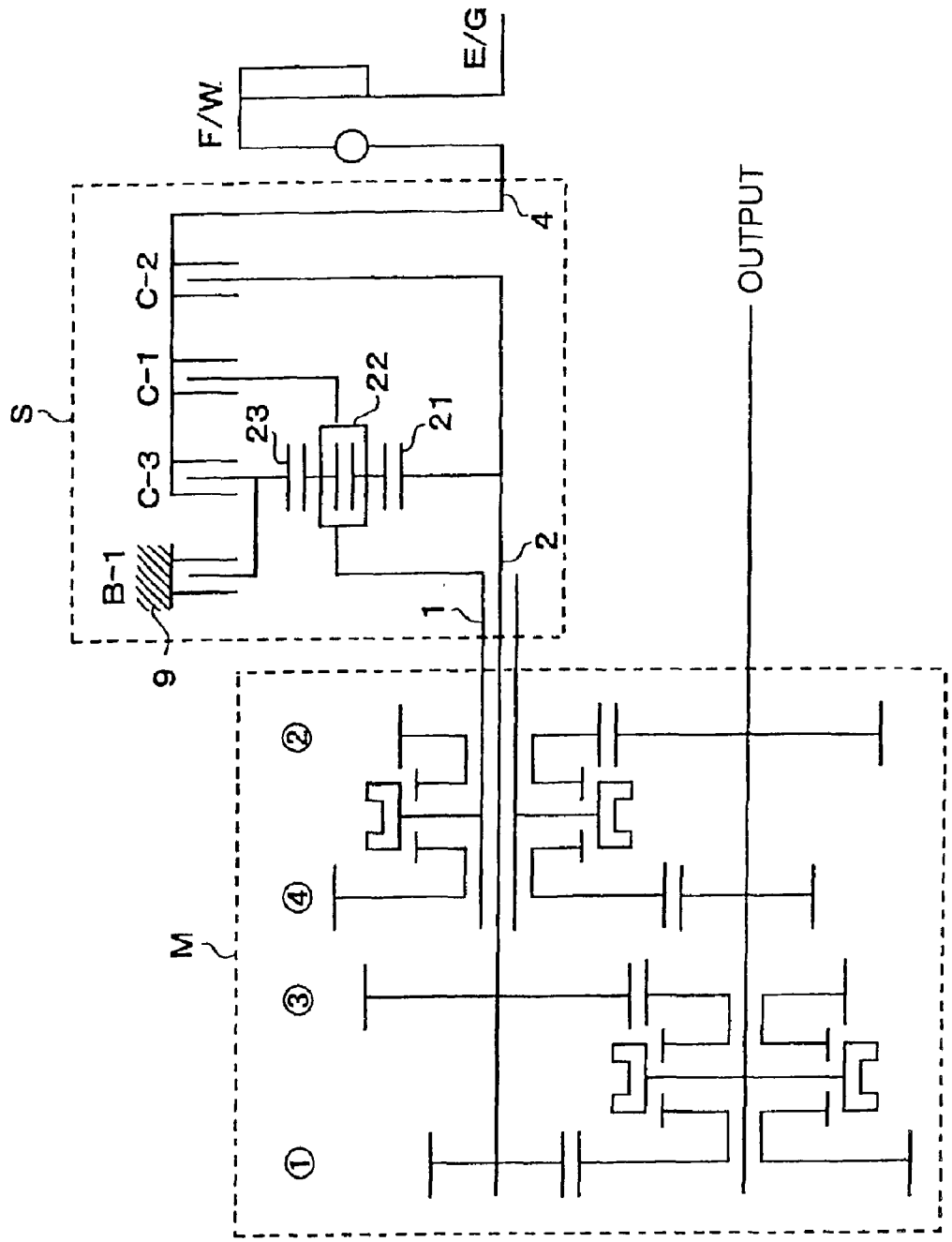
FIG. 40 is a schematic view of a gear train according to a seventh embodiment.
Figures 41, 42:
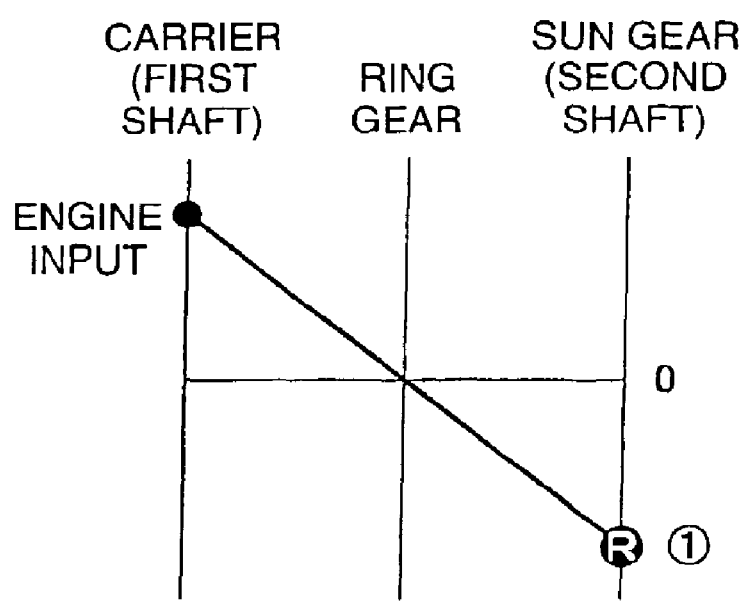
FIG. 41 is a table of operations of the gear train according to the seventh embodiment.
FIG. 42 is a speed diagram of the gear train according to the seventh embodiment.

Next, FIGS. 40 to 42 show a seventh embodiment. This embodiment is an embodiment in which the reverse gear train of the M/T portion M in the previous first embodiment is abolished and the reverse is achieved by the planetary portion instead of the reverse gear train. Because of this abolishment of the reverse gear train, the brake (B-1) to replace this is connected so as to freely engage the ring gear 23 with the transmission case 9. Since the operation in the gear train is of course the same as the previous first embodiment, as shown in FIG. 41, the description thereof is substituted by the description of the operations in the first embodiment.

The reverse (Rev) in this embodiment can be achieved by connecting the first gear pair (1) of the M/T portion M to the output shaft 3 and engaging the first clutch (C-1) with the brake (B-1), as shown in a table of operations in FIG. 41. In this input state, the carrier 22 rotates according to the engine rotation. However, the ring gear 23 is engaged. Therefore, the sun gear 21 rotates at reduced speed in a direction opposite to the rotation of the carrier 22. Then, the rotation is input to the first gear pair (1) of the lowest shift speed via the second shaft 2, and is transmitted to the output shaft 3 via the dog clutch 32. Accordingly, the reverse is achieved.

A speed diagram shown in FIG. 42 is different from the above-mentioned respective speed diagrams, and shows a ratio of output rotational numbers of the respective elements in the planetary gear at a time of setting the normal engine rotation to a speed ratio 1. As shown in the drawing, the ring gear is set to a fixed speed ratio zero with respect to the speed ratio 1 of the first shaft 1 according to the carrier input, and a speed ratio of the second shaft 2 becomes a negative value according to a negative speed ratio which means a reverse rotation of the sun gear. In this case, the respective forward speeds in this embodiment are of course achieved in the same manner as in the first embodiment.

Addition of the brake mentioned above can be utilized not only for achieving the reverse but also for adding the forward speeds.

Figure 43:
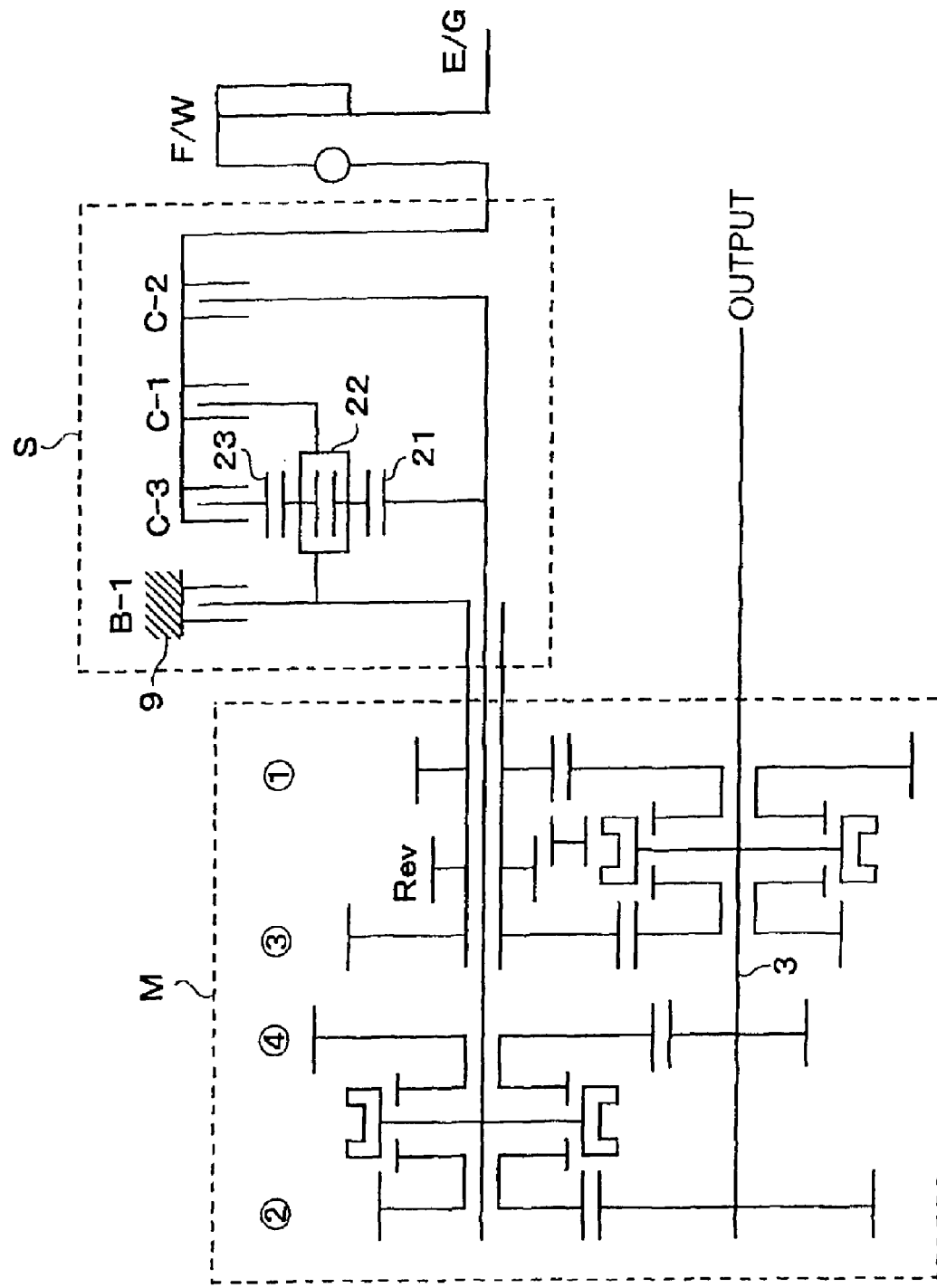
FIG. 43 is a schematic view of a gear train according to an eighth embodiment.
Figures 44, 45:
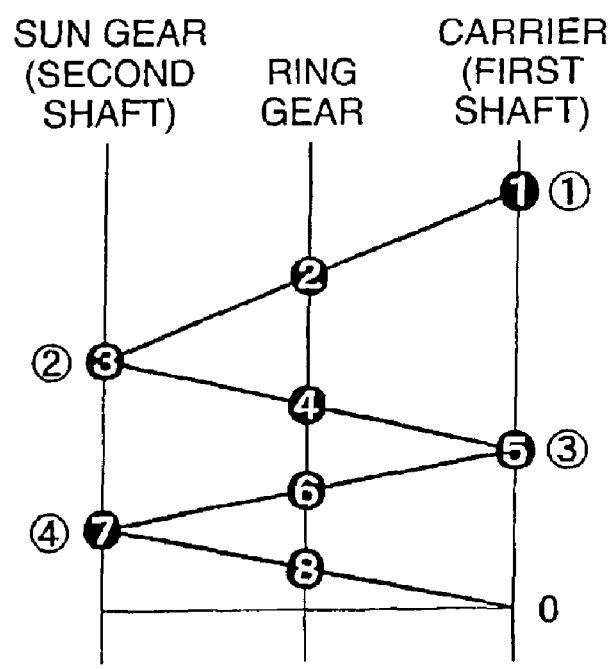
FIG. 44 is a table of operations of the gear train according to the eighth embodiment.
FIG. 45 is a speed diagram of the gear train according to the eighth embodiment.

Next, an eighth embodiment with reference to FIGS. 43 to 45 is an embodiment in which a brake is added to the previous fourth embodiment (refer to FIGS. 31 to 33), whereby eight forward speeds are achieved. In this embodiment, the brake (B-1) fixing the carrier 22 of the planetary gear to the transmission case 9 is provided.

Since the operations for achieving the first to seventh speeds and the reverse in this embodiment are the same as in the previous fourth embodiment, the description thereof is substituted by reference to a table of operations in FIG. 44 showing operations of the present embodiment, a speed diagram in FIG. 45 and the description of the operations in the third embodiment. An eighth speed in this embodiment is achieved by connecting the fourth gear pair (4) to the output shaft 3 via the dog clutch in the same manner as in the cases of the sixth speed and the seventh speed, and engaging the third clutch (C-3) and the brake (B-1). In this case, the engine rotation is input to the ring gear 23 of the planetary gear according to the engagement of the third clutch (C-3). However, the carrier 22 is fixed according to the engagement of the brake (B-1). Therefore, the sun gear 21 rotates in an increased speed in accordance with the gear ratio between the ring gear and the sun gear in the same direction as the rotation of the ring gear 23, and this rotation is input to the fourth gear pair (4) via the dog clutch so as to serve as the rotation of the second shaft 2, and is output to the output shaft 3.

Figure 46:
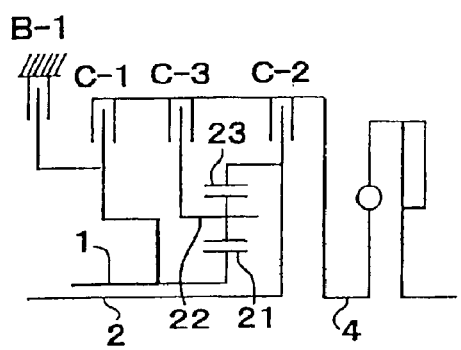
FIG. 46 is a schematic view showing a first modified embodiment of a planetary portion in the gear train according to the eighth embodiment.
Figure 47:
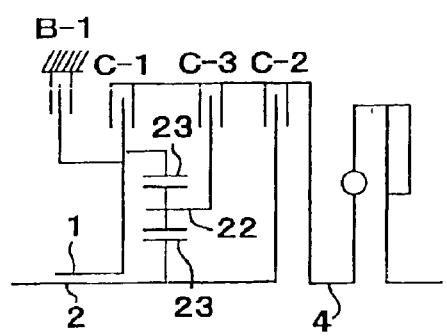
FIG. 47 is a schematic view showing a second modified embodiment of the planetary portion.
Figure 48:
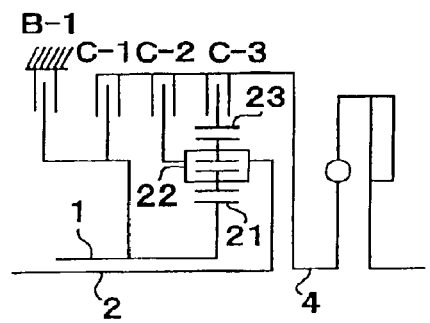
FIG. 48 is a schematic view showing a third modified embodiment of the planetary portion.

As mentioned above, in the case of utilizing the added brake for the addition of the forward speed, it is also possible to variously change the structure of the planetary portion. FIGS. 46 to 52 show such modified embodiments. A first modified embodiment shown in FIG. 46 is an embodiment in which the single planetary gear is used, a brake (B-1) engaging the sun gear 21 is provided, and the third clutch (C-3) for inputting the carrier 22 is engaged, whereby the rotation of the second shaft 2 connected to the ring gear 23 is utilized for achieving an acceleration speed. A second modified embodiment shown in FIG. 47 is an embodiment in which the same single planetary gear is used, a brake (B-1) for engaging the ring gear 23 is provided, and the third clutch (C-3) for the carrier 22 input is engaged, whereby the rotation of the second shaft 2 connected to the sun gear 21 is utilized for achieving an acceleration speed. A third modified embodiment shown in FIG. 48 is an embodiment in which the double planetary gear is used, the brake (B-1) for engaging the sun gear 21 is provided, and the third clutch (C-3) for the ring gear 23 input is engaged, whereby the rotation of the second shaft 2 connected to the carrier 22 is utilized for achieving an acceleration speed.

Figure 49:
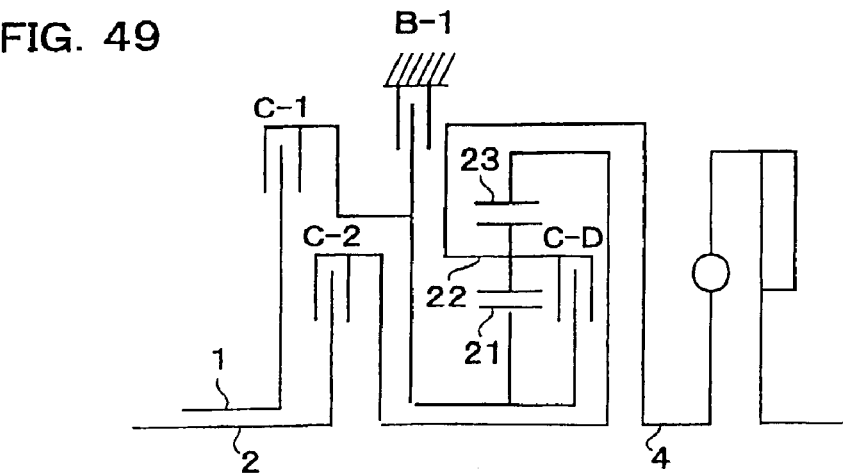
FIG. 49 is a schematic view showing a fourth modified embodiment of the planetary portion.
Figure 50:
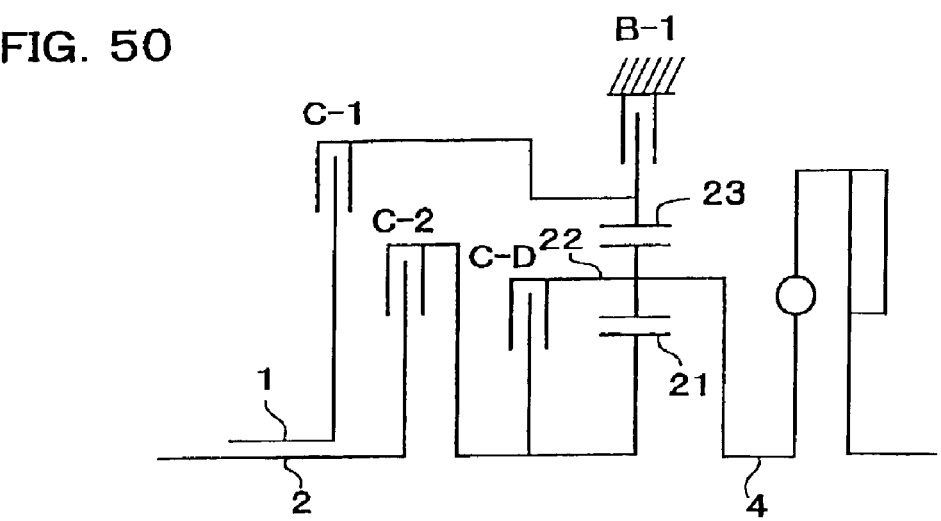
FIG. 50 is a schematic view showing a fifth modified embodiment of the planetary portion.
Figure 51:
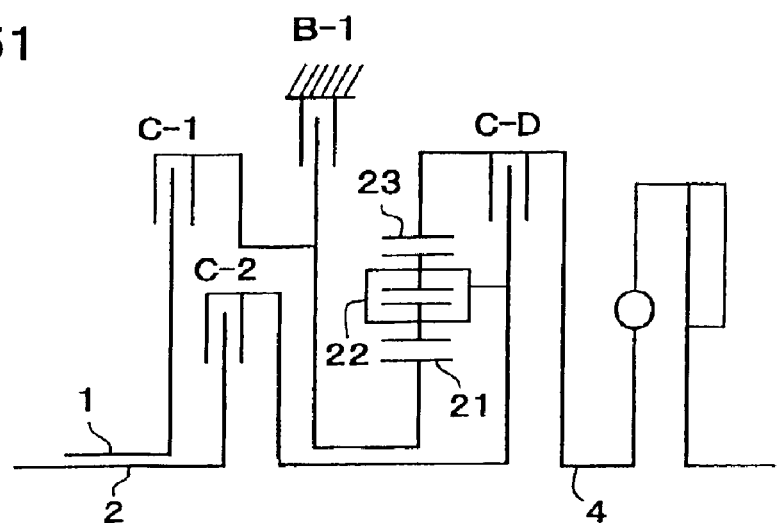
FIG. 51 is a schematic view showing a sixth modified embodiment of the planetary portion.
Figure 52:
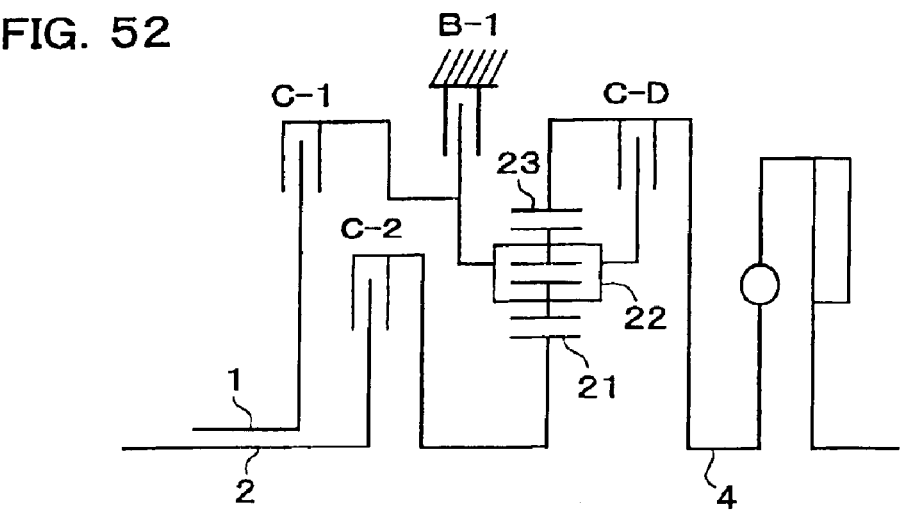
FIG. 52 is a schematic view showing a seventh modified embodiment of the planetary portion.

Further, a fourth modified embodiment shown in FIG. 49 is a modified embodiment in the case of having the direct clutch. In the embodiment, the single planetary gear is used, a brake (B-1) for engaging the sun gear 21 is provided, and the second clutch (C-2) for connecting the ring gear 23 and the M/T portion is engaged, whereby the rotation of the second shaft 2 connected to the ring gear 23 is utilized for achieving an acceleration speed. A fifth modified embodiment shown in FIG. 50 is an embodiment in which a brake (B-1) for engaging the ring gear 23 of the single planetary gear is provided, and the second clutch (C-2) for connecting the sun gear 21 and the M/T portion is engaged, whereby the rotation of the second shaft 2 connected to the sun gear 21 is utilized for achieving an acceleration speed. A sixth modified embodiment shown in FIG. 51 is an embodiment in which a brake (B-1) for engaging the sun gear 21 of the double planetary gear is provided, and the second clutch (C-2) for connecting the carrier 22 and the M/T portion is engaged, whereby the rotation of the second shaft 2 connected to the carrier 22 is utilized for achieving an acceleration speed. Further, a seventh modified embodiment shown in FIG. 52 is an embodiment in which a brake (B-1) for engaging the carrier 22 of the double planetary gear is provided, and the second clutch (C-2) for connecting the sun gear 21 and the M/T portion is engaged, whereby the rotation of the second shaft 2 connected to the sun gear 21 is utilized for achieving an acceleration speed.

Figure 53:
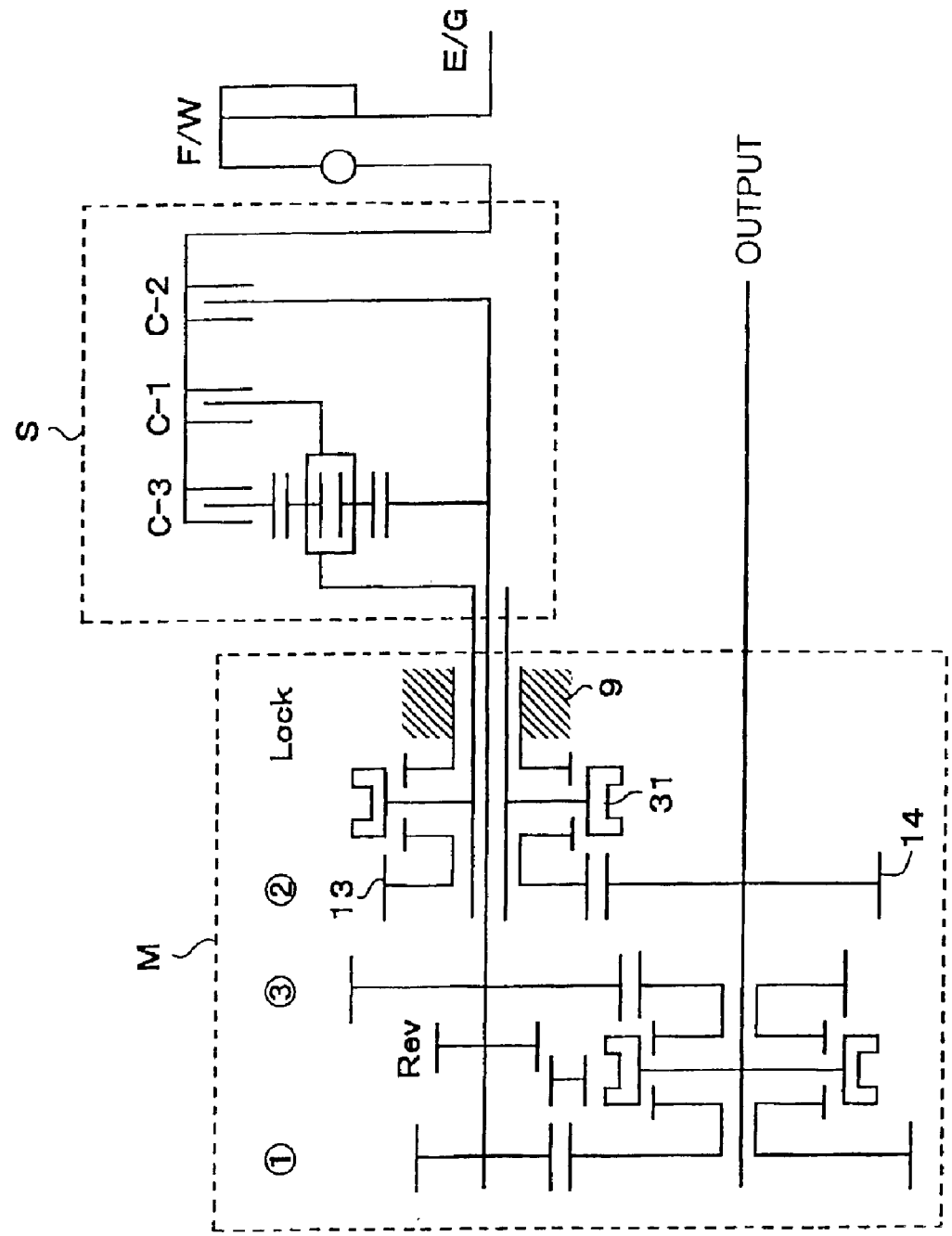
FIG. 53 is a schematic view of a gear train according to a ninth embodiment.
Figures 54, 55:
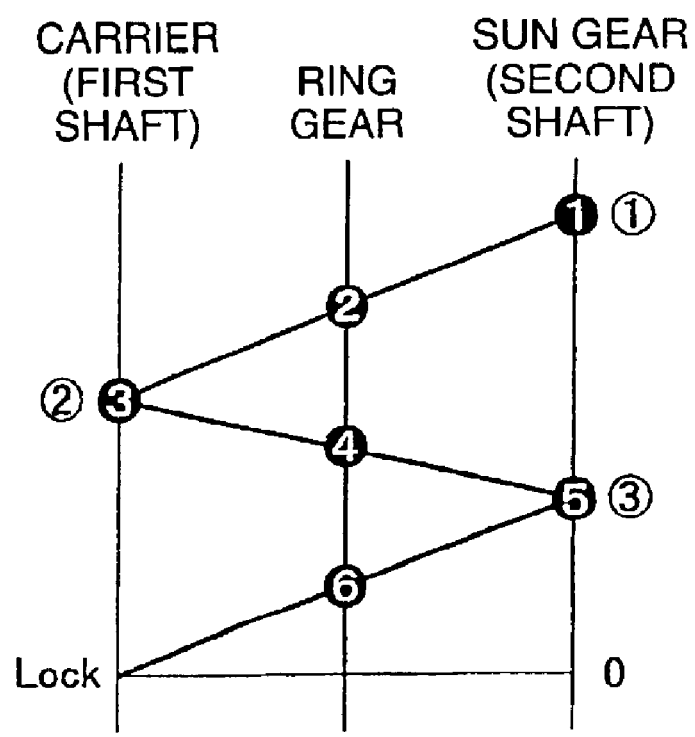
FIG. 54 is a table of operations of the gear train according to the ninth embodiment.
FIG. 55 is a speed diagram of the gear train according to the ninth embodiment.

Next, a ninth embodiment shown in FIGS. 53 to 55 is an embodiment in which the highest shift speed is abolished and six forward speeds are achieved by abolishing the fourth gear pair (4) as compared to the first embodiment, and making the dog clutch 31 capable of being locked to the transmission case 9 by movement to an opposite side to the connection of the second gear pair (2). Since the operations for achieving the respective forward shift speeds from the first speed to the sixth speed and the reverse in this case become the same as in the first embodiment by replacing the part of the fourth gear pair (4) with the lock, a description is substituted by reference to a table of operations in FIG. 54 and the description of the operations in the first embodiment. However, in this embodiment, since the first shaft 1 is the lock in the sixth speed, the rotation of the carrier at this time becomes zero.

In all the embodiments mentioned above, the respective clutches are arranged in the planetary portion. However, the respective clutches except the direct clutch (C-D) can be arranged at appropriate positions.

Figure 56:
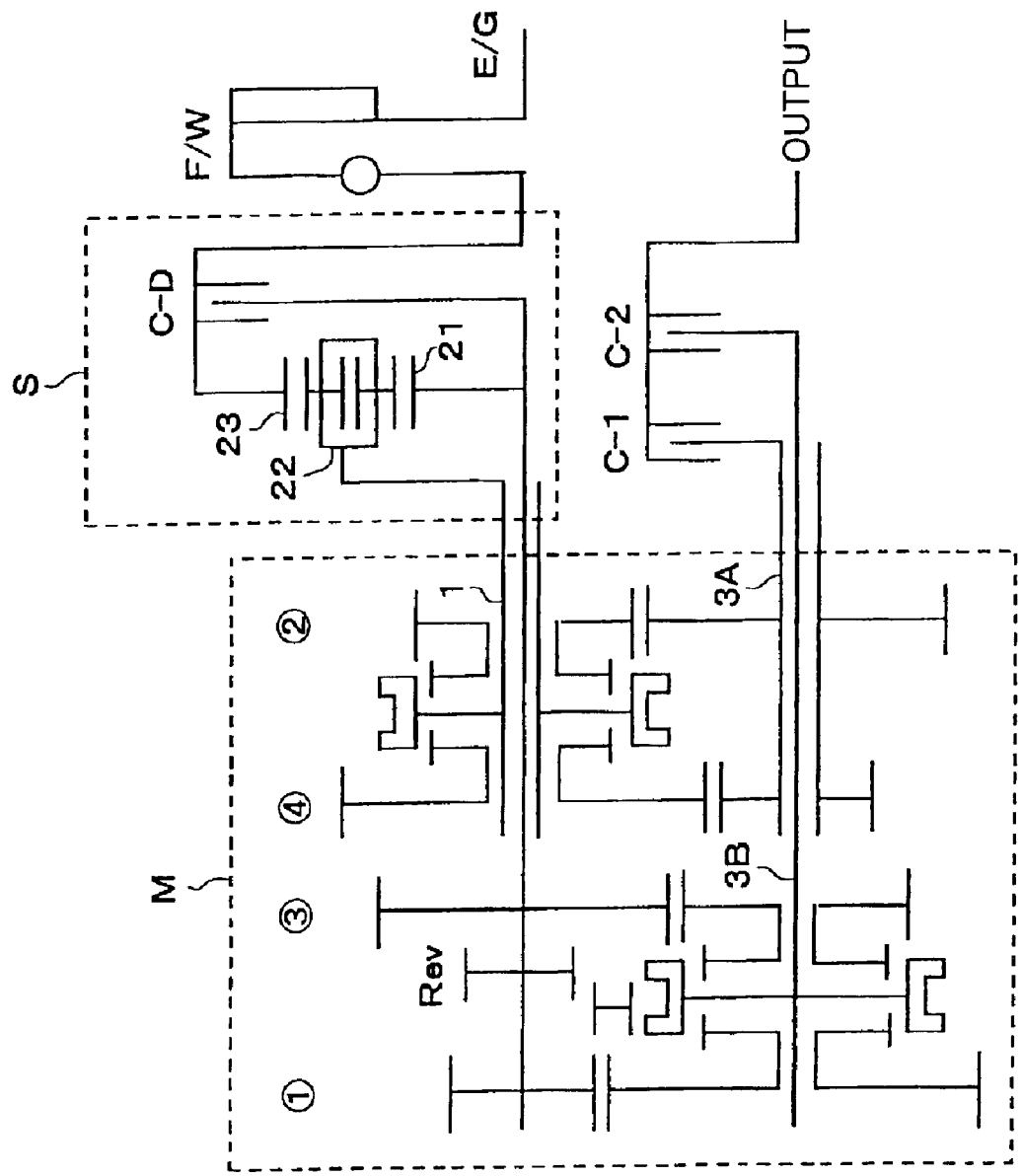
FIG. 56 is a schematic view of a gear train according to a tenth embodiment.

Next, FIG. 56 shows a tenth embodiment in which the first clutch (C-1) and the second clutch (C-2) are moved to the output shaft side as compared to the second embodiment (refer to FIGS. 11 to 13). In this case, the carrier 22 and the sun gear 21 of the planetary gear are directly connected to the first shaft 1 and the second shaft 2, and instead on the output shaft 3 side, the driven gear of the second gear pair (2) and the driven gear of the fourth gear pair (4) are fixed and supported to an outer shaft 3A which is fitted to the outer periphery of the output shaft. Then, the outer shaft 3A can be connected to the output shaft via the first clutch (C-1), and an inner shaft 3B can be connected to the output shaft via the second clutch (C-2).

Since the shifting operation of this embodiment is the same as that of the second embodiment which refers to FIGS. 11 to 13, the description thereof is substituted by reference to the description of the second embodiment including the table of the operations and the speed diagram.

Figure 57:
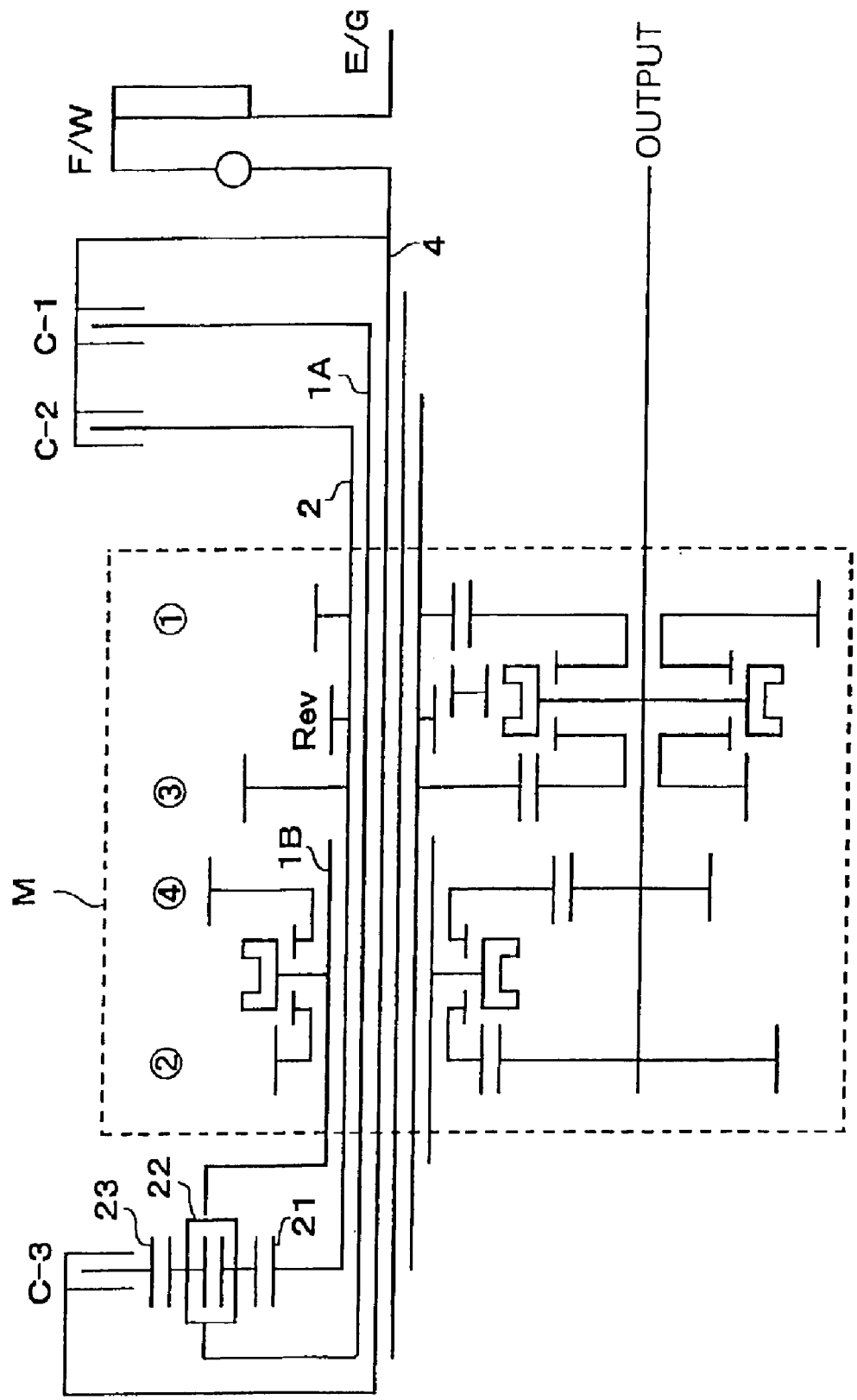
FIG. 57 is a schematic view of a gear train according to an eleventh embodiment.

Next, an eleventh embodiment shown in FIG. 57 is an embodiment in which the planetary gear is moved to the rear side of the transmission, and the third clutch (C-3) is moved to the rear side of the transmission, in the previous fourth embodiment (refer to FIGS. 31 to 33). In the case of this arrangement, since it is necessary to provide a shaft for connecting the third clutch (C-3) to the input shaft 4 inside a first shaft 1A and the second shaft 2, the shafts constitute a triple shaft on the side of the first gear pair (1) and the third gear pair (3). Further, since it is necessary to provide a shaft 1B which is turned back and connected to the dog clutch, on the side of the second gear pair (2) and the fourth gear pair (4), the shafts constitute a quadruple shaft. Therefore, although it is unavoidable that the shaft diameter is increased, such arrangements are possible in principle.

Figure 58:
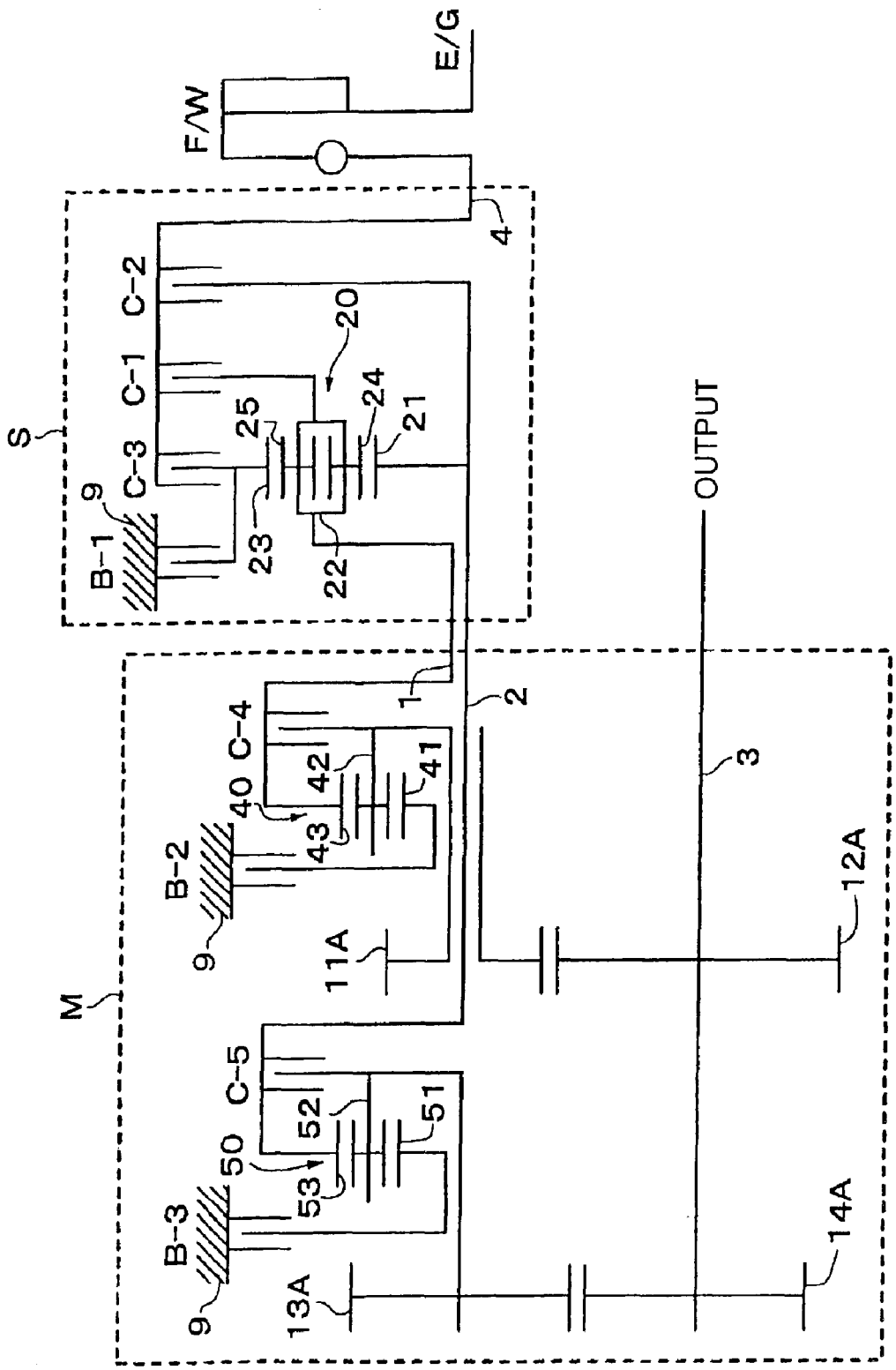
FIG. 58 is a schematic view of a gear train according to a twelfth embodiment.
Figures 59, 60:
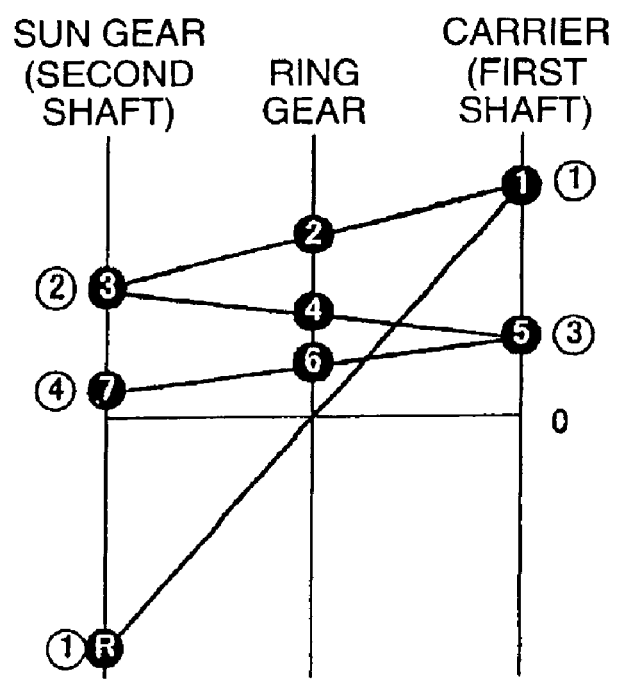
FIG. 59 is a table of operations of the gear train according to the twelfth embodiment.
FIG. 60 is a speed diagram of the gear train according to the twelfth embodiment.

Next, FIGS. 58 to 60 show a twelfth embodiment. FIG. 58 is a schematic view showing a gear train. In this embodiment, the structure of the M/T portion M is changed as compared to the first embodiment. In this case, the M/T portion M includes planetary gears 40 and 50 as the speed-changing elements. This M/T portion M is the same as in the first embodiment in that the first shaft 1 and the second shaft 2 which constitute an inside and outside double shaft are input shafts. In this embodiment, one gear pair 11A and 12A is connected to the first shaft 1, and the planetary gear 40 is arranged as a serial gear with respect to the gear pair 11A and 12A. The gear pair connected to the second shaft 2 is constructed in the same manner. One gear pair 13A and 14A is connected to the second shaft 2, and the planetary gear 50 is arranged as a serial gear with respect to the gear pair 13A and 14A. Both of the planetary gears 40 and 50 are of a simple planetary type. Ring gears 43 and 53 thereof are connected to the first shaft 1 and the second shaft 2 as input elements, respectively, and are connected to a transmission case 9 via brakes (B-2 and B-3) so as to make respective sun gears 41 and 51 reaction force elements. Respective carriers 42 and 52 are connected to the drive gears 11A and 13A of the respective gear pairs and are connected to the first shaft 1 and the second shaft 2 via clutches (C-4 and C-5). In this case, the driven gears 12A and 14A of both of the gear pairs are connected to the output shaft 3 in such a manner as to integrally rotate.

The structure of the planetary portion S is substantially the same as that in the first embodiment. However, in this gear train, since the gear train used exclusively for the reverse movement is not provided in the M/T portion M, the ring gear 23 is constructed so as to be capable of engaging with the transmission case 9 via the brake (B-1) in order to achieve the reverse movement. Thus, this embodiment has an additional structure which is different from that of the first embodiment in this point.

The transmission having the structure mentioned above achieves the first speed (1st) by engaging the brake (B-2) of the M/T portion M and engaging the first clutch (C-1) of the planetary portion S so as to fix the first sun gear 41. The operation thereof is shown in the form of a table in FIG. 59. In this state, the rotation of the engine (E/G) is input to the first ring gear 43 of the M/T portion M from the first clutch (C-1) of the planetary portion via the carrier 22 and the first shaft 1, and the reduced rotation of the first carrier 42 caused by the reaction force due to fixing the first sun gear 41 is input to the first gear pair 11A and 12A and is further reduced in speed according to the gear ratio of the first gear pair so as to be transmitted to the output shaft 3.

Next, the second speed (2nd) is achieved by engaging the brake (B-2) of the M/T portion M, engaging the brake (B-3) and engaging the third clutch (C-3) of the planetary portion S. When this state is generated in 1-2 shifting in which a previous shift speed is the first speed, the first gear pair 11A and 12A and the second gear pair 13A and 14A, which are both connected to the output shaft 3, are connected to the first shaft 1 and the second shaft 2 via the first and second planetary gears 40 and 50 by the engagement of both of the brakes (B-2, B-3), whereby an intermediate gear ratio between the gear ratio obtained by multiplying the gear ratio of the first gear pair 11A and 12A by the gear ratio of the first planetary gear 40, and the gear ratio obtained by multiplying the gear ratio of the second gear pair 13A and 14A by the gear ratio of the second planetary gear 50 are generated between the second shaft 2 and the first shaft 1, and a rotation relation between the sun gear 21 of the planetary gear 20 connected to the second shaft 2 and the carrier 22 connected to the first shaft 1 is determined. If this state is generated while running at the first speed, the rotation of the carrier 22 is a rotation which is equivalent to the engine rotation. However, the rotation of the sun gear 21 becomes a rotation which is reduced in speed therefrom, and the ring gear 23 is regulated by these rotations and is idling. In this state, the first clutch (C-1) is disengaged and the third clutch (C-3) is engaged in turn, and the engine rotation is input to the ring gear 23 which is idling, whereby there are generated torque transmission from the ring gear 23 to the carrier 22 according to the previously generated intermediate gear ratio and torque transmission from the ring gear 23 to the sun gear 21 via the carrier 22 in a parallel manner, and the torque is input to both of the planetary gears 40 and 50 via the first shaft 1 and the second shaft 2 and is transmitted to the output shaft 3 via both of the gear pairs 11A, 12A, 13A and 14A. Accordingly, the second shift speed is achieved. In the manner mentioned above, the rotation according to the intermediate gear ratio with respect to the gear ratio for serially reducing speed of the first planetary gear 40 and the first gear pair 11A and 12A and the gear ratio for serially reducing speed of the second planetary gear 50 and the second gear pair 13A and 14A is transmitted to the output shaft 3.

The third speed (3rd) is achieved by engaging the brake (B-3) of the M/T portion M, and engaging the second clutch (C-2) of the planetary portion S. In this state, the rotation of the engine (E/G) is input to the second shaft 2 via the second clutch (C-2), and the rotation is transmitted to the second ring gear 53 of the second planetary gear 50. Since the second planetary gear 50 outputs the reduced rotation to the second carrier 52 using the reaction force generated by fixing the second sun gear 51 by the engagement of the brake (33), the reduced rotation according to the gear ratio of the second gear pair 13A and 14A, which is caused by the input of the rotation, is transmitted to the output shaft 3. The output rotation is the reduced rotation according to the gear ratio for serially reducing the speed of the second planetary gear and the second gear pair.

The fourth speed (4th) is achieved by engaging the first clutch (C-4) of the M/T portion M, engaging the second brake (B-3) and engaging the third clutch (C-3) of the planetary portion S. When this state is generated in 3-4 shifting in which a previous shift speed is the third speed, the first gear pair 11A and 12A, which is connected to the output shaft 3, is connected to the first shaft 1 via the first clutch (C-4), and the second gear pair 13A and 14A, which is also connected to output shaft 3, is connected to the second shaft 2 via the second planetary gear 50 by the engagement of the brake (B-3), whereby an intermediate gear ratio between the gear ratio of the first gear pair 11A and 12A and the gear ratio obtained by multiplying the gear ratio of the second gear pair 13A and 14A by the gear ratio of the second planetary gear 50 is generated between the second shaft 2 and the first shaft 1, and a rotation relation between the sun gear 21 of the planetary gear 20 connected to the second shaft 2 and the carrier 22 connected to the first shaft 1 is determined. If this state is generated while running at the third speed, the rotation of the sun gear 21 is a rotation which is equivalent to the engine rotation. However, the rotation of the carrier 22 becomes a rotation which is reduced in speed therefrom, and the ring gear 23 is regulated by these rotations and is idling. In this state, the second clutch (C-2) is disengaged and the third clutch (C-3) is engaged in turn, and the engine rotation is input to the ring gear 23 which is idling. Thus, there are generated torque transmission from the ring gear 23 to the carrier 22 according to the previously generated intermediate gear ratio and torque transmission from the ring gear 23 to the sun gear 21 via the carrier 22 in a parallel manner. On one hand, the torque is input to the first gear pair 11A and 12A via the first shaft 1, and is reduced in speed so as to be transmitted to the output shaft 3. On the other hand, the torque is input to the second planetary gear 50 via the second shaft 2, is reduced in speed in a first stage and is reduced in speed in a second stage via the second gear pair 13A and 14A so as to be transmitted to the output shaft 3, whereby the fourth shift speed is achieved. In the manner mentioned above, the rotation on the basis of the serial speed reduction of the second planetary gear and the second gear pair and the rotation according to the intermediate gear ratio for the single speed reduction of the first gear pair are transmitted to the output shaft 3.

The fifth speed (5th) is achieved by engaging the clutch (C-4) of the M/T portion M, and engaging the first clutch (C-1) of the planetary portion S. In this state, the rotation of the engine (E/G) is input to the first shaft 1 via the first clutch (C-1), and the rotation is transmitted to the output shaft 3 via the first gear pair 11A and 12A through the clutch (C-4). The gear ratio in this case is the gear ratio of the first gear pair 11A and 12A.

The sixth speed (6th) is achieved by engaging the first clutch (C-4) of the M/T portion M, engaging the second clutch (C-5) and engaging the third clutch (C-3) of the planetary portion S. When this state is generated in 5-6 shifting in which a previous shift speed is the fifth speed, the first gear pair 11A and 12A, which is connected to the output shaft 3, is connected to the first shaft 1 via the first clutch (C-4) and the second gear pair 13A and 14A, which is also connected to the output shaft 3, is connected to the second shaft 2 via the second clutch (C-5), whereby an intermediate gear ratio between the gear ratio of the first gear pair 11A and 12A and the gear ratio of the second gear pair 13A and 14A is generated between the second shaft 2 and the first shaft 1, and a rotation relation between the sun gear 21 of the planetary gear 20 connected to the second shaft 2 and the carrier 22 connected to the first shaft 1 is determined. If this state is generated while running at the fifth speed, the rotation of the carrier 22 is a rotation which is equivalent to the engine rotation. However, the rotation of the sun gear 21 becomes a rotation which is increased in speed therefrom, and the ring gear 23 is regulated by these rotations and is idling. In this state, the first clutch (C-1) is disengaged and the third clutch (C-3) is engaged in turn, and the engine rotation is input to the ring gear 23 which is idling. Thus, there are generated torque transmission from the ring gear 23 to the carrier 22 in accordance with the previously generated intermediate gear ratio and torque transmission from the ring gear 23 to the sun gear 21 via the carrier 22 in a parallel manner. On one hand, the torque is input to the first gear pair 11A and 12A via the first shaft 1, and is reduced in speed so as to be transmitted to the output shaft 3. On the other hand, the torque is input to the second gear pair 13A and 14A via the second shaft, and is reduced in speed so as to be transmitted to the output shaft 3, whereby the sixth shift speed is achieved. In the manner mentioned above, the rotation in accordance with the intermediate gear ratio with respect to the gear ratio of the single second gear pair and the gear ratio of the single first gear pair is transmitted to the output shaft 3.

The seventh speed (7th) is achieved by engaging the clutch (C-5) of the M/T portion M, and engaging the second clutch (C-2) of the planetary portion S. In this state, the rotation of the engine (E/G) is input to the second shaft 2 via the second clutch (C-2), and the rotation is transmitted to the output shaft 3 via the second gear pair 13A and 14A through the clutch (C-5). The gear ratio in this case is the gear ratio of the second gear pair 13A and 14A.

The reverse shift speed (Rev) is achieved in this gear train by engaging the brake (B-2) of the M/T portion M, and engaging both of the second clutch (C-2) and the brake (B-1) of the planetary portion S. In this state, the rotation of the engine (E/G) is input to the sun gear 21 via the second clutch (C-2), and the rotation of the carrier 22 based on the reaction force due to the engagement of the ring gear 23 by the brake (B-1) is input to the first ring gear 43 of the M/F portion M from the first shaft 1. On the other hand, since the sun gear 41 of the first planetary gear 40 is fixed by the brake (B-2), the reduced reverse rotation output from the first carrier 42 is further reduced in speed by the first gear pair 11A and 12A so as to be transmitted to the output shaft 3.

Motions of three speed-changing elements of the planetary gear 20 in the respective shift speeds achieved in the manner mentioned above are shown in the form of a speed diagram in FIG. 60. The notation system of the speed diagram is the same as in the first embodiment. In the case of this diagram, the numerals surrounded by circles indicate respective transmission state. Reference numeral (1) denotes a serial transmission state between the first planetary gear and the first gear pair, (2) denotes a serial transmission state between the second planetary gear and the second gear pair, (3) denotes a transmission state of the single first gear pair, and (4) denotes a transmission state of the single second gear pair.

As is evident from the speed diagram, in the twelfth embodiment as well, since there are generated the gear ratios serving as the intermediate shift speeds with respect to the odd shift speeds which can be originally achieved by the first and second gear pairs of the M/T portion M and the first and second planetary gears, the even shift speeds constitute transit speeds for the adjacent shift speeds. Therefore, in the case of this transmission as well, it is possible to add the three shift speeds in the middle of the respective shift speeds in the four speed transmission such that the number of the gear ratio steps is increased without increasing the gear pairs and the planetary gears. Further, in the same manner as in the first embodiment, the shifting can be performed without generating any torque escape.

Figures 61, 62:
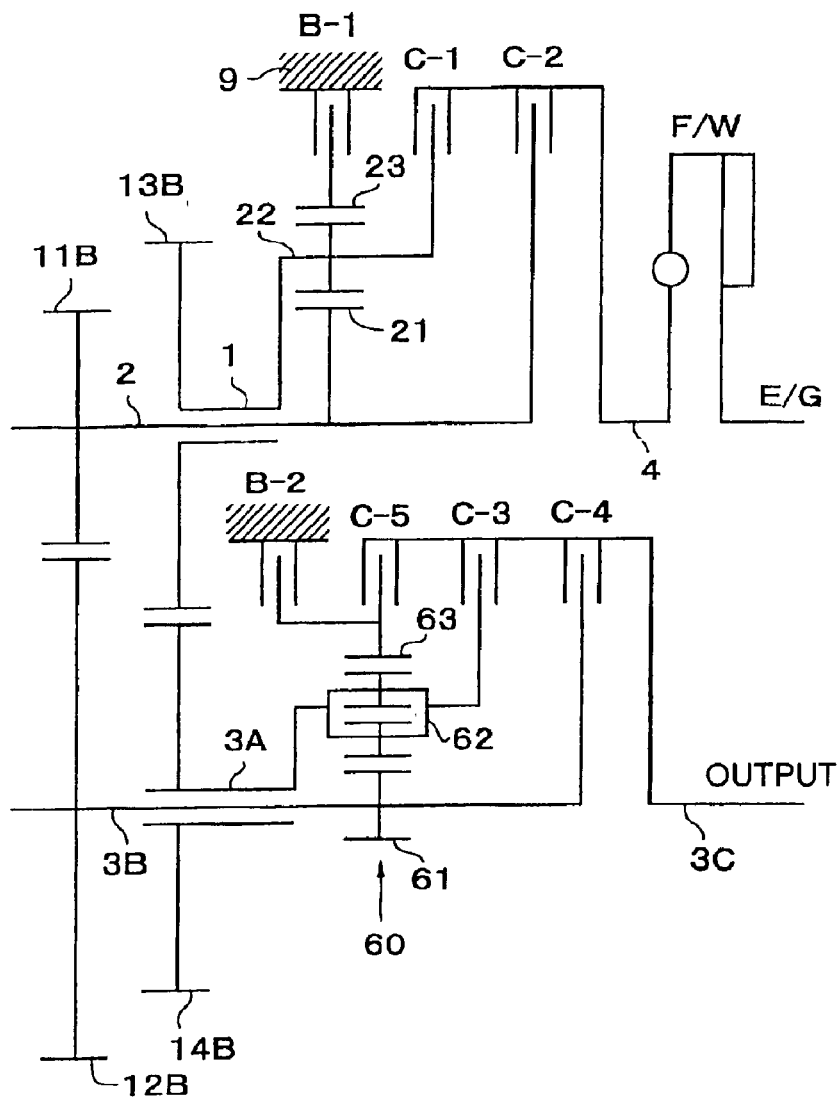
FIG. 61 is a schematic view of a gear train according to a thirteenth embodiment.
FIG. 62 is a table of operations of the gear train according to the thirteenth embodiment.
Figure 63:
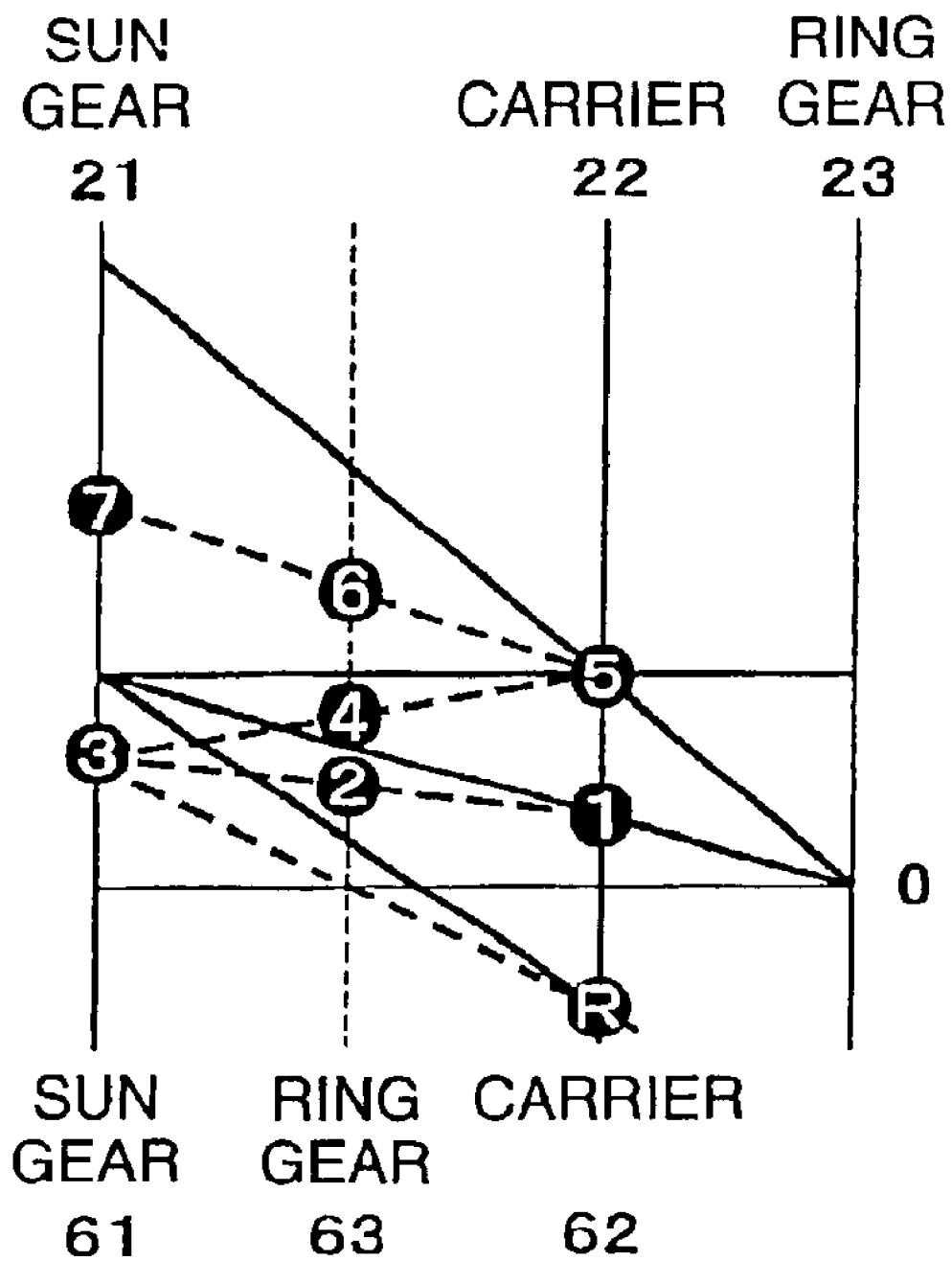
FIG. 63 is a speed diagram of the gear train according to the thirteenth embodiment.

Next, FIGS. 61 to 63 show a thirteenth embodiment according to the present invention. In this embodiment, the M/T portion M includes a planetary gear 60 as a shifting element. FIG. 61 is a schematic view showing a structure of a gear train thereof. A front planetary portion corresponding to the planetary portion in the previous embodiments includes a single planetary gear, first and second clutches (C-1, C-2) and a first brake (B-1), and a rear planetary portion corresponding to the M/T portion includes two lines of gear pairs 11B, 12B, 13B and 14B, a single double planetary gear 60, third to fifth clutches (C-3 to C-5), and a second brake (B-2).

Then, in the front planetary portion, the carrier 22 of the planetary gear is always connected to the first shaft 1 which is connected to the second gear pair 13B and 14B, and can be connected to the input shaft 4 via the first clutch (C-1), the sun gear 21 is always connected to the second shaft 2 which is connected to the first gear pair 11B and 12B, and can be connected to the input shaft 4 via the second clutch (C-2), and the ring gear 23 can be engaged with the transmission case 9 via the first brake (B-1). Further, in the rear planetary portion, a carrier 62 of the planetary gear 60 is always connected to a first shaft 3A which is connected to the second gear pair 13B and 14B, and can be connected to the output shaft 3 via the third clutch (C-3), a sun gear 61 is always connected to a second shaft 3B which is connected to the first gear pair 11B and 12B, and can be connected to the output shaft 3 via the fourth clutch (C-4), and a ring gear 63 can be connected to the output shaft 3 via the fifth clutch (C-5), and can be engaged with the transmission case 9 via the second brake (B-2).

FIG. 62 shows an operation thereof. As shown in FIG. 62, in this transmission, a first speed (1st) to a fourth speed (4th)

are achieved by power transmission according to the input by the engagement of the second clutch (C-2), the fourth speed (4th) to a seventh speed (7th) are achieved by power transmission according to the input by the engagement of the first clutch (C-1), and the output of the respective shift speeds is mainly achieved by selecting the engagement of the third clutch (C-3) to the fifth clutch (C-5) on the output side. Accordingly, flows of the power transmission of these two systems are first described. A rotation of the carrier 22 in the front planetary gear is transmitted to the second gear pair 13B and 14B through the first shaft 1, is reduced in speed according to a gear ratio of the second gear pair 13B and 14B (hereinafter, the gear ratio is set to 1 for convenience and the description is briefly given), and is transmitted to the carrier 62 of the rear planetary portion via the output side first shaft 3A (hereinafter, it is referred to as a first flow). A rotation of the sun gear 21 in the front planetary gear is transmitted to the first gear pair 11B and 12B through the second shaft 2, is reduced in speed according to a gear ratio thereof, and is transmitted to the sun gear 61 of the rear planetary portion via the output side second shaft 3B (hereinafter, it is referred to as a second flow).

During the generation of the two flows, the first speed (1st) is achieved by engaging the third clutch (C-3) of the rear planetary portion and engaging the second clutch (C-2) of the front planetary portion and the first brake (B-1). At this time, the first flow leads to the output, and the rotation of the carrier which is a base of the first flow becomes a low speed rotation by the ring gear 23 being fixed, and this low speed rotation is transmitted to the carrier 62, and is output via the third clutch (C-3) so as to be a first speed rotation. In the case of the second speed (2nd), only the output by the engagement of the third clutch (C-3) is switched to the output by the engagement of the fifth clutch (C-5) in the same second flow. At this time, since a rotation of the ring gear 63 of the rear planetary portion becomes a rotation which is increased in speed with respect to the rotation of the carrier 62, the second speed rotation which is output via the fifth clutch (C-5) becomes slightly higher than the first speed rotation. In the case of the third speed (3rd), the relation of power transmission is substantially the same. Since the second flow is output by switching to the engagement of the fourth clutch (C-4) in this case, the engine rotation is reduced in speed only by the gear ratio of the first gear pair 11B and 12B after passing through the sun gear 21 of the front planetary portion, and is output through the sun gear 61 of the rear planetary portion. In this case, since the engagement of the first brake (B-1) or the first clutch (C-1) is not involved in the power transmission, it is possible to prepare the engagement of one of these elements for the next shifting. However, the front planetary gear is locked if both of the elements are engaged simultaneously. Therefore, it is not permitted to simultaneously engage the first brake (B-1) and the first clutch (C-1).

In the cases of the fourth speed (4th) and subsequent speeds, a main flow is the first flow. In the fourth speed (4th), the sun gear 61 rotates at a speed lower than the engine rotation of the carrier 62 by the speed reduced by means of the first gear pair 11B and 12B, in the rear planetary portion, according to the first flow and the second flow. Therefore, the rotation according to an intermediate speed ratio between both of the rotations is output from the ring gear 63 via the fifth clutch (C-5), and this rotation becomes the fourth speed rotation. In the next fifth speed (5th), the first flow is directly output by switching to the output via the third clutch (C-3), and the engine rotation becomes the fifth speed rotation which is output to the output shaft 3 via the third clutch (C-3).

In the sixth speed (6th), the brake (B-1) is engaged, whereby the rotation of the sun gear 21 which is a base of the second flow is increased in speed, and the rotation of the sun gear 61 becomes accordingly the increased rotation. Therefore, the sixth rotation which is output from the ring gear 63 via the fifth clutch (C-5) becomes the increased rotation. In the seventh speed (7th), since the output from the ring gear 63 is switched to the output from the sun gear 61 in the same state, the rotation which is further increased in speed is output to the output shaft 3 so as to be the rotation of the seventh speed.

In the case of the reverse (Rev), the rotation of the carrier 62, which reversely rotates by fixing the ring gear 63 by the engagement of the first brake (B-2) with respect to the rotation of the sun gear 61 according to the second flow, is output to the output shaft 3 via the third clutch (C-3). Thus, the reverse (Rev) is achieved.

FIG. 63 is a speed diagram showing a relation of speed ratios of the respective rotating elements in the respective shift speeds. This speed diagram is described by following a normal notation system in which the engine rotational speed ratio is set to 1.

Figure 64:
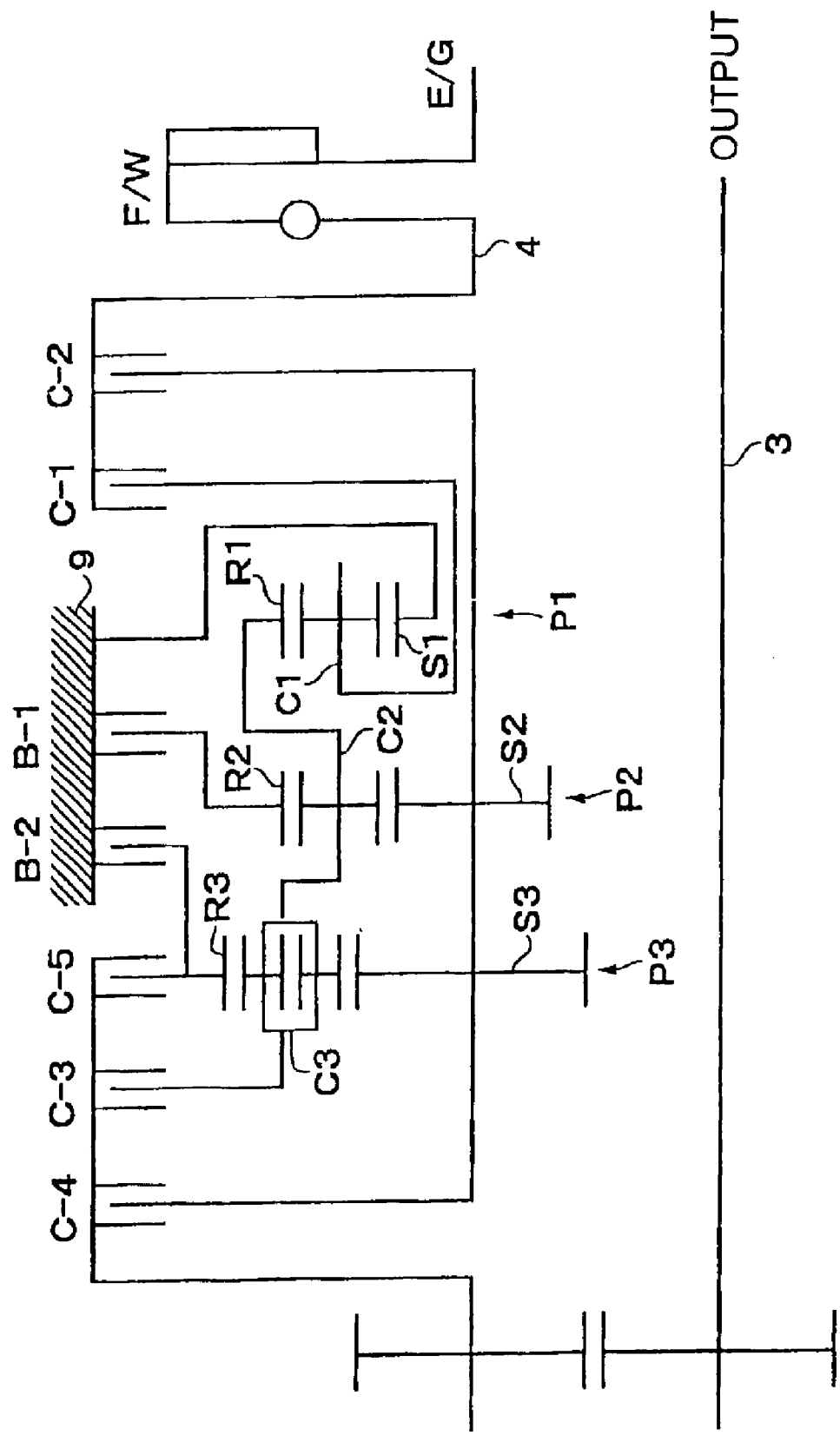
FIG. 64 is a schematic view of a gear train according to a fourteenth embodiment.
Figures 65, 66:
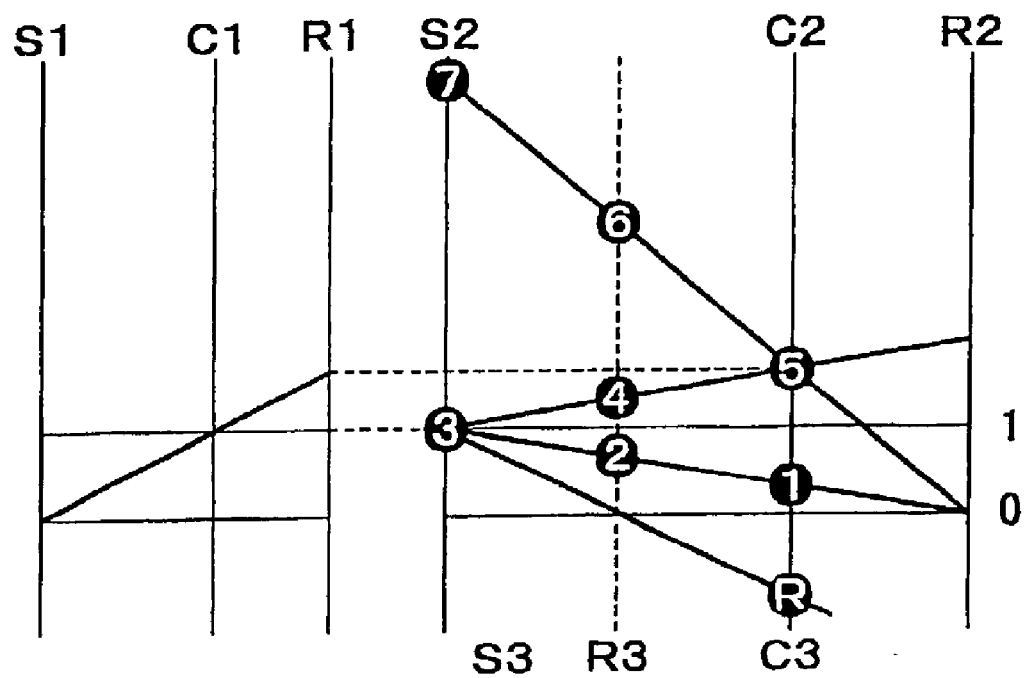
FIG. 65 is a table of operations of the gear train according to the fourteenth embodiment.
FIG. 66 is a speed diagram of the gear train according to the fourteenth embodiment.

FIGS. 64 to 66 show a fourteenth embodiment according to the invention. This embodiment is characterized in that all of the engaging elements and the planetary gears are arranged on the input shaft side. FIG. 64 is a schematic view showing a structure of a gear train thereof. A first planetary gear P1 in this embodiment is composed of a single planetary gear, and performs a function of generating an increased rotation. A second planetary gear P2 is also composed of a single planetary gear, and a third planetary gear P3 is composed of a double planetary gear. Engaging elements in this embodiment include first and second clutches (C-1, C-2) on an input side, third to fifth clutches (C-3 to C-5) on an output side, and first and second brakes (B-1, B-2) for supporting a reaction force, as in the previous thirteenth embodiment.

In the first planetary gear P1, a sun gear S1 is always fixed to the transmission case 9, a carrier C1 can be connected to the input shaft 4 via the first clutch (C-1), and a ring gear R1 is directly connected to a carrier C2 of the second planetary gear P2. The second and third planetary gears P2 and P3 are directly connected to both of sun gears S2 and S3, can be connected to the input shaft 4 via the second clutch (C-2), can be connected to a counter gear pair via the fourth clutch (C-4), are also directly connected to both of carriers C2 and C3, and can be connected to the counter gear pair via the third clutch (C-3). Respective ring gears R2 and R3 can be fixed to the transmission case 9 via the first brake (B-1) and the second brake (B-2), and the ring gear R3 of the third planetary gear P3 can be further connected to the counter gear pair via the fifth clutch (C-5).

In this embodiment as well, the first flow which is generated from the ring gear R1 of the first planetary gear P1 reaches the third clutch (C-3) through two carriers C2 and C3. Further, the second flow reaches the fourth clutch (C-4) through two sun gears S2 and S3. Further, as operations are shown in FIG. 65, the second flow is a main flow in the first to fourth speeds, and the first flow is a main flow in the fourth to seventh speeds.

In the case of a first speed (1st), the engine rotation is input to the second sun gear S2 by the engagement of the second clutch (C-2), and the reduced rotation of the second carrier C2 taking the reaction force in the second ring gear R2 according to the engagement of the first brake (B-1) is output via the third clutch (C-3). Thus, the first speed (1st)

is achieved. In the case of a second speed (2nd), the reduced rotation of the third ring gear R3 according to the engagement of the fifth clutch (C-5) is output in the same state. Thus, the second speed (2nd) is achieved. Further, in the case of a third speed (3rd), the engine rotation via the second clutch (C-2) is output via the fourth clutch (C-4) after passing through both of the sun gears S2 and S3. Thus, the third speed (3rd) is achieved.

In the case of a fourth speed (4th) and subsequent speeds, the increased rotation of the first flow according to the engagement of the first clutch (C-1) has an effect. The increased rotation is input to the carrier C3 of the third planetary gear P3, and the ring gear R3 rotates at the increased speed according to the engine rotation of the sun gear S3. This rotation is output via the fifth clutch (C-5) as the increased rotation of the ring gear R3. Thus, the fourth speed is achieved. Next, in a fifth speed (5th), the increased rotation of the first ring gear R1 is output from the third carrier C3 via the third clutch (C-3) as it is so as to be a fifth speed rotation. Further, in a sixth speed (6th), this rotation is switched to an output of the third ring gear R3 via the fifth clutch (C-5) so as to be a further increased output. Then, in the case of a seventh speed (7th), the increased rotation according to the engagement of the first brake (B-1) is output from the fourth clutch (C-4) as the increased rotation of the second sun gear S2 according to the input of the second carrier C2. Accordingly, the seventh speed (7th) becomes a highest shift speed. A reverse (Rev) is generated in the third planetary gear P3. In this case, the third ring gear R3 is fixed according to the engagement of the first brake (B-1), and the engine rotation is input to the third sun gear S3, whereby the third carrier C3 outputs an output which is a reverse rotation at the reduced speed via the third clutch (C3). Thus, the reverse (Rev) is achieved.

FIG. 66 is a speed diagram showing a relation of the rotational ratios of the respective rotating elements in the respective shift speeds mentioned above. This speed diagram is also described following the normal notation system in which the engine rotational speed ratio is set to 1. Further, a circle with parentheses in the table of operations in FIG. 65 indicates that the engagement state of the engaging element is allowed to be maintained irrespective of the shifting in the shift speed thereof, for the same reason as described in the description of the operations according to the previous thirteenth embodiment. In this case as well, it is not permitted to simultaneously engage both of the engaging elements because the locking of the planetary gear is caused.

Figures 67, 68:
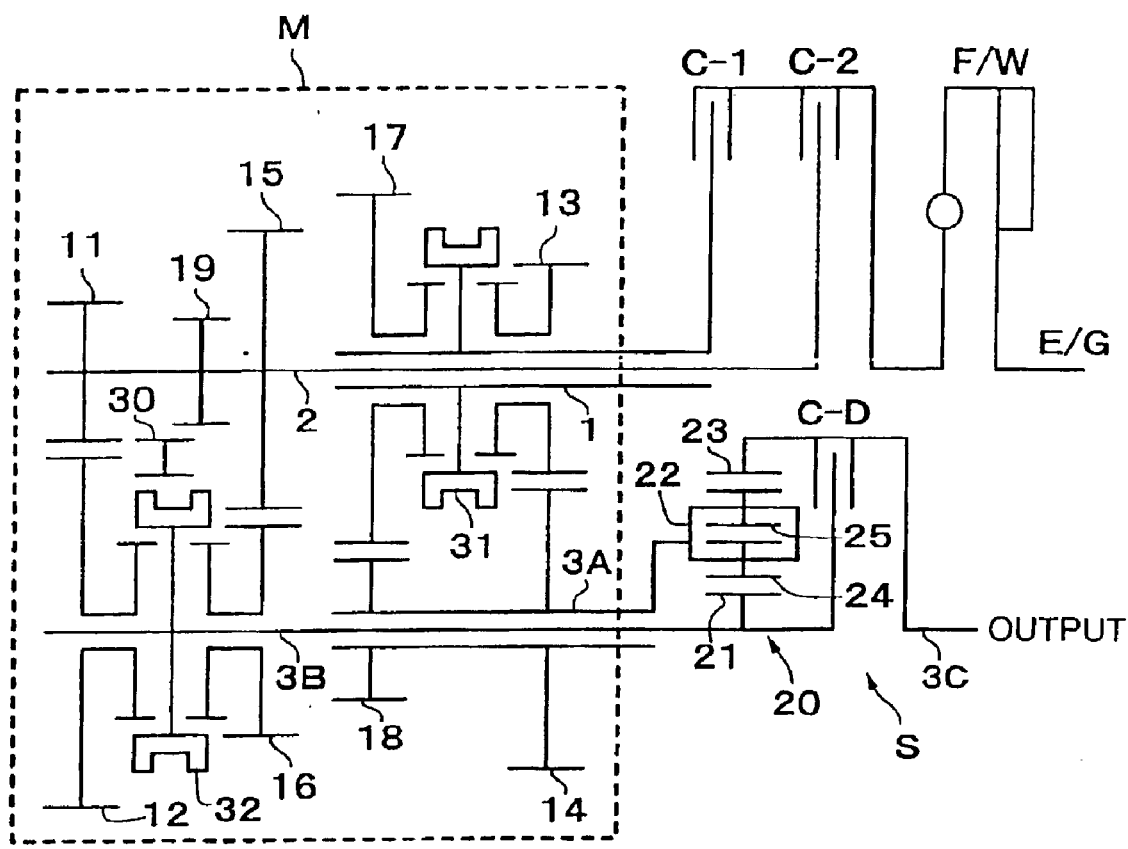
FIG. 67 is a schematic view of a gear train according to a fifteenth embodiment.
FIG. 68 is a table of operations of the gear train according to the fifteenth embodiment.
Figure 69:
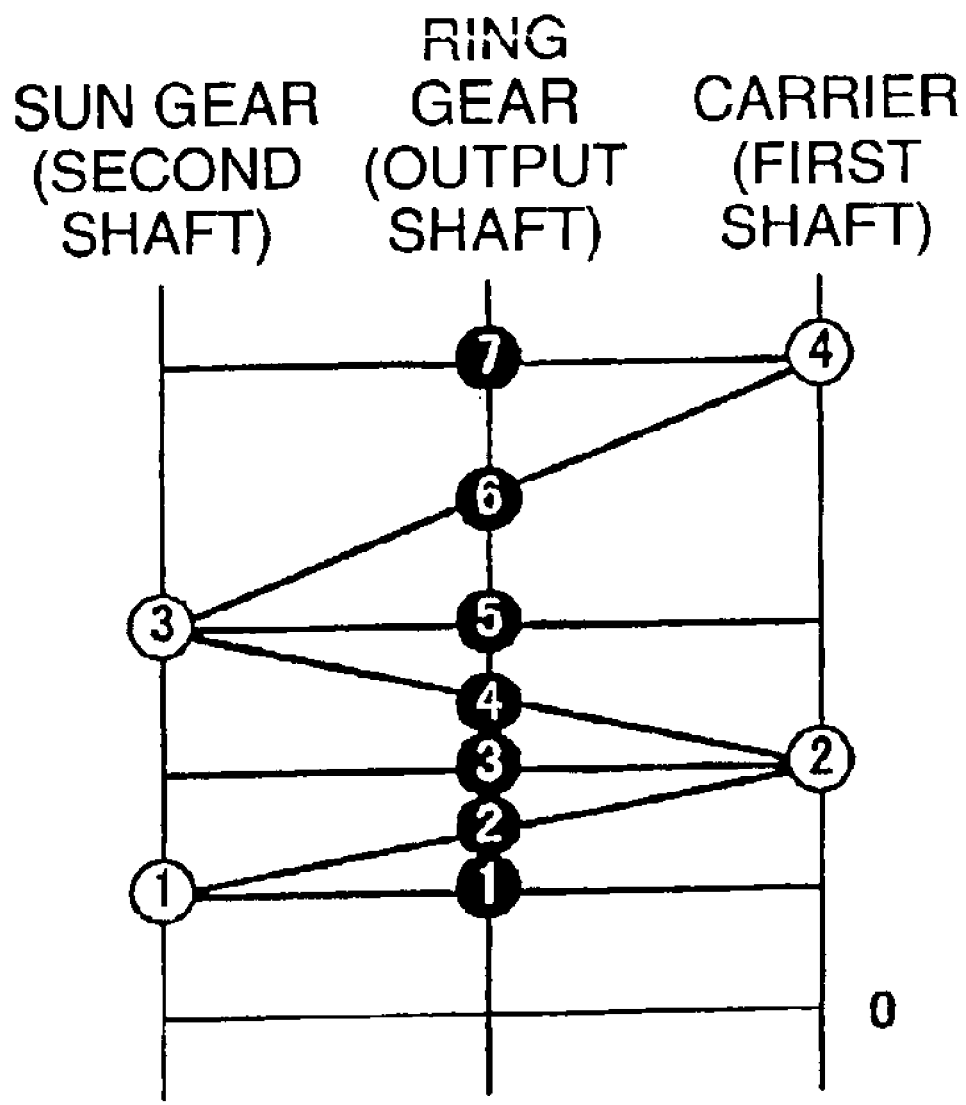
FIG. 69 is a speed diagram of the gear train according to the fifteenth embodiment.

Next, FIGS. 67 to 69 show a fifteenth embodiment of the invention. This embodiment is characterized in that the planetary gear 20 of the planetary portion S, which is arranged on the upstream side of the M/T portion M in the power transmitting flow in the previous embodiments, is arranged on a downstream side. FIG. 67 is a schematic view showing the gear train structure thereof. The M/T portion M in this embodiment is substantially the same as in the previous first embodiment. However, since the planetary gear 20 is arranged on the downstream side, the output shaft 3A of the second and fourth gear pairs is a separate shaft forming a double shaft. In this case, the driven gears 14 and 18 of the second and fourth gear pairs are fixed to the first output shaft 3A, and the dog clutch 32 of the first and third gear pairs 11, 12, 15, and 16 is connected to the second output shaft 3B so as to be movable in an axial direction and be incapable of rotating.

In the planetary portion S, the planetary gear 20 and the clutch for controlling the shifting are moved to the downstream side of the M/T portion M as a direct clutch (C-D) while leaving two input clutches (C-1, C-2). In this embodiment, the sun gear 21 of the planetary gear 20 is connected to the second output shaft 3B of the M/T portion M, the second output shaft 3B is connected to the output shaft 3 via the direct clutch (C-D), the carrier 22 supporting the pinions 24 and 25 are connected to the first output shaft 3A, and the ring gear 23 is connected to the output shaft 3.

As operations are shown in FIG. 68 using a table, the transmission having the structure mentioned above achieves the first speed (1st) by connecting the first gear pair 11 and 12 (in the description of this embodiment, the gear pair is briefly denoted in the same manner as in the first embodiment) of the M/T portion M to the second output shaft 3B by the dog clutch 32 and engaging the second clutch (C-2) of the planetary portion S with the direct clutch (C-D). In this state, the rotation of the engine (E/G) is input to the drive gear 11 of the M/T portion M via the second clutch (C-2) of the planetary portion S, is reduced in speed by the first gear pair (1), is transmitted to the second output shaft 3B via the dog clutch 32, and is transmitted to the output shaft 3C via the direct clutch (C-D).

Next, the second speed (2nd) is achieved by connecting the first gear pair (1) of the M/T portion M to the second output shaft 3B by the dog clutch 32, connecting the second gear pair (2) to the first output shaft 3A by the dog clutch 31 and engaging both of the clutches (C-1, C-2) of the planetary portion S. In this state, the engine rotation is simultaneously input to the first gear pair 11 and 12 and the second gear pair 13 and 14 by the engagement of both of the clutches (C-1, C-2), is reduced in speed thereby so as to be output to the first output shaft 3A and the second output shaft 3B. Owing to the input of the rotations, the rotations of the sun gear 21 of the planetary gear 20 and the carrier 22 are regulated in accordance with the intermediate gear ratio between these gear ratios, and the intermediate rotation between the rotations is transmitted to the output shaft 3C from the ring gear 23.

The third speed (3rd) is achieved by connecting the second gear pair (2) of the M/T portion M to the first output shaft 3A by the dog clutch 31, and engaging the clutch (C-1) of the planetary portion S with the direct clutch (C-D). In this state, the rotation of the engine (E/G) is input to the second gear pair (2) via the clutch (C-1), and the rotation is transmitted to the second gear pair (2) via the dog clutch 31, and is reduced in speed there according to the gear ratio of the second gear pair (2) so as to be transmitted to the first output shaft 3A. This rotation is input to the carrier 22 of the planetary gear 20. However, since the planetary gear 20 is in a direct connection state due to the engagement of the direct clutch (C-D), this rotation is transmitted to the output shaft 3C as it is.

The fourth speed (4th) is achieved by connecting the second gear pair (2) of the M/T portion M to the first output shaft 3A by the dog clutch 31, connecting the third gear pair (3) to the second output shaft 3B by the dog clutch 32, and engaging both of the clutches (C-1, C-2) of the planetary portion S. In this state, the engine rotation is simultaneously input to the second gear pair (2) and the third gear pair (3) by the engagement of both of the clutches (C-1, C-2), and is reduced in speed thereby so as to be output to the first output shaft 3A and the second output shaft 3B. Owing to the input of these rotations, the rotations of the sun gear 21 of the planetary gear 20 and the carrier 22 are regulated, and the intermediate rotation between the rotations is transmitted to the output shaft 3C from the ring gear 23.

The fifth speed (5th) is achieved by connecting the third gear pair (3) of the M/T portion M to the second output shaft 3B by the dog clutch 32, and engaging the second clutch (C-2) of the planetary portion S with the direct clutch (C-D). In this state, the rotation of the engine (E/G) is input to the second shaft 2 via the second clutch (C-2), and is reduced in speed according to the gear ratio of the third gear pair (3) there so as to be transmitted to the second output shaft 3B via the dog clutch 32. This rotation is input to the sun gear 21 of the planetary gear 20. However, since the planetary gear 20 is in the direct connection state by the direct clutch (C-D), this rotation is transmitted to the output shaft 3C as it is.

The sixth speed (6th) is achieved by connecting the third gear pair (3) of the M/T portion M to the second output shaft 3B by the dog clutch 32, connecting the fourth gear pair (4) to the first output shaft 3A by the dog clutch 31, and engaging both of the clutches (C-1, C-2) of the planetary portion S. In this state, the engine rotation is simultaneously input to the third gear pair (3) and the fourth gear pair (4) by the engagement of both of the clutches (C-1, C-2), and is reduced in speed thereby so as to be output to the first output shaft 3A and the second output shaft 3B. Owing to the input of these rotations, the rotations of the sun gear 21 of the planetary gear 20 and the carrier 22 are regulated, and the intermediate rotation between the rotations is transmitted to the output shaft 3C from the ring gear 23.

The seventh speed (7th) is achieved by connecting the fourth gear pair (4) of the M/T portion M to the first output shaft 3A by the dog clutch 31, and engaging the first clutch (C-1) of the planetary portion S with the direct clutch (C-D). In this state, the rotation of the engine (E/G) is input to the fourth gear pair (4) via the first clutch (C-1), and the rotation is transmitted to the fourth gear pair (4) via the dog clutch 31, and is reduced in speed according to the gear ratio of the fourth gear pair (4) there so as to be transmitted to the first output shaft 3A. This rotation is input to the carrier 22 of the planetary gear 20. However, since the planetary gear 20 is in the direct connection state by the direct clutch (C-D), this rotation is transmitted to the output shaft 3C as it is.

In this case, the reverse shift speed (Rev) is achieved by making the dog clutch 32 of the M/T portion M neutral, connecting the reverse gear train 19 and 30 to the second output shaft 3B, and engaging the second clutch (C-2) of the planetary portion S with the direct clutch (C-D). In this state, the rotation of the engine (E/G) is input to the second shaft 2 via the second clutch (C-2), and the rotation is reduced in speed by the reverse gear train 19 and 30. Then, the direction of the rotation is reversed with respect to the rotation in each of the shift speeds via the counter gear 30 so as to be transmitted to the second output shaft 3B, and is transmitted to the output shaft 3C via the direct clutch (C-D).

In this fifteenth embodiment, the respective odd shift speeds are achieved by using the speed-changing elements of the planetary gear 20 as simple power transmission members which are not involved in the shifting. However, the respective even shift speeds are achieved by making the speed-changing elements of the planetary gear 20 function. Further, each of these even shift speeds is achieved by simultaneously connecting two gear pairs which are connected at a time of achieving the odd shift speeds sandwiching the even shift speed therebetween.

Motions of three speed-changing elements of the planetary gear 20 in the respective shift speeds achieved in the manner mentioned above are shown in the form of a speed diagram in FIG. 69. The speed diagram is described following a notation system in which a shift characteristic is shown with reference to an input rotation number of a general automatic transmission (a speed ratio 1). The speed ratios of the sun gear, the ring gear and the carrier corresponding to the respective speed-changing elements are described using a white numeral on a black circle background which indicates the shift speed. These speed ratios are obtained by setting the engine rotation number to the speed ratio 1. Accordingly, the fact that the output shaft speed ratio is highest in the seventh speed means that the speed reduction ratio of the transmission is smallest with respect to the engine rotation. Further, the numerals surrounded by circles indicate the first to fourth gear pairs of the M/T portion M which are connected in the respective shift speeds.

As is evident from the speed diagram, the even shift speeds correspond to the gear ratios serving as the intermediate shift speeds with respect to the odd shift speeds which can be originally achieved by the first to fourth gear pairs of the M/T portion M. The even shift speeds are achieved by simultaneously transmitting the power by means of the gear pair for achieving both of the adjacent even shift speeds, and also become transient speeds for the odd shift speeds adjacent thereto. Therefore, according to the transmission of this embodiment, it is possible to add the three shift speeds in the middle of the respective shift speeds in the conventional constant-mesh four speed transmission such that the number of the gear ratio steps is increased.

Figure 70:
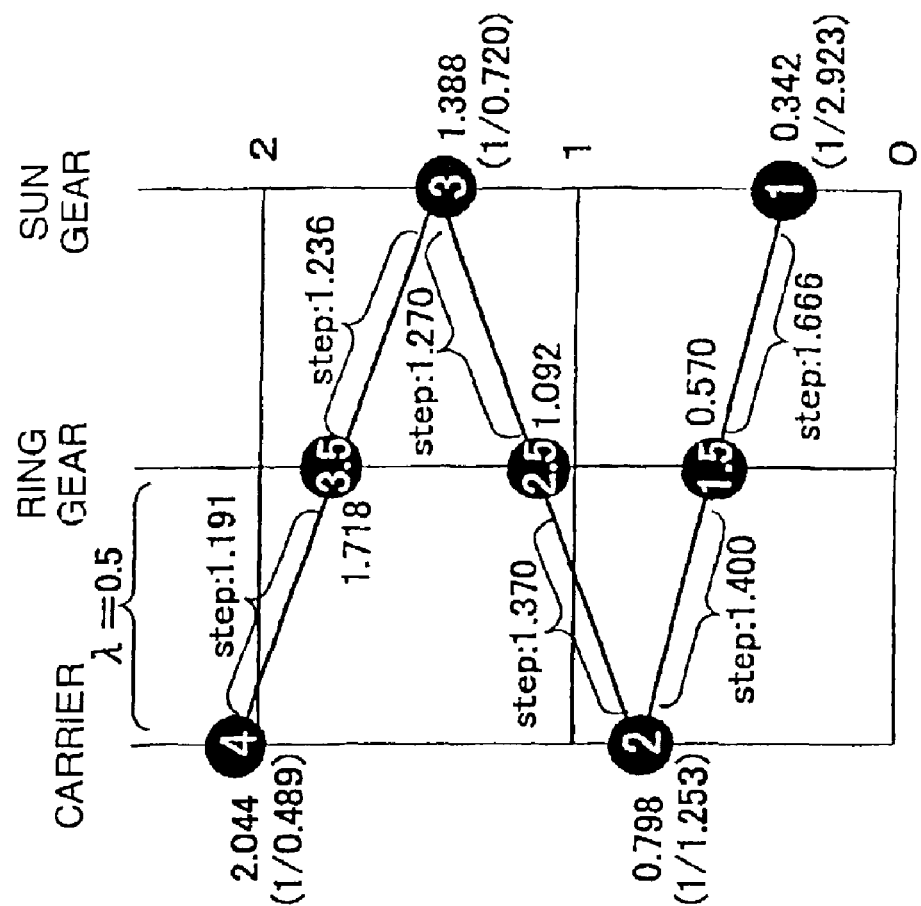
FIG. 70 is a speed diagram showing a characteristic of a gear ratio step according to the fifteenth embodiment in comparison with the first and second embodiments.
Figure 70:
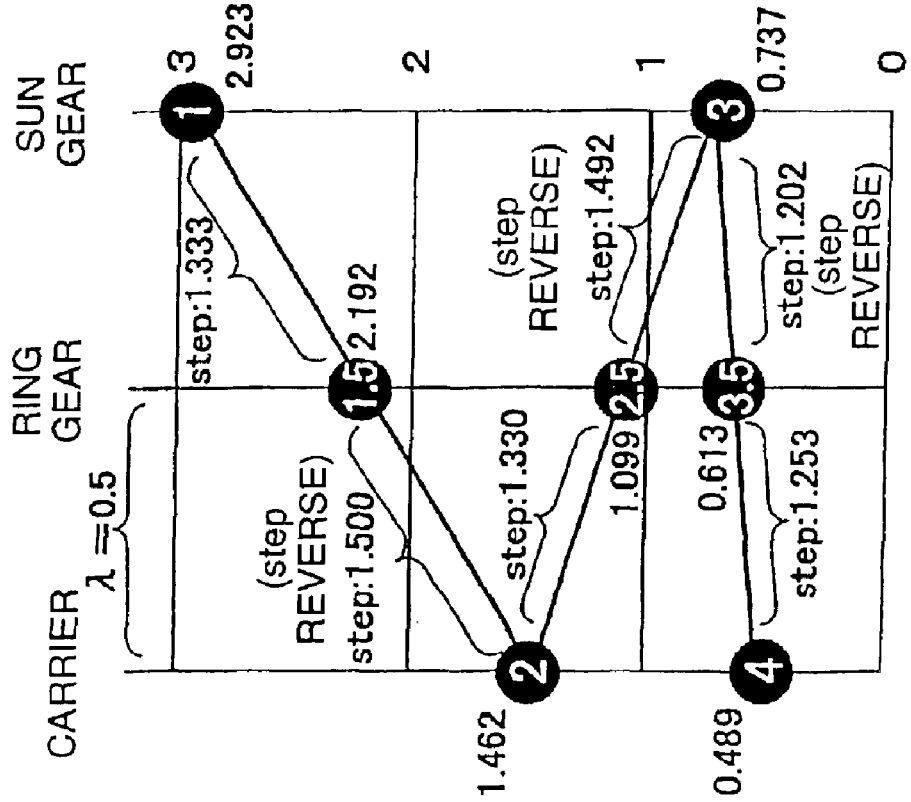

Further, in the case of this fifteenth embodiment, it is possible to obtain an advantage that the setting can be easily made such that the gear ratio step becomes narrower toward the higher shift speed side. FIG. 70 shows a comparison with the previous two embodiments (refer to FIGS. 1 and 58) by using a speed diagram (in this case, however, the respective shift speeds are described by denoting the shift speed achieved according to the gear ratio of the single gear pair by an integral number, and denoting the shift speed according to the intermediate gear ratio by a broken number). In this embodiment, when the gear ratios in the lowest speed and the highest speed (corresponding to the fourth speed and the seventh speed in the embodiment) are set to 0.342 and 2.044, and the gear ratio is set so that an improved gear ratio step can be obtained between the second and third speeds as the middle shift speeds (corresponding to the third and fifth speeds in the embodiment), a relation of low speed side gear ratio step>high speed side gear ratio step is established with regard to the gear ratio steps between all the shift speeds including the intermediate shift speeds, in the case of the arrangement according to the present embodiment shown in FIG. 70(b). On the other hand, in the case of the arrangement according to the embodiment shown in FIG. 70(a), it is evident that a reverse relation of low speed side gear ratio step<high speed side gear ratio step is generated between 1.5th and 2nd speeds, between 2.5th and 3rd speeds and between 3rd and 3.5th speeds, when the gear ratio $\lambda$ between the carrier of the planetary gear and the ring gear is set to 0.5. As mentioned above, in the present embodiment, it is possible to easily set the gear ratio steps such that all the even shift speeds as the intermediate shift speeds become close to a higher shift speed side.

Figure 71:
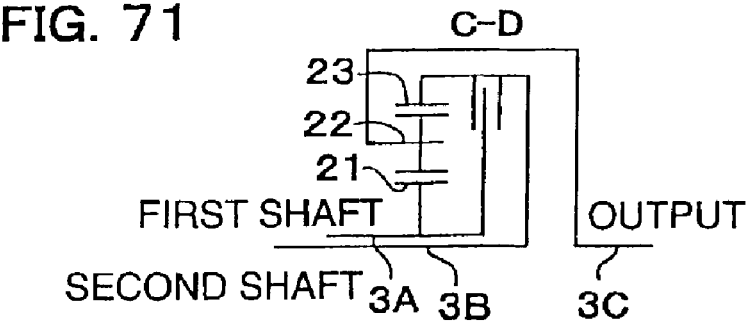
FIG. 71 is a schematic view showing a first modified embodiment in the case where the planetary portion in the gear train according to the fifteenth embodiment is constructed as a single planetary structure.
Figure 72:
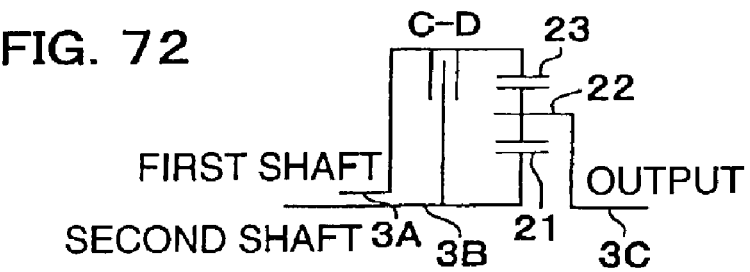
FIG. 72 is a schematic view showing a second modified embodiment of the planetary portion.
Figure 73:
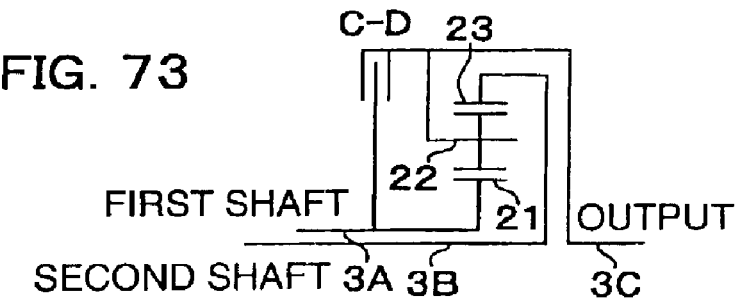
FIG. 73 is a schematic view showing a third modified embodiment of the planetary portion.
Figure 74:
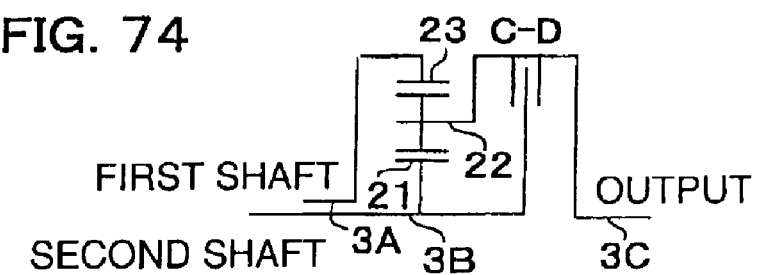
FIG. 74 is a schematic view showing a fourth modified embodiment of the planetary portion.
Figure 75:
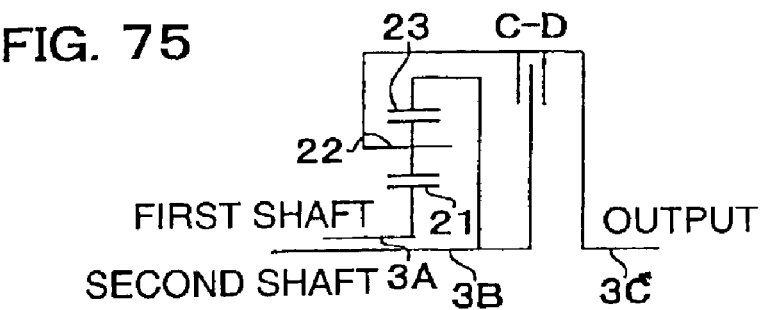
FIG. 75 is a schematic view showing a fifth modified embodiment of the planetary portion.
Figure 76:
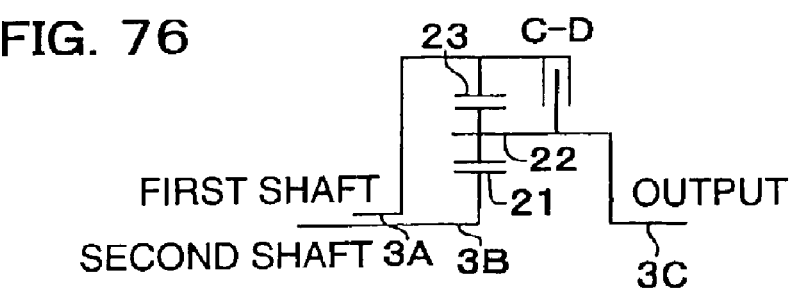
FIG. 76 is a schematic view showing a sixth modified embodiment of the planetary portion.

As mentioned above, even in the case where the planetary gear is arranged on the output side, the planetary portion can be variously modified in the same manner as the first embodiment and the second embodiment. Exemplification thereof is as follows. First, in the case where the single planetary structure is assumed and lock-up is performed between the sun gear 21 and the ring gear 23, there is a structure as shown in FIG. 71, in which the sun gear 21 is connected to the first shaft 3A, the ring gear 23 is connected to the second shaft 3B, and the carrier 22 is connected to the output shaft 3C. Further, there can be considered a structure as shown in FIG. 72, in which the sun gear 21 is connected to the second shaft 3B, and the carrier 22 is connected to the output shaft 3C. Next, in the case where lock-up is performed between the carrier 22 and the sun gear 21, there can be considered a structure as shown in FIG. 73, in which the sun gear 21 is connected to the first shaft 3A, the ring gear 23 is connected to the second shaft 3B, and the carrier 22 is connected to the output shaft 3C, and a structure as shown in FIG. 74, in which the sun gear 21 is connected to the second shaft 3B, the ring gear 23 is connected to the first shaft 3A, and the carrier 22 is connected to the output shaft 3C. Further, in the case where lock-up is performed between the ring gear 23 and the carrier 22, there can be considered a structure as shown in FIG. 75, in which the sun gear 21 is connected to the first shaft 3A, the ring gear 23 is connected to the second shaft 3B, and the carrier 22 is connected to the output shaft 3C, and a structure as shown in FIG. 76, in which the ring gear 23 is connected to the first shaft 3A, the sun gear 21 is connected to the second shaft 3B, and the carrier 22 is connected to the output shaft 3C.

Figure 77:
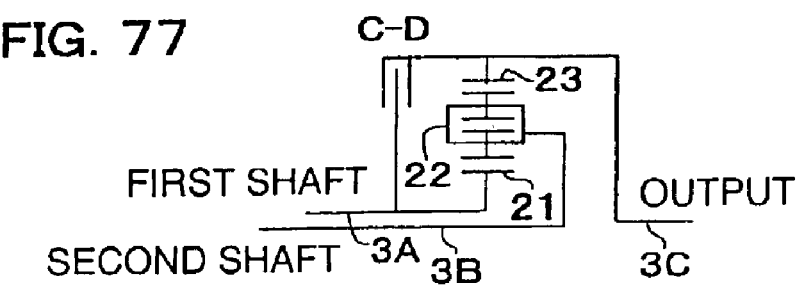
FIG. 77 is a schematic view showing a first modified embodiment in the case where the planetary portion is constructed as a double planetary structure.
Figure 78:
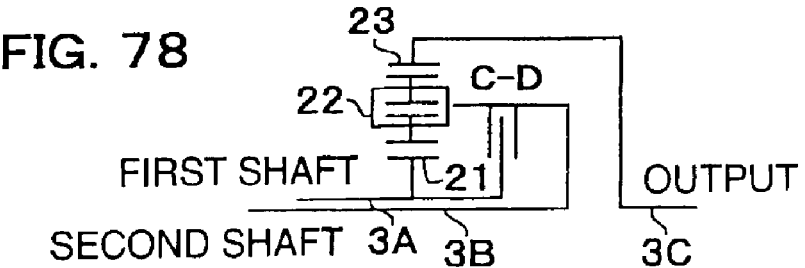
FIG. 78 is a schematic view showing a second modified embodiment of the planetary portion.
Figure 79:
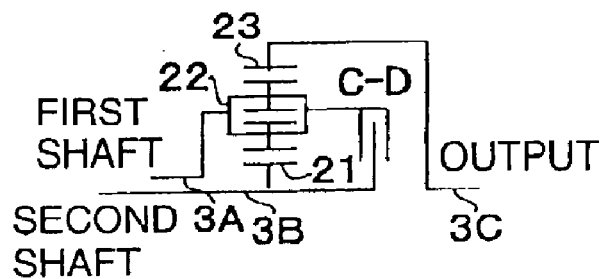
FIG. 79 is a schematic view showing a third modified embodiment of the planetary portion.
Figure 80:
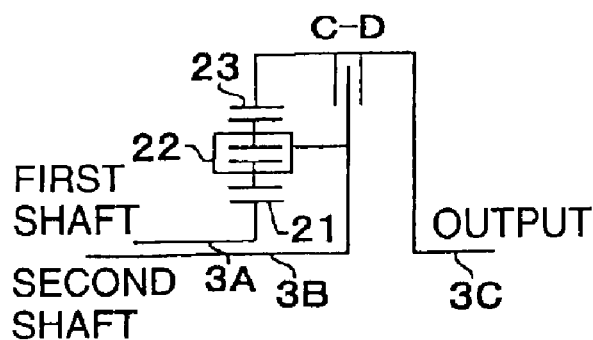
FIG. 80 is a schematic view showing a fourth modified embodiment of the planetary portion.
Figure 81:
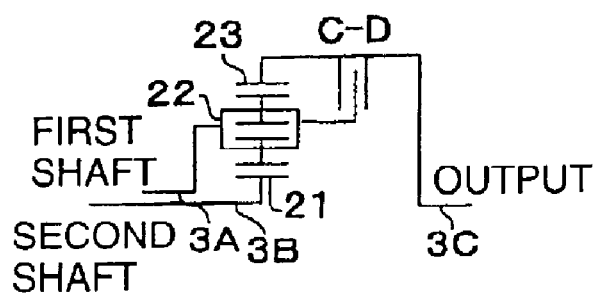
FIG. 81 is a schematic view showing a fifth modified embodiment of the planetary portion.

Further, in the case where the double planetary structure is assumed and lock-up is performed between the ring gear 23 and the sun gear 21, there can be considered a structure as shown in FIG. 77, in which the sun gear 21 is connected to the first shaft 3A, the carrier 22 is connected to the second shaft 3B, and the ring gear 23 is connected to the output shaft 3C. Next, in the case where lock-up is performed between the carrier 22 and the sun gear 21, there can be considered a structure as shown in FIG. 78, in which the sun gear 21 is connected to the first shaft 3A, the carrier 22 is connected to the second shaft 3B, and the ring gear 23 is connected to the output shaft 3C, and a structure as shown in FIG. 79, in which the sun gear 21 is connected to the second shaft 3B, the carrier 22 is connected to the first shaft 3A, and the ring gear 23 is connected to the output shaft 3C. Further, in the case where lock-up is performed between the ring gear 23 and the carrier 22, there can be considered a structure as shown in FIG. 80, in which the sun gear 21 is connected to the first shaft 3A, the carrier 22 is connected to the second shaft 3B, and the ring gear 23 is connected to the output shaft 3C, and a structure as shown in FIG. 81, in which the carrier 22 is connected to the first shaft 3A, the sun gear 21 is connected to the second shaft 3B, and the ring gear 23 is connected to the output shaft 3C.

Figure 82:
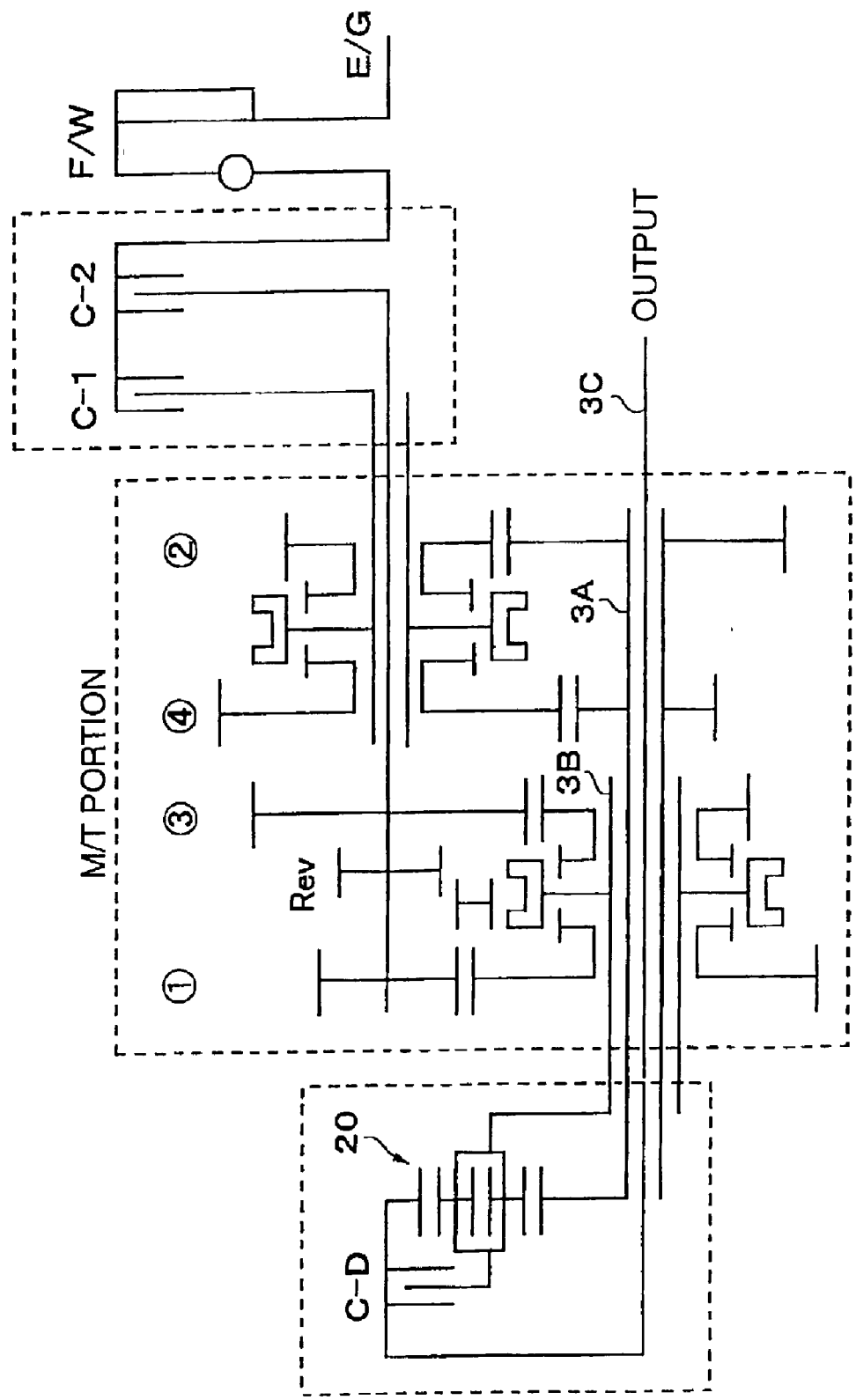
FIG. 82 is a schematic view of a gear train according to a sixteenth embodiment.

Next, a sixteenth embodiment shown in FIG. 82 is an embodiment obtained by applying modification to the fifteenth embodiment of the lock-up type. The modification is the same as that applied to the previous first embodiment to obtain the eleventh embodiment (refer to FIG. 57). In this embodiment, the double planetary gear 20 and the direct clutch (C-D) are arranged in a rear portion of the transmission on the side of the output shaft. In this arrangement, it is necessary to further provide the output shaft 3C inside a first shaft 3A and a second shaft 3B on the output shaft side. Therefore, the shafts constitute a triple shaft on the side of the first gear pair (1) and the third gear pair (3). However, in principle, such an arrangement can be made even in the lock-up type structure.

Figure 83:
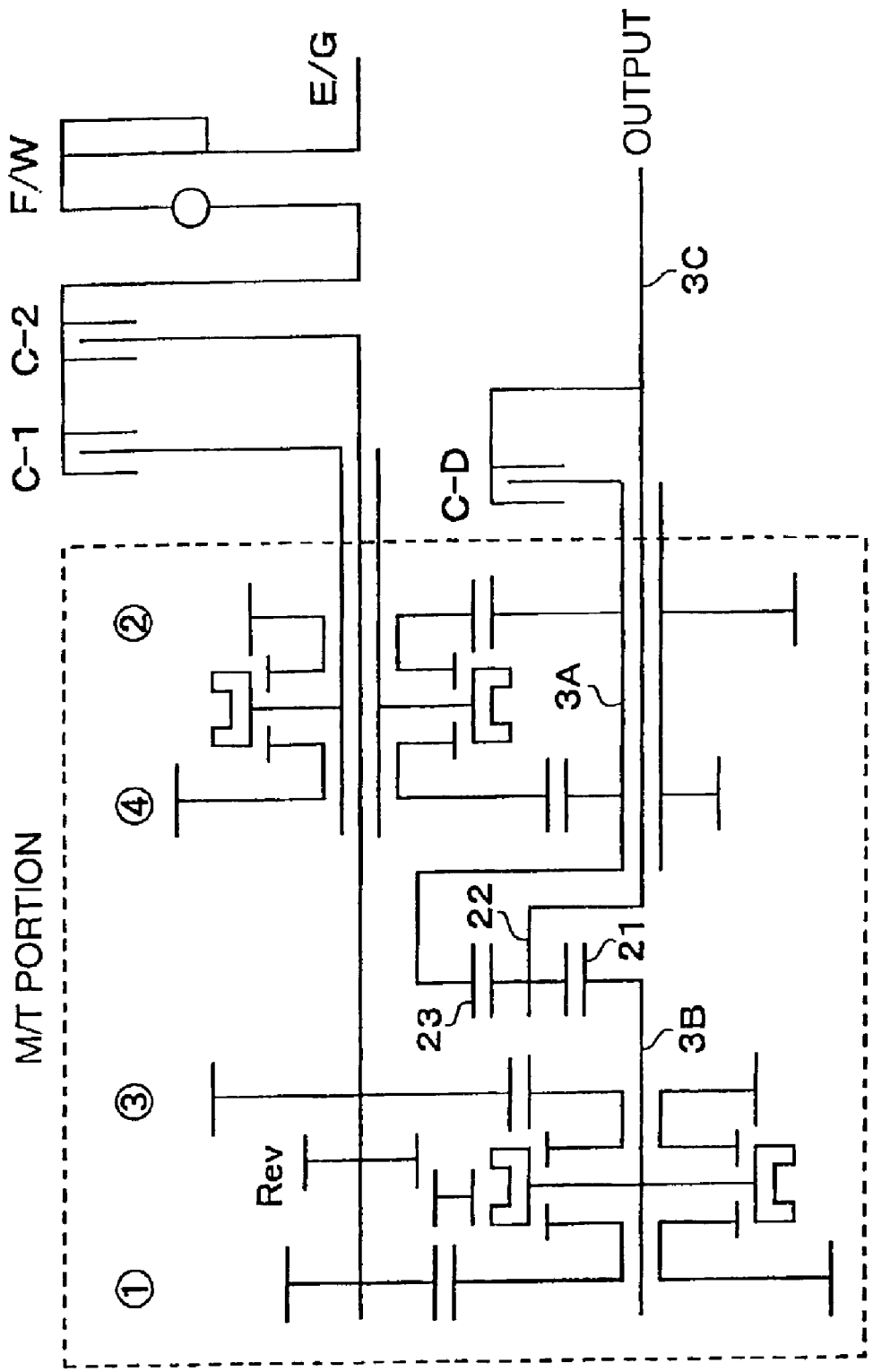
FIG. 83 is a schematic view of a gear train according to a seventeenth embodiment.

Next, a seventeenth embodiment shown in FIG. 83 is an embodiment in which the planetary gear according to the previous sixteenth embodiment is changed to the single planetary gear and is center-positioned on the output shaft side, and the direct clutch (C-D) is arranged on the output side of the M/T portion M. In this arrangement, the sun gear 21 of the planetary gear is connected to the second shaft 3B on the output side, the ring gear 23 is connected to the first shaft 3A on the output side, and the carrier 22 is connected to the output shaft 3C. Further, the direct clutch (C-D) in this case is connected to the first shaft 3A on the output side and the output shaft 3C, thereby locking up the carrier 22 and the ring gear 23 in the planetary gear.

Figure 84:
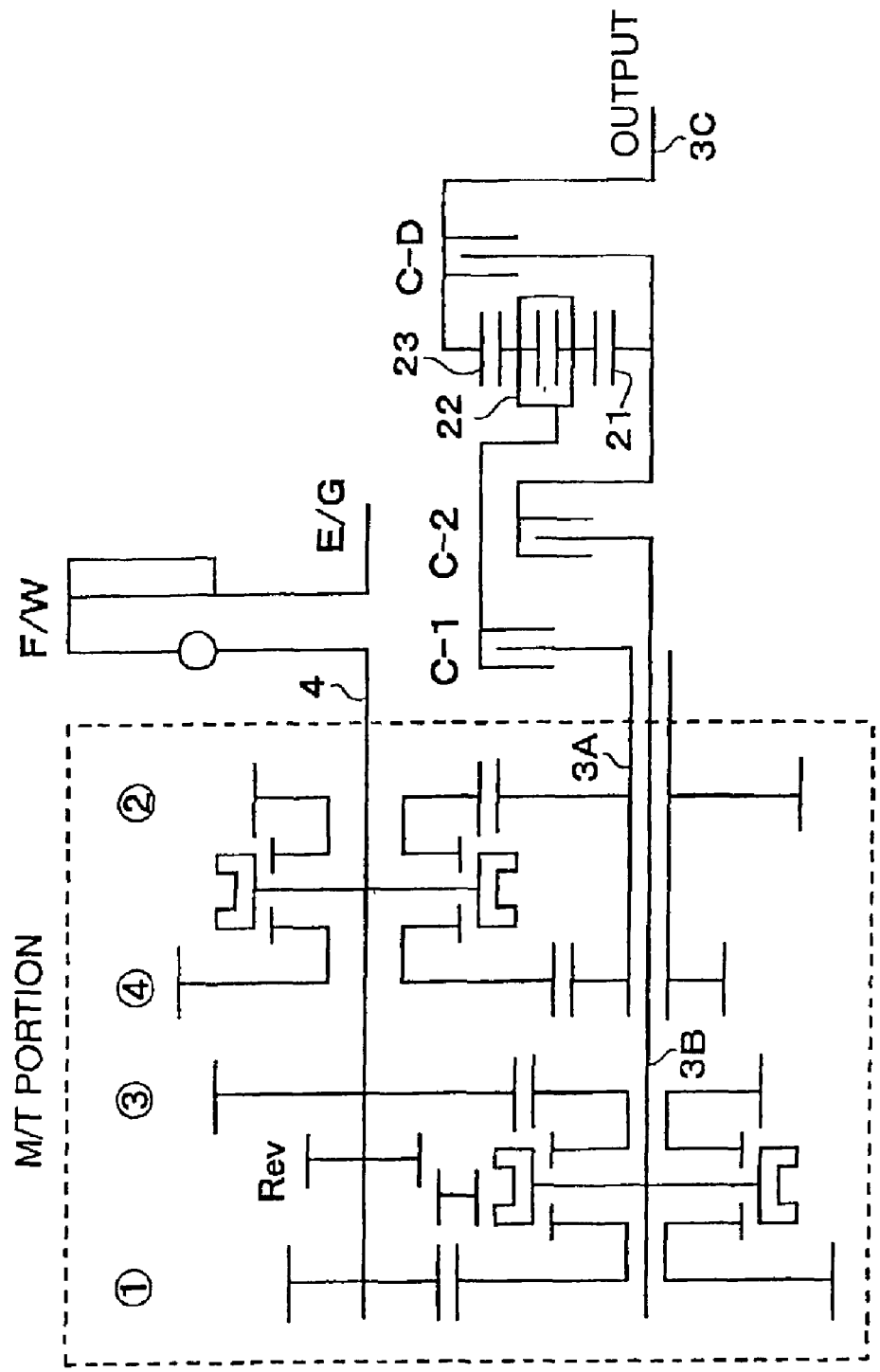
FIG. 84 is a schematic view of a gear train according to an eighteenth embodiment.

Further, an eighteenth embodiment shown in FIG. 84 is an embodiment in which the first and second clutches (C-1, C-2) serving as the input clutches in the previous fifteenth embodiment (refer to FIG. 67) are arranged on the output side of the M/T portion M as the output clutches. In the case of this embodiment, the input side of the M/T portion is directly connected to the single input shaft 4, the first shaft 3A on the output side and the carrier 22 of the double planetary gear can be connected via the first clutch (C-1), the second shaft 3B in the output side and the sun gear 21 of the planetary gear can be connected via the second clutch (C-2), and the ring gear 23 is always connected to the output shaft 3C. Further, the direct clutch (C-D) locks up the sun gear 21 and the ring gear 23 in the planetary gear.

Figure 85:
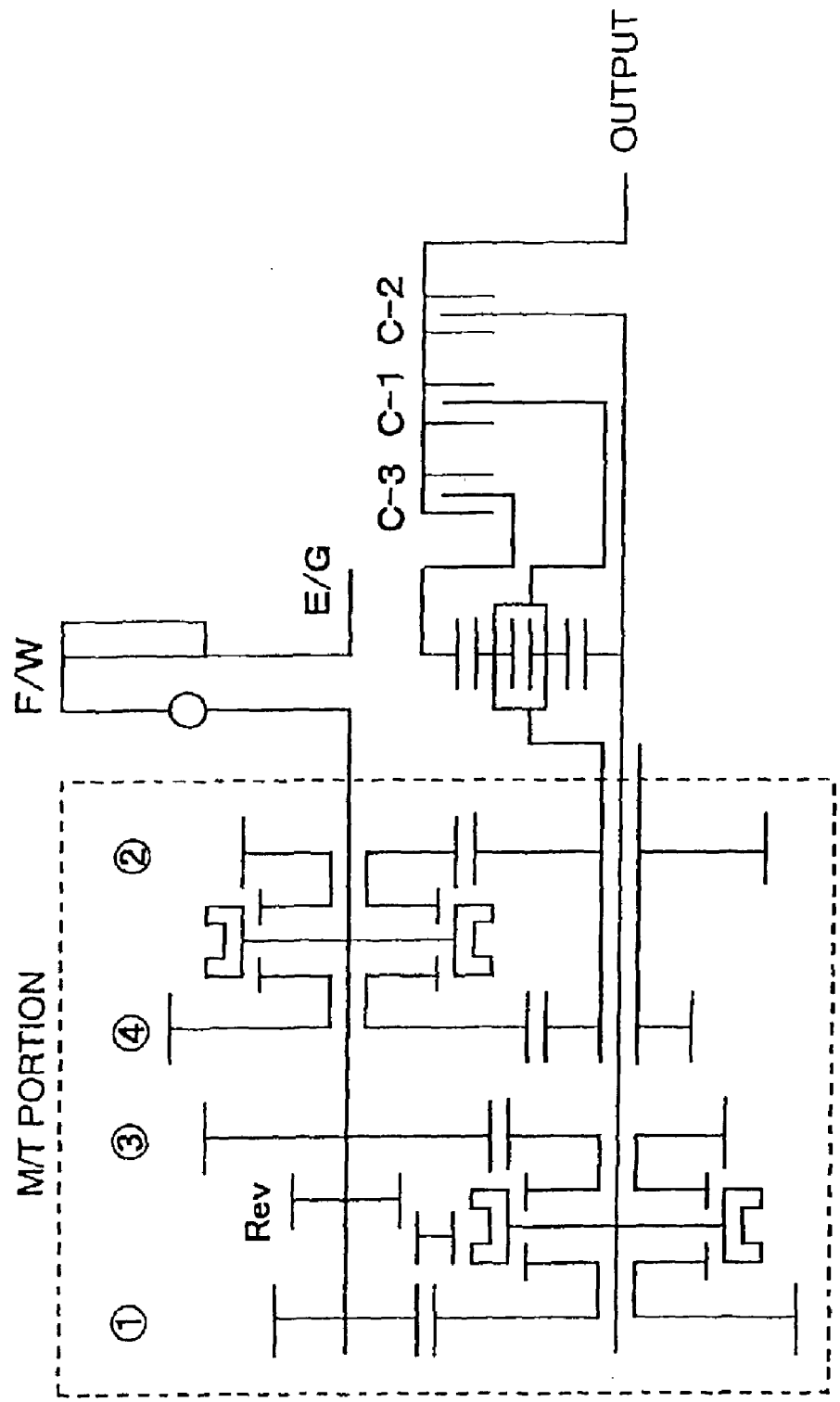
FIG. 85 is a schematic view of a gear train according to a nineteenth embodiment.

Next, a nineteenth embodiment shown in FIGS. 85 and 86 is an embodiment in which all of the planetary portions are arranged on the output side of the M/T portion M, as compared to the original first embodiment (refer to FIGS. 1 to 3). In operations in this case, all of the relations in the input and output are changed as compared to the first embodiment. However, relations of the operations of the gear pairs and the engaging elements in the respective shift speeds are the same as those described in FIG. 2. Accordingly, the description thereof is substituted by reference to FIG. 2. Further, a speed diagram shown in FIG. 86 in this embodiment is described following a notation system in which a shift characteristic is shown with reference to an input rotation number of a general automatic transmission (a speed ratio 1), in the same manner as the notation system of the fifteenth embodiment. The speed ratios of the sun gear, the ring gear and the carrier corresponding to the respective speed-changing elements are described using a white numeral on a black circle background which indicates the shift speed. These speed ratios are obtained by setting the engine rotation number to the speed ratio 1. Accordingly, the fact that the output shaft speed ratio is highest in the seventh speed means that the speed reduction ratio of the transmission is smallest with respect to the engine rotation. Further, the numerals surrounded by circles indicate the first to fourth gear pairs of the M/T portion M which are connected in the respective shift speeds.

In this nineteenth embodiment, in the same manner as in the original first embodiment, the planetary portion can be variously modified. In modified embodiments in this case, the flywheel F/W in the respective embodiments which are described as the modified embodiments of the first embodiment is replaced by the output shaft 3C. Therefore, the description thereof is substituted by reference to the figures thereof while replacing the flywheel F/W by the output shaft 3C.

Further, in the case of the gear train according to the previous fifteenth embodiment (refer to FIG. 67), six speeds can be achieved by jumping the fourth speed. A table of operations and a speed diagram in this case are shown in FIGS. 87 and 88.

Figures 89, 90:
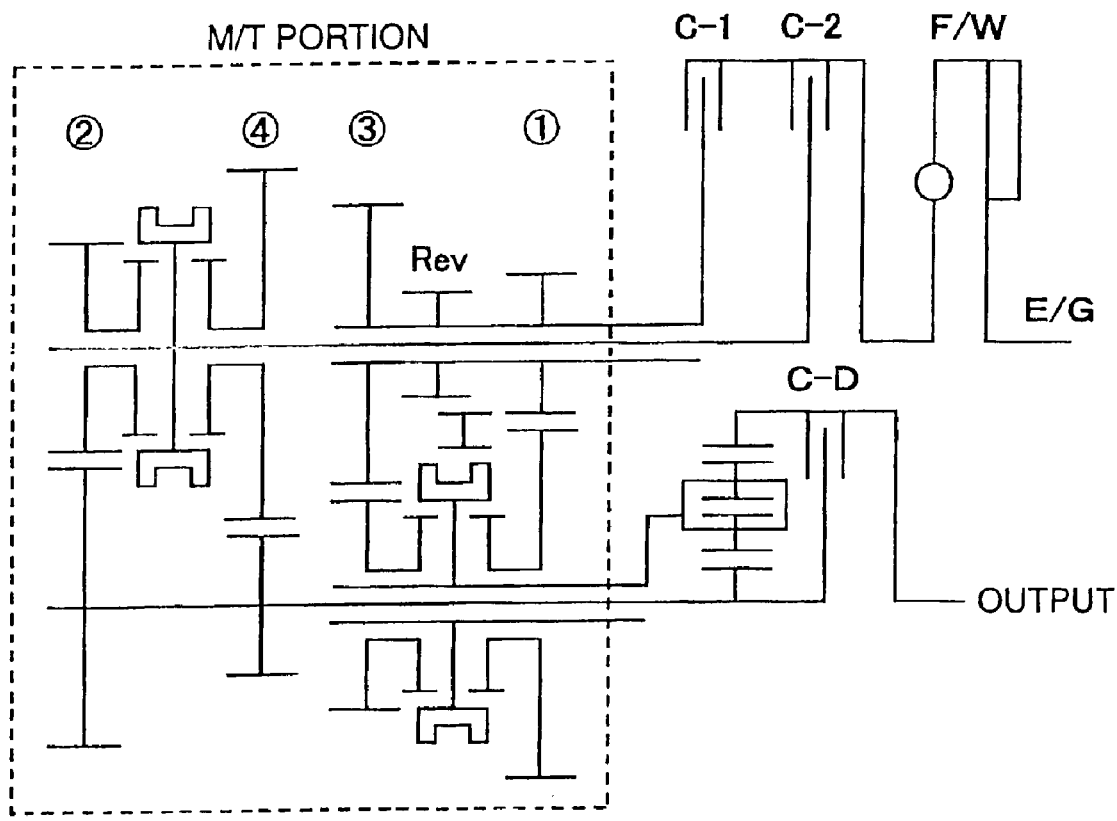
FIG. 89 is a schematic view of a gear train according to a twentieth embodiment.
FIG. 90 is a table of operations of the gear train according to the twentieth embodiment.
Figure 91:
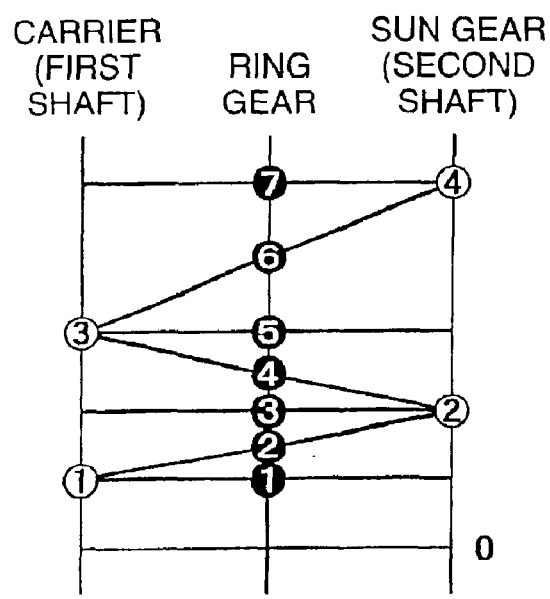
FIG. 91 is a speed diagram of the gear train according to the twentieth embodiment.

Next, a twentieth embodiment shown in FIGS. 89 to 91 is an embodiment in which the first shaft and the second shaft according to the fifteenth embodiment are exchanged. A table of operations and a speed diagram in this embodiment are shown in FIGS. 90 and 91.

Figure 92:
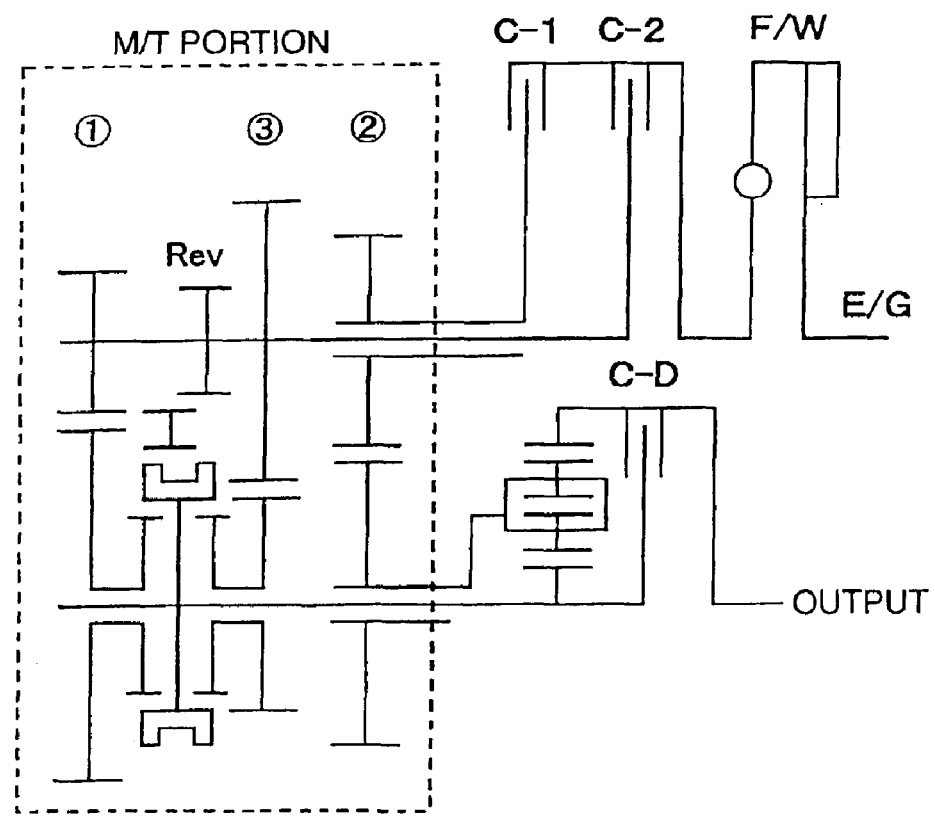
FIG. 92 is a schematic view of a gear train according to a twenty first embodiment.
Figures 93, 94:
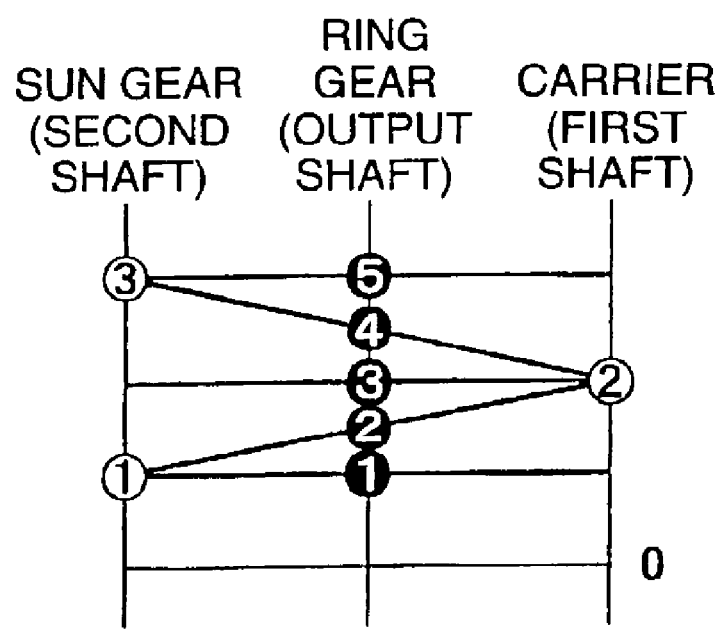
FIG. 93 is a table of operations of the gear train according to the twenty first embodiment.
FIG. 94 is a speed diagram of the gear train according to the twenty first embodiment.

Next, a twenty first embodiment shown in FIGS. 92 to 94 is an embodiment in which the fourth gear pair according to the fifteenth embodiment is abolished. A table of operations and a speed diagram in this embodiment are shown in FIGS. 93 and 94.

Figure 95:
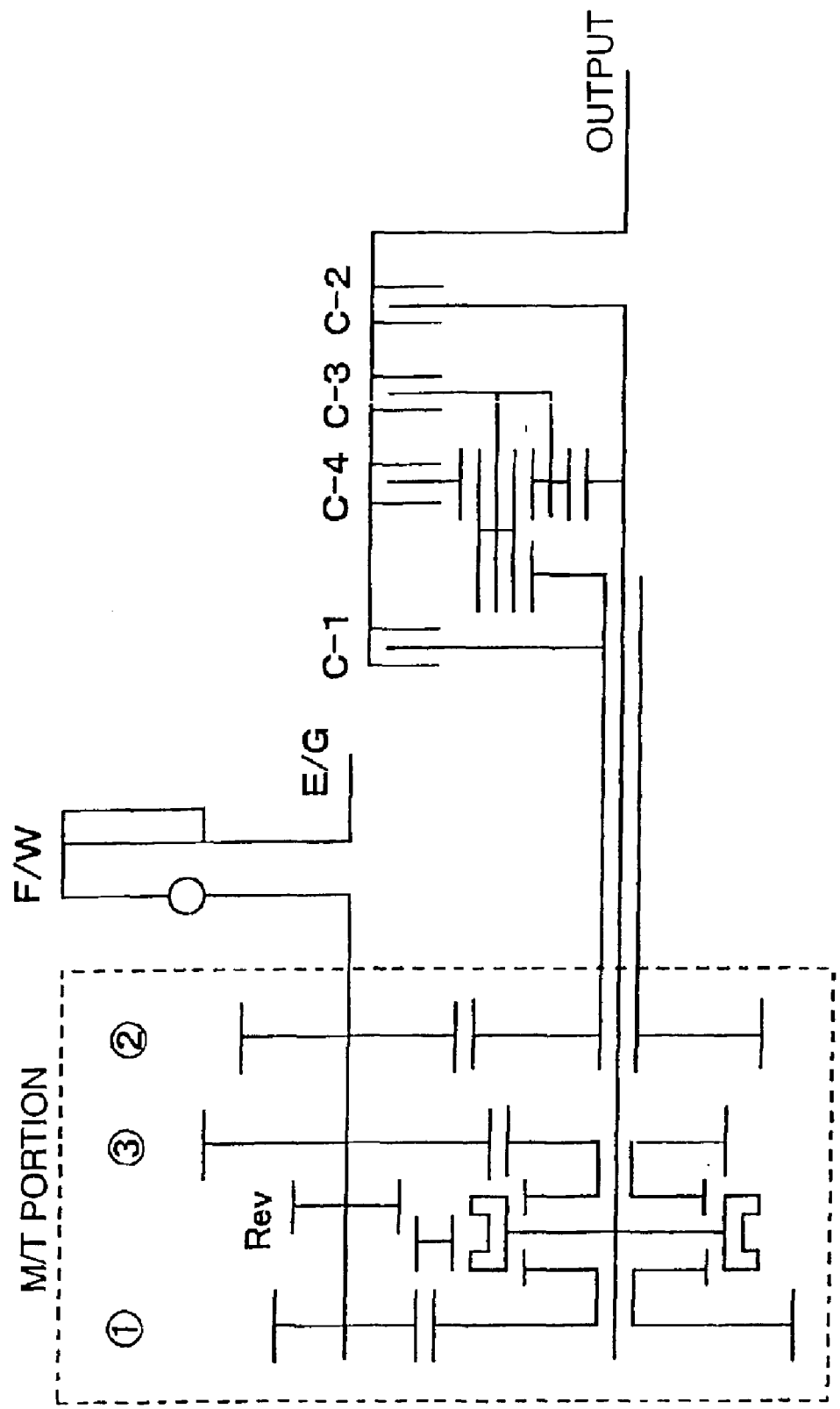
FIG. 95 is a schematic view of a gear train according to a twenty second embodiment.
Figure 96:
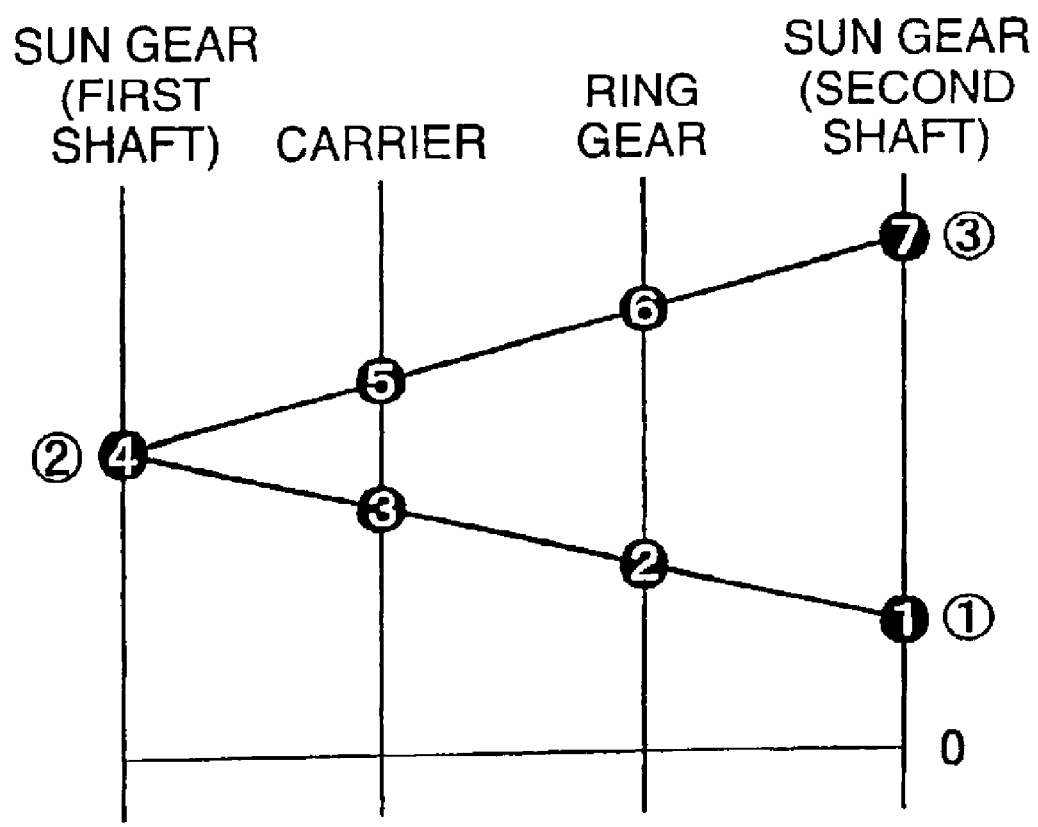
FIG. 96 is a speed diagram of the gear train according to the twenty second embodiment.

Further, a twenty second embodiment shown in FIGS. 95 and 96 is an embodiment in which the planetary portion is moved to the output side of the M/T portion, in the previous sixth embodiment (refer to FIGS. 37 to 39). Since a table of operations in this case is the same as the table shown in FIG. 38, the description thereof is substituted by reference to FIG. 38. Further, a speed diagram is as shown in FIG. 96.

Figure 97:
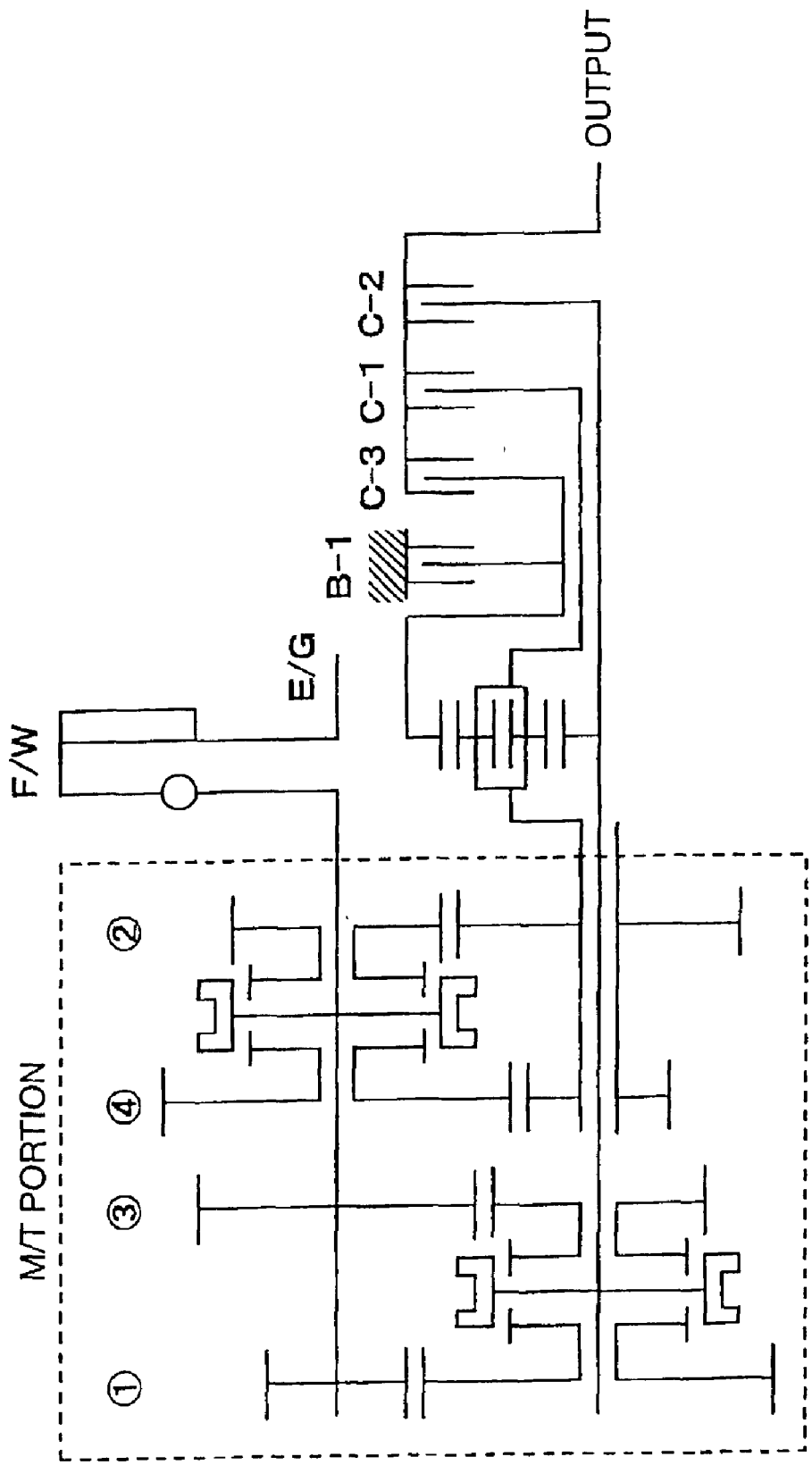
FIG. 97 is a schematic view of a gear train according to a twenty third embodiment.
Figure 98:
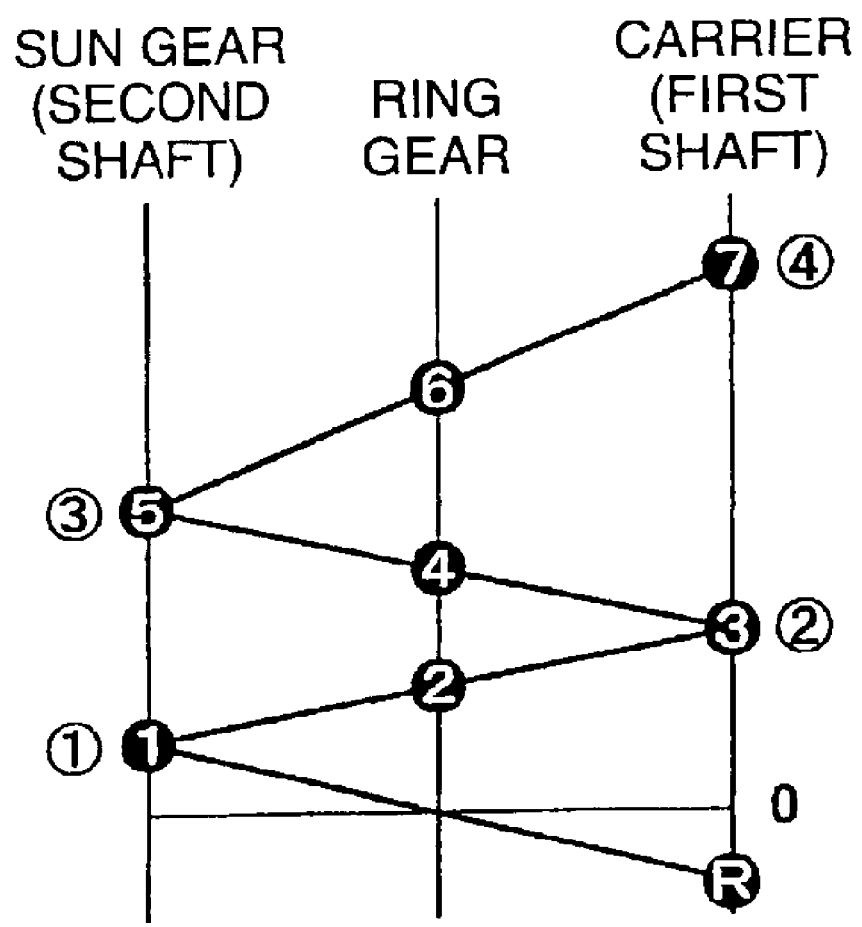
FIG. 98 is a speed diagram of the gear train according to the twenty third embodiment.

Further, a twenty third embodiment shown in FIGS. 97 and 98 is an embodiment in which the planetary portion is moved to the output side of the M/T portion, in the previous seventh embodiment (refer to FIGS. 40 to 42). Since a table of operations in this case is the same as the table shown in FIG. 41, the description thereof is substituted by reference to FIG. 41. Further, a speed diagram is as shown in FIG. 98.

Figures 99, 100:
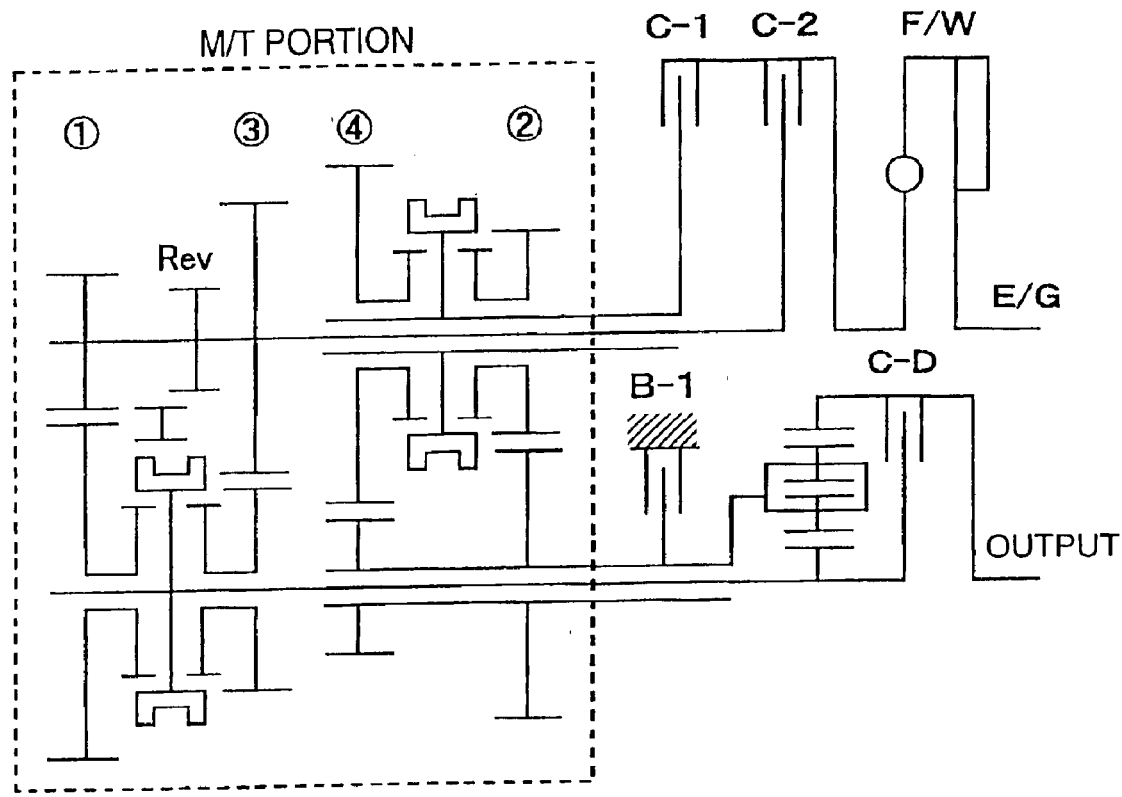
FIG. 99 is a schematic view of a gear train according to a twenty fourth embodiment.
FIG. 100 is a table of operations of the gear train according to the twenty fourth embodiment.
Figure 101:
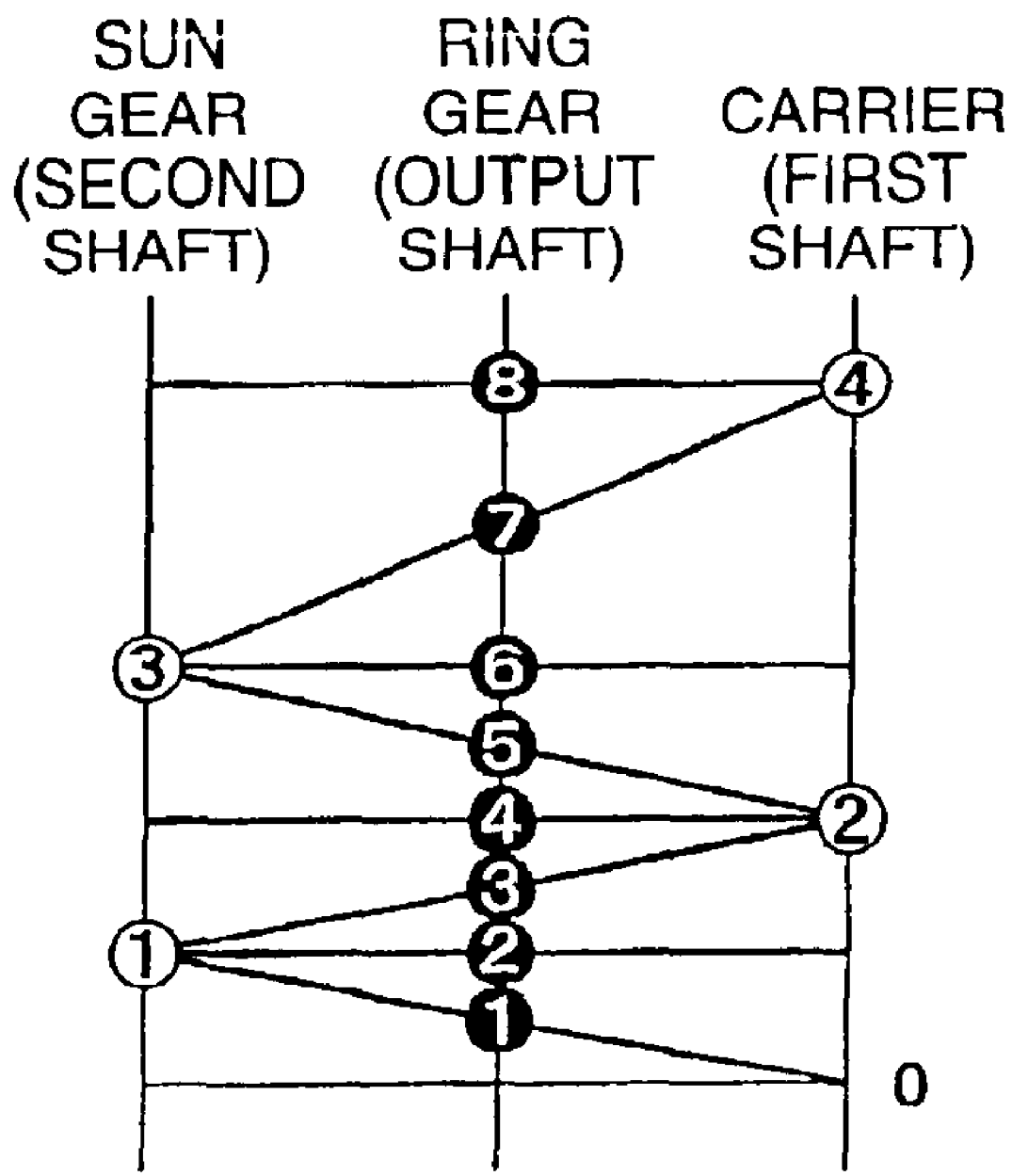
FIG. 101 is a speed diagram of the gear train according to the twenty fourth embodiment.

Further, a twenty fourth embodiment shown in FIGS. 99 to 101 is an embodiment in which a brake is added so as to achieve eight speeds, in the previous fifteenth embodiment (refer to FIGS. 67 to 69). In this case, there is employed a structure in which the carrier of the planetary gear can be fixed to the transmission case via the brake. A table of operations in this case is as shown in FIG. 100, and a speed diagram is as shown in FIG. 101.

Figure 102:
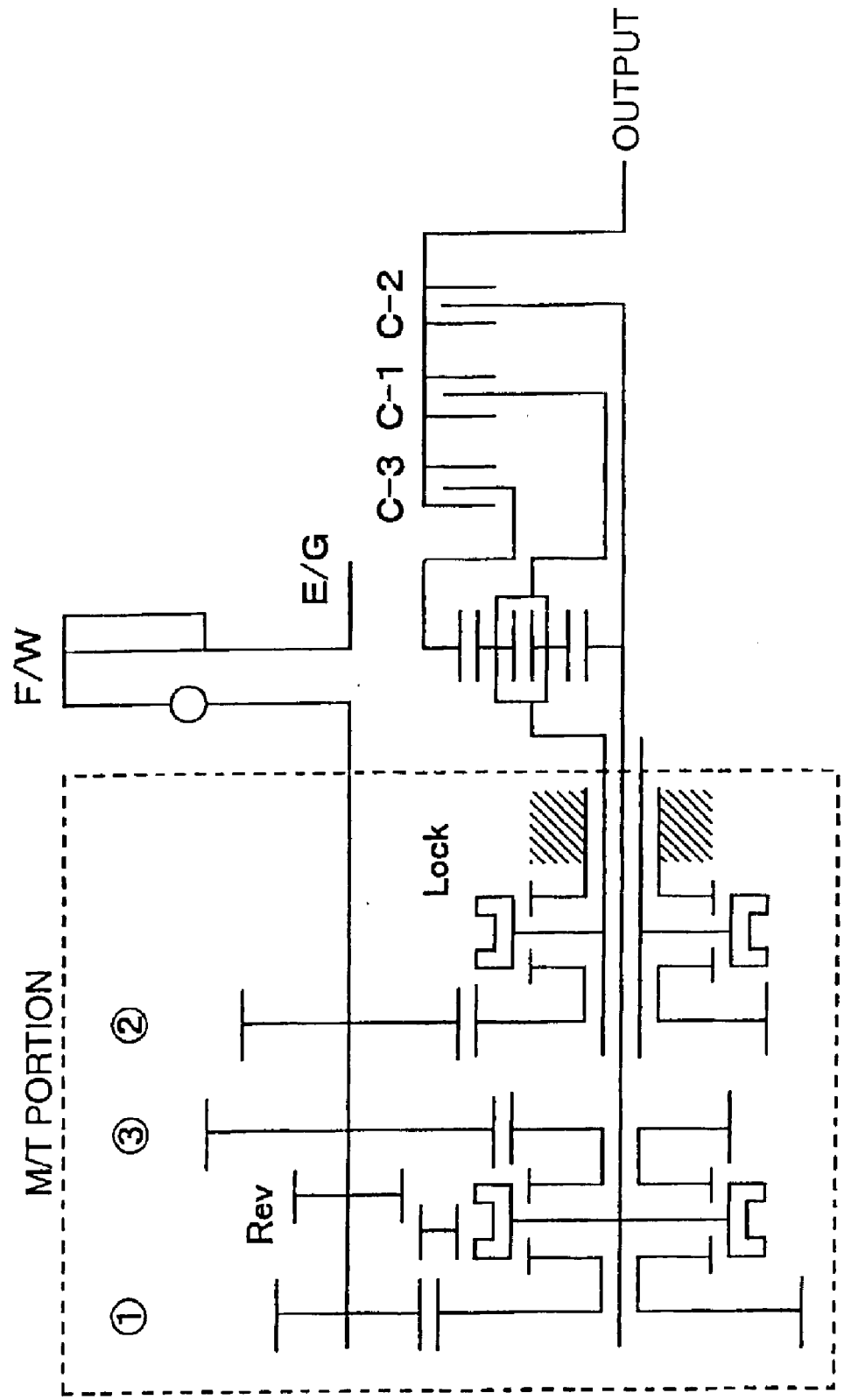
FIG. 102 is a schematic view of a gear train according to a twenty fifth embodiment.
Figures 103, 104:
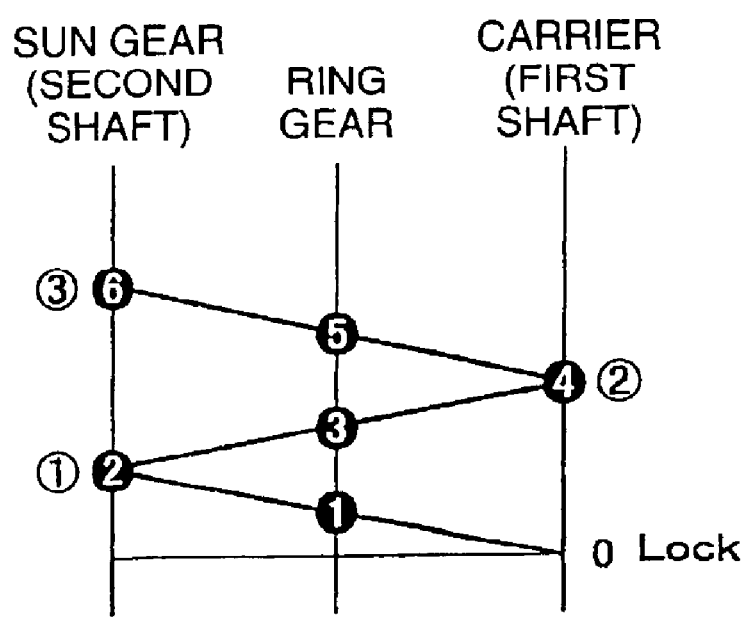
FIG. 103 is a table of operations of the gear train according to the twenty fifth embodiment.
FIG. 104 is a speed diagram of the gear train according to the twenty fifth embodiment.
Figure 105:
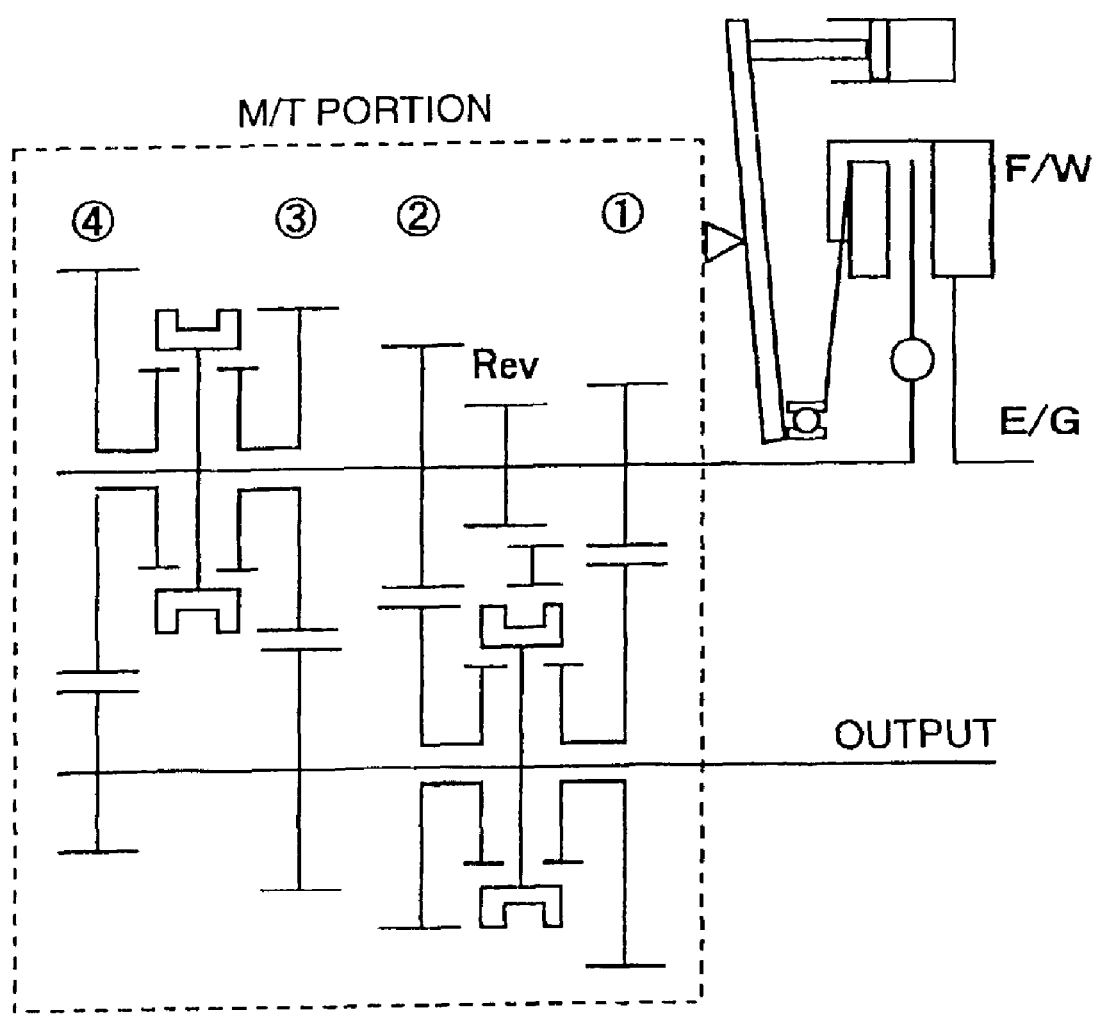
FIG. 105 is a schematic view of a conventional automated manual transmission.

Finally, a twenty fifth embodiment shown in FIGS. 102 to 104 is an embodiment in which the planetary portion is moved to the output side of the M/T portion, in the previous ninth embodiment (refer to FIGS. 53 to 55). In this case, the dog clutch of the second gear pair is moved to the side of the output shaft because the planetary portion is moved. A table of operations in this case is as shown in FIG. 103, and a speed diagram is as shown in FIG. 104.

As mentioned above, many embodiments are described for the purpose of understanding the invention. However, the invention is not limited to the exemplified embodiments, but can be carried out by variously changing the particular structures within the scope of the claims.

The invention can be widely applied to general vehicles, and can be applied to a front engine rear drive (FR) vehicle, and a front engine front drive (FF) vehicle and a rear engine rear drive (RR) vehicle employing a transversely-mounted transaxle.

What is claimed is:

1. A transmission for a vehicle, comprising:
   a main transmission which has at least two rotating elements each set to a different gear ratio and a dog clutch that can be selectively connected to each of the rotating elements;
   a differential gear mechanism which has at least three elements; and
   connecting means which selectively connects the two rotating elements to different speed-changing elements of the differential gear mechanism, respectively.

2. The transmission for a vehicle according to claim 1, wherein the main transmission has gears which can selectively achieve a first shift speed and a third shift speed whose shift ratio is smaller than that of a second shift speed respectively on a first shaft so as to serve as rotating elements, has gears which can selectively achieve a second shift speed and a fourth shift speed whose shift ratio is larger than that of the third shift speed respectively on a second shaft, and achieves seven forward speeds by achieving a first intermediate shift speed between the first shift speed and the second shift speed, a second intermediate shift speed between the second shift speed and the third shift speed, and a third intermediate shift speed between the third shift speed and the fourth shift speed.

3. The transmission for a vehicle according to claim 1, wherein the main transmission has gears on an output shaft, the gears forming pairs with a gear on a first shaft and a gear on a second shaft, respectively, one of the gears forming pairs is always connected to the first shaft, and the other can be selectively connected to the second shaft via the dog clutch.

4. The transmission for a vehicle according to claim 1, wherein the main transmission has gears on an output shaft, the gears forming pairs with a gear on a first shaft and a gear on a second shaft, respectively, one of the gears forming pairs is always connected to the first shaft, and the other can be selectively connected to the second shaft via a multi-plate clutch.

5. The transmission for a vehicle according to claim 1, wherein the main transmission has gears on an output shaft, the gears forming pairs with a gear on a first shaft and a gear on a second shaft, respectively, one of the gears forming pairs is connected to the first shaft via a planetary gear mechanism which can generate a direct rotation and a speed-change rotation.

6. A transmission for a vehicle, comprising:
   a main transmission which is connected to an output so as to be driven, and has at least two rotating elements each set to a different gear ratio;
   a differential gear mechanism which has at least three elements;
   first input means which directly connects the two rotating elements to two elements of the at least three elements of the differential gear mechanism and selectively inputs an input rotation; and
   second input means which selectively inputs the input rotation to a third element of the at least three elements.

7. The transmission for a vehicle according to claim 6, wherein the first input means has a connection member which directly connects the two elements of the differential gear mechanism to the two rotating elements, and a clutch which selectively connects the two elements of the differential gear mechanism to an input shaft, and
   the second input means has a clutch which selectively connects the third element to the input shaft.

8. The transmission for a vehicle according to claim 7, wherein the at least two rotating elements of the main transmission are selectively connected to different elements of the differential gear mechanism, respectively.

9. The transmission for a vehicle according to claim 7, wherein the main transmission can achieve at least a first shift speed which is a lowest shift speed.

10. The transmission for a vehicle according to claim 7, wherein the differential gear mechanism includes a planetary gear.

11. The transmission for a vehicle according to claim 10, wherein the planetary gear is a single planetary gear including three elements which are a sun gear, a ring gear and a carrier,
   one of the sun gear and the ring gear is always connected to a first shaft which is connected to one of the two rotating elements, and is selectively connected to an input shaft via a first clutch which constitutes the first input means, the other is always connected to a second shaft which is connected to the other of the two rotating elements, and is selectively connected to the input shaft via a second clutch which constitutes the first input means, and the carrier is selectively connected to the input shaft via a third clutch which constitutes the second input means.

12. The transmission for a vehicle according to claim 11, wherein the main transmission achieves a first shift speed by engaging the first clutch, achieves a second shift speed by engaging the second clutch, and achieves an intermediate shift speed between the first shift speed and the second shift speed by engaging the third clutch.

13. The transmission for a vehicle according to claim 11 wherein the main transmission further has a reverse gear for achieving a reverse state, and achieves a reverse shift speed by bringing the main transmission into a reverse state and engaging any one of the first to third clutches.

14. The transmission for a vehicle according to claim 11, wherein a brake which can engage one of the sun gear and the ring gear is further provided, the brake and the clutch for carrier input are engaged, and a shift speed of the gear on the shaft which is connected to the other of the sun gear and the ring gear is achieved, whereby a shift speed which is accelerated from the shift speed is achieved.

15. The transmission for a vehicle according to claim 10, wherein the planetary gear is a double planetary gear including three elements which are a sun gear, a ring gear and a carrier, one of the sun gear and the carrier is always connected to a first shaft which is connected to one of the two rotating elements, and is selectively connected to an input shaft via a first clutch which constitutes the first input means, the other is always connected to a second shaft which is connected to the other of the two rotating elements, and is selectively connected to the input shaft via a second clutch which constitutes the first input means, and the ring gear is selectively connected to the input shaft via a third clutch which constitutes the second input means.

16. The transmission for a vehicle according to claim 15, wherein a brake which can engage the ring gear is further provided, and a reverse shift speed is achieved by engaging the brake and the second clutch and bringing the main transmission into the second shift speed.

17. The transmission for a vehicle according to claim 15, wherein a brake which can engage the ring gear is further provided, and a reverse shift speed is achieved by engaging the brake and the first clutch and bringing the main transmission into the first shift speed.

18. The transmission for a vehicle according to claim 15, wherein a brake which can engage one of the sun gear and the ring gear is further provided, the brake and the clutch for ring gear input are engaged, and a shift speed of the shaft which is connected to the other of the sun gear and the carrier is achieved, whereby a shift speed which is accelerated from the shift speed is achieved.

19. The transmission for a vehicle according to claim 6, wherein the first input means has a clutch which selectively connects the two elements of the differential gear mechanism to the two rotating elements, and a clutch which selectively connects the two elements of the differential gear mechanism, and the second input means is a connection member which always connects the third element to the input shaft.

20. The transmission for a vehicle according to claim 19, wherein two rotating elements of the main transmission are selectively connected to the different elements of the differential gear mechanism, respectively.

21. The transmission for a vehicle according to claim 19, wherein the main transmission can achieve at least a first shift speed corresponding to a lowest shift speed.

22. The transmission for a vehicle according to claim 19, wherein the differential gear mechanism includes a planetary gear.

23. The transmission for a vehicle according to claim 22, wherein a third clutch which selectively connects at least two elements of the planetary gear is provided, the planetary gear is a single planetary gear including three elements which are a sun gear, a ring gear and a carrier, one of the sun gear and the ring gear is selectively connected to a first shaft which is connected to one of the two rotating elements via a first clutch constituting the first input means, the other is selectively connected to a second shaft which is connected to the other of the two rotating elements via a second clutch constituting the first input means, and the carrier is always connected to the input shaft by the connection member.

24. The transmission for a vehicle according to claim 23, wherein the main transmission achieves a first shift speed by engaging the first clutch and the third clutch, achieves a second shift speed by engaging the second clutch and the third clutch, and achieves an intermediate shift speed between the first shift speed and the second shift speed by engaging the first clutch and the second clutch.

25. The transmission for a vehicle according to claim 23, wherein the main transmission further has a reverse gear for achieving a reverse state, and achieves a reverse shift speed by bringing the main transmission into a reverse state and engaging any two of the first to third clutches.

26. The transmission for a vehicle according to claim 23, wherein a brake which can engage either the sun gear or the ring gear is further provided, the brake and the clutch for connecting any other of the sun gear and the ring gear to the main transmission are engaged, and a shift speed of the shaft which is connected to the ring gear is achieved, whereby a shift speed which is accelerated from the shift speed is achieved.

27. The transmission for a vehicle according to claim 22, wherein a third clutch which selectively connects at least two elements of the planetary gear is provided, the planetary gear is a double planetary gear including three elements which are a sun gear, a ring gear and a carrier, one of the sun gear and the carrier is selectively connected to a first shaft which is connected to one of the two rotating elements via a first clutch constituting the first input means, the other is selectively connected to a second shaft which is connected to the other of the two rotating elements via the second clutch, and the ring gear is always connected to the input shaft by the connection member.

28. The transmission for a vehicle according to claim 27, wherein a brake which can engage one of the sun gear and the carrier is further provided, the brake and the clutch for connecting the other of the sun gear and the carrier to the main transmission are engaged, and a shift speed of the shaft which is connected to the sun gear is achieved, whereby a shift speed which is accelerated from the shift speed is achieved.

29. A transmission for a vehicle, comprising:

a main transmission which is connected to an output so as to be driven, and has at least two rotating elements each set to a different gear ratio;

a differential gear mechanism which has at least three elements;

first input means which selectively connects the two rotating elements to two elements of the at least three elements of the differential gear mechanism and selectively inputs an input rotation to at least one of the at least two rotating elements; and second input means which directly inputs the input rotation to a third element of the at least three elements.

* * * * *